United States Patent
Maizuru

(10) Patent No.: US 12,398,221 B2
(45) Date of Patent: Aug. 26, 2025

(54) RESIN COMPOSITION AND USE FOR SAME

(71) Applicant: KANEKA CORPORATION, Osaka (JP)

(72) Inventor: Nobuyoshi Maizuru, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 919 days.

(21) Appl. No.: 17/355,787

(22) Filed: Jun. 23, 2021

(65) Prior Publication Data

US 2021/0317240 A1 Oct. 14, 2021

Related U.S. Application Data

(63) Continuation of application No. PCT/JP2019/051073, filed on Dec. 26, 2019.

(30) Foreign Application Priority Data

Dec. 27, 2018 (JP) ................. 2018-245999

(51) Int. Cl.
| | |
|---|---|
| *C08F 6/22* | (2006.01) |
| *C08F 36/06* | (2006.01) |
| *C08J 3/20* | (2006.01) |
| *C08L 9/08* | (2006.01) |
| *C08L 9/10* | (2006.01) |

(52) U.S. Cl.
CPC .............. *C08F 6/22* (2013.01); *C08F 36/06* (2013.01); *C08J 3/20* (2013.01); *C08L 9/08* (2013.01); *C08L 9/10* (2013.01); *C08J 2309/08* (2013.01); *C08J 2309/10* (2013.01); *C08J 2351/04* (2013.01); *C08J 2363/00* (2013.01)

(58) Field of Classification Search
CPC ...... C08F 6/22; C08L 9/08; C08L 9/10; C08J 2351/04; C08J 2309/08; C08J 2309/10
See application file for complete search history.

(56) References Cited

U.S. PATENT DOCUMENTS

| | | | |
|---|---|---|---|
| 3,284,396 | A | 11/1966 | Talalay |
| 3,804,735 | A | 4/1974 | Radlove et al. |
| 4,778,851 | A | 10/1988 | Henton et al. |
| 5,290,857 | A | 3/1994 | Ashida et al. |
| 5,362,795 | A | 11/1994 | Matsumoto et al. |
| 5,364,729 | A | 11/1994 | Kmiecik-Lawrynowicz et al. |
| 5,414,045 | A | 5/1995 | Sue et al. |
| 5,569,709 | A | 10/1996 | Sue et al. |
| 6,153,694 | A | 11/2000 | Miyatake et al. |
| 2002/0013438 | A1 | 1/2002 | Grootaert et al. |
| 2002/0052429 | A1 | 5/2002 | Weier et al. |
| 2002/0065343 | A1 | 5/2002 | Jang et al. |
| 2003/0040555 | A1 | 2/2003 | Sakabe |
| 2004/0018240 | A1 | 1/2004 | Ohmachi et al. |
| 2004/0147668 | A1 | 7/2004 | Miyake et al. |
| 2004/0171749 | A1 | 9/2004 | Takaki et al. |
| 2005/0163925 | A1 | 7/2005 | Sacripante et al. |
| 2006/0241045 | A1 | 10/2006 | Ohmachi et al. |
| 2007/0027233 | A1 | 2/2007 | Yamaguchi et al. |
| 2007/0027263 | A1 | 2/2007 | Furukawa et al. |
| 2007/0251419 | A1 | 11/2007 | Yamaguchi et al. |
| 2007/0270539 | A1 | 11/2007 | Yui et al. |
| 2007/0272119 | A1 | 11/2007 | Ichinose et al. |
| 2008/0108750 | A1 | 5/2008 | Terada et al. |
| 2008/0139697 | A1 | 6/2008 | Ueda |
| 2008/0146687 | A1 | 6/2008 | Ueda |
| 2008/0167402 | A1 | 7/2008 | Ueda |
| 2008/0176974 | A1 | 7/2008 | Ueda |
| 2009/0294057 | A1 | 12/2009 | Liang et al. |
| 2010/0204404 | A1 | 8/2010 | Hongo |
| 2010/0323022 | A1 | 12/2010 | Hashimoto et al. |
| 2011/0269894 | A1 | 11/2011 | Miyamoto |
| 2011/0288201 | A1 | 11/2011 | Gottis |
| 2012/0070482 | A1* | 3/2012 | Heming ........... A01N 43/90 424/405 |
| 2012/0101216 | A1 | 4/2012 | Achten et al. |
| 2012/0142820 | A1 | 6/2012 | Yamaguchi et al. |

(Continued)

FOREIGN PATENT DOCUMENTS

| | | |
|---|---|---|
| CN | 1090861 A | 8/1994 |
| CN | 1409727 A | 4/2003 |

(Continued)

OTHER PUBLICATIONS

Machine translation of JP-H05295237-A obtained from IP.com (Year: 1993).*
Machine translation of JP-4671531-B2 obtained from IP.com (Year: 2011).*
English translation of the International Preliminary Report on Patentability issued in corresponding International Application No. PCT/JP2019/051073, dated Jun. 16, 2021 (7 pages).
English translation of the International Search Report issued in corresponding International Application No. PCT/JP2019/051073, mailed Mar. 10, 2020 (2 pages).
Office Action issued in counterpart China Patent Application No. CN 201980085731.1 issued Feb. 21, 2023 (17 pages).

(Continued)

*Primary Examiner* — Kregg T Brooks
*Assistant Examiner* — David R. Foss
(74) *Attorney, Agent, or Firm* — Osha Bergman Watanabe & Burton LLP

(57) ABSTRACT

The present disclosure relates to a novel resin composition which imposes a reduced environmental load and which is excellent in dispersibility of fine polymer particles. Provided is a resin composition containing water, fine polymer particles (A) having a specific feature, and a thermosetting resin (B) having a specific feature. The resin composition contains the water, the fine polymer particles (A), and the thermosetting resin (B) in respective specific amounts, does not substantially contain an organic solvent, and contains sulfur (S) in an amount falling within a specific range and phosphorus (P) in an amount falling within a specific range.

12 Claims, No Drawings

(56) References Cited

U.S. PATENT DOCUMENTS

| | | |
|---|---|---|
| 2012/0142863 A1 | 6/2012 | Miyamoto |
| 2012/0202080 A1 | 8/2012 | Ehara et al. |
| 2014/0124986 A1* | 5/2014 | Lima .................. B29C 45/0001 524/565 |
| 2014/0213729 A1 | 7/2014 | Hongo |
| 2015/0037497 A1 | 2/2015 | Lutz |
| 2015/0267048 A1 | 9/2015 | Wakita et al. |
| 2016/0177016 A1 | 6/2016 | Takamido |
| 2016/0244603 A1 | 8/2016 | Okamoto |
| 2016/0251510 A1 | 9/2016 | Furukawa et al. |
| 2016/0333130 A1 | 11/2016 | Wakita et al. |
| 2016/0362524 A1 | 12/2016 | Watanabe et al. |
| 2017/0210897 A1 | 7/2017 | Nakamoto et al. |
| 2017/0309955 A1 | 10/2017 | Kataoka et al. |
| 2017/0335097 A1 | 11/2017 | Takamizu |
| 2017/0362368 A1 | 12/2017 | Kitayama et al. |
| 2017/0362395 A1 | 12/2017 | Inoubli et al. |
| 2017/0369696 A1 | 12/2017 | Inoubli et al. |
| 2018/0002520 A1 | 1/2018 | Inoubli et al. |
| 2018/0030240 A1 | 2/2018 | Matsuoka et al. |
| 2018/0094176 A1 | 4/2018 | Okamoto et al. |
| 2018/0370125 A1 | 12/2018 | Rolland et al. |
| 2019/0040182 A1 | 2/2019 | Miyatake |
| 2019/0233635 A1 | 8/2019 | Inoubli et al. |
| 2020/0095385 A1 | 3/2020 | Yoshihara |
| 2020/0172720 A1 | 6/2020 | Kitayama et al. |
| 2020/0303771 A1 | 9/2020 | Kataoka et al. |
| 2022/0213311 A1 | 7/2022 | Maizuru et al. |

FOREIGN PATENT DOCUMENTS

| | | | |
|---|---|---|---|
| CN | 1503823 A | | 6/2004 |
| CN | 1517400 A | | 8/2004 |
| CN | 101090943 A | | 12/2007 |
| CN | 104755516 A | | 7/2015 |
| CN | 105452316 A | | 3/2016 |
| CN | 105612215 A | | 5/2016 |
| CN | 105612218 A | | 5/2016 |
| CN | 105683238 A | | 6/2016 |
| CN | 107250259 A | | 10/2017 |
| EP | 0526895 A2 | | 2/1993 |
| EP | 1245584 A1 | | 10/2002 |
| EP | 1394210 A1 | | 3/2004 |
| EP | 1440997 A1 | | 7/2004 |
| EP | 1780239 A1 | | 5/2007 |
| EP | 2123711 A1 | | 11/2009 |
| EP | 2189502 A1 | | 5/2010 |
| EP | 2388280 A1 | | 11/2011 |
| EP | 2441784 A1 | | 4/2012 |
| EP | 3031836 A1 | | 6/2016 |
| EP | 3056540 A1 | | 8/2016 |
| EP | 3064520 A1 | | 9/2016 |
| EP | 3266827 A1 | | 1/2018 |
| EP | 3587491 A1 | | 1/2020 |
| EP | 3904453 A1 | | 11/2021 |
| JP | H05295237 A | * | 11/1993 |
| JP | H05339471 A | | 12/1993 |
| JP | H06-100704 A | | 4/1994 |
| JP | H06-172734 A | | 6/1994 |
| JP | H06-287410 A | | 10/1994 |
| JP | H07-146587 A | | 6/1995 |
| JP | H07-233204 A | | 9/1995 |
| JP | H08183836 A | | 7/1996 |
| JP | 2000-178405 A | | 6/2000 |
| JP | 2001-123052 A | | 5/2001 |
| JP | 2002146214 A | | 5/2002 |
| JP | 2002-308914 A | | 10/2002 |
| JP | 2003-522232 A | | 7/2003 |
| JP | 2003-327912 A | | 11/2003 |
| JP | 2005-002345 A | | 1/2005 |
| JP | 2005-213507 A | | 8/2005 |
| JP | 2005-526165 A | | 9/2005 |
| JP | 2009-062389 A | | 3/2009 |
| JP | 2009-203397 A | | 9/2009 |
| JP | 2009-545656 A | | 12/2009 |
| JP | 2010-77379 A | | 4/2010 |
| JP | 2010-209164 A | | 9/2010 |
| JP | 2010-241996 A | | 10/2010 |
| JP | 2011-032435 A | | 2/2011 |
| JP | 4671531 B2 | * | 4/2011 |
| JP | 2012-520909 A | | 9/2012 |
| JP | 2014141604 A | | 8/2014 |
| JP | 2015-514140 A | | 5/2015 |
| JP | 2015-182248 A | | 10/2015 |
| JP | 2015-218317 A | | 12/2015 |
| JP | 2016-199673 A | | 12/2016 |
| JP | 2017-149887 A | | 8/2017 |
| JP | 2018-500440 A | | 1/2018 |
| JP | 2018-500441 A | | 1/2018 |
| JP | 2018-035210 A | | 3/2018 |
| JP | 2019-019236 A | | 2/2019 |
| JP | 2019503891 A | | 2/2019 |
| JP | 2020-144374 A | | 9/2020 |
| JP | 2021-088632 A | | 6/2021 |
| KR | 20150040497 A | | 4/2015 |
| WO | 03/097746 A1 | | 11/2003 |
| WO | 2004108825 A1 | | 12/2004 |
| WO | 2005028546 A1 | | 3/2005 |
| WO | 2005/056624 A1 | | 6/2005 |
| WO | 2005/116155 A1 | | 12/2005 |
| WO | 2009/034966 A1 | | 3/2009 |
| WO | 2009060819 A1 | | 5/2009 |
| WO | 2010/082482 A1 | | 7/2010 |
| WO | 2010/143366 A1 | | 12/2010 |
| WO | 2011/016385 A1 | | 2/2011 |
| WO | 2011/046086 A1 | | 4/2011 |
| WO | 2016/068239 A1 | | 5/2016 |
| WO | 2016/068329 A1 | | 5/2016 |
| WO | 2016/102658 A1 | | 6/2016 |
| WO | 2016/102666 A1 | | 6/2016 |
| WO | 2016/102682 A1 | | 6/2016 |
| WO | 2016/136726 A1 | | 9/2016 |
| WO | 2017/179653 A1 | | 10/2017 |
| WO | 2018/155677 A1 | | 8/2018 |
| WO | 2018/212064 A1 | | 11/2018 |
| WO | 2018/212227 A1 | | 11/2018 |
| WO | 2021/060482 A1 | | 4/2021 |

OTHER PUBLICATIONS

Office Action issued in corresponding Japanese Patent Application No. 2020-562394 dated Jul. 4, 2023 (4 pages).

International Preliminary Report on Patentability issued in related International Application No. PCT/JP2020/014657 mailed Oct. 7, 2021 (8 pages).

International Search Report issued in related International Application No. PCT/JP2020/014657 mailed Jun. 16, 2020 (2 pages).

International Preliminary Report on Patentability issued in related International Application No. PCT/JP2020/014659 mailed Oct. 7, 2021 (7 pages).

International Search Report issued in related International Application No. PCT/JP2020/014659 mailed Jun. 16, 2020 (2 pages).

International Preliminary Report on Patentability issued in related International Application No. PCT/JP2020/014658 mailed Oct. 7, 2021 (10 pages).

International Search Report issued in related International Application No. PCT/JP2020/014658 mailed Jun. 30, 2020 (3 pages).

Hexion, "EPON and EPI-REZ Epoxy Resins"; Product Selector, pp. 1-16, Feb. 2014 (16 pages).

Office Action issued in corresponding U.S. Appl. No. 17/036,869; dated Aug. 10, 2022 (39 pages).

Hexion "EPON Resin 1002F," Hexion Responsible Chemistry, dated Aug. 4, 2022 (2 pages).

Hexion "EPI-REZ Resin 3522-W-60," Hexion Responsible Chemistry, dated Aug. 4, 2022 (2 pages).

Burkhardt, "Liquid Polysulfide Polymers for Chemical- and Solvent-Resistant Sealants," ASI, www.adhesivesmag.com, Aug. 2018, pp. 19-23 (6 pages).

"D.E.R. 332 Liquid Epoxy Resin," Dow (Dow Plastics), Oct. 2001 (2 pages).

(56) References Cited

OTHER PUBLICATIONS

Office Action issued in corresponding U.S. Appl. No. 17/036,869; dated Mar. 2, 2022 (44 pages).
Extended European Search Report issued in corresponding European Application No. 19775340.3; mailed Dec. 15, 2021 (8 pages).
International Preliminary Report on Patentability issued in corresponding International Application No. PCT/JP2019/013710; mailed Oct. 15, 2020 (11 pages).
International Search Report on Patentability issued in corresponding International Application No. PCT/JP2019/013710; mailed Jun. 18, 2019 (2 pages).
International Preliminary Report on Patentability issued in corresponding International Application No. PCT/JP2020/036313; dated Dec. 1, 2020 (7 pages).
International Search Report on Patentability issued in corresponding International Application No. PCT/JP2020/036313; mailed Dec. 1, 2020 (4 pages).
Extended European Search Report issued in related European Application No. 20779224.3; dated Nov. 18, 2022 (7 pages).
Extended European Search Report issued in related European Application No. 20777366.4; dated Nov. 15, 2022 (6 pages).
Office Action issued in related U.S. Appl. No. 17/036,869 dated Jan. 25, 2023 (79 pages).
Mitsubishi Chemical Corporation, "jER TM Epoxy resins", Apr. 2021 (11 pages).
Final Office Action issued in corresponding U.S. Appl. No. 17/036,869, dated Jul. 10, 2023, 40 pages.
Office Action issued in corresponding Japanese Applicaiton No. 2021-509698 dated Sep. 19, 2023 (9 pages).
Extended European Search Report issued in related European Application No. 20867849.0 dated Sep. 8, 2023 (8 pages).
Office Action issued in corresponding Chinese Patent Application No. 202080024033.3, dated Oct. 26, 2023, with translation (7 pages).
Advisory Action issued in U.S. Appl. No. 17/036,869, dated Nov. 2, 2023 (8 pages).
Office Action issued in corresponding Chinese Patent Application No. 202080025049.6, dated Nov. 25, 2023 (14 pages).
Non-Final Office Action issued in related U.S. Appl. No. 17/036,869, dated Dec. 18, 2023 (34 pages).
Office Action issued in corresponding Japanese Application No. 2021-509698 dated Feb. 27, 2024 (4 pages).
Office Action issued in corresponding Chinese Patent Application No. 202080062288.9, dated Mar. 20, 2024 (19 pages).
Office Action issued in corresponding U.S. Appl. No. 17/036,869, dated May 24, 2024 (41 pages).
Office Action issued in corresponding U.S. Appl. No. 17/485,782, dated Jun. 10, 2024 (62 pages).
Advisory Action issued in related U.S. Appl. No. 17/036,869, dated Aug. 15, 2024 (6 pages).
Written Opinion issued in corresponding International Application No. PCT/JP2022/030280, dated Oct. 25, 2022 (11 pages).
International Search Report issued in corresponding International Application No. PCT/JP2022/030280, dated Oct. 25, 2022 (4 pages).
Office Action issued in related Japanese Application No. 2021-509700 dated Sep. 19, 2023 (7 pages).
Office Action issued in related U.S. Appl. No. 17/486,036, dated Dec. 3, 2024 (51 pages).
Office Action isseud in related U.S. Appl. No. 17/486,036, dated Sep. 5, 2024 (8 pages).
Office Action isseud in related U.S. Appl. No. 17/485,782, dated Nov. 26, 2024 (16 pages).
Sigma Aldrich, "Thermal Transitions of Homopolymers: Glass Transition & Melting Point" (Year: 2024) (7 pages).
Dow GMA, Product Datasheet (Year: 2024) (2 pages).
Epikote 828 Technical Data Sheet (Year: 2007) (2 pages).
Office Action issued in related U.S. Appl. No. 17/486,036, dated May 2, 2025 (19 pages).
Office Action issued in related U.S. Appl. No. 17/486,166, dated May 8, 2025 (87 pages).
Office Action issued in related U.S. Appl. No. 17/485,782, dated Jun. 17, 2025 (20 pages).
Advisory Action issued in related U.S. Appl. No. 17/486,036, dated Jul. 16, 2025 (5 pages).
ELEC-F Safety Data Sheet, Kao Corporation; Nov. 5, 2020 (Year: 2020) (9 pages).
Office Action issued in related U.S. Appl. No. 17/698,248, dated Jul. 1, 2025 (98 pages).

* cited by examiner

RESIN COMPOSITION AND USE FOR SAME

TECHNICAL FIELD

One or more embodiments of the present invention relates to a resin composition and use thereof.

BACKGROUND

Thermosetting resins have various kinds of excellent properties such as high heat resistance and high mechanical strength, and therefore are used in various fields. Out of the thermosetting resins, epoxy resins are used for a wide variety of purposes, as matrix resins for, for example, sealants for electronic circuits, paints, adhesive agents, and fiber-reinforced materials. The epoxy resins have excellent heat resistance, chemical resistance, insulating properties, and the like, but are insufficient in impact resistance which is a characteristic of thermosetting resins. One widely used method to improve the impact resistance of a thermosetting resin is to add an elastomer to the thermosetting resin.

Examples of the elastomer encompass fine polymer particles (for example, fine crosslinked polymer particles). It is easy to simply mix the fine polymer particles and the thermosetting resin (for example, epoxy resin). The fine polymer particles and the thermosetting resin are mixed, for example, in the following manner. Several fine polymer particles each of which has a particle size of less than 1 μm are collected to prepare a powdery and/or granular material of the fine polymer particles which has a particle size of not less than 1 μm. Thereafter, the powdery and/or granular material and the thermosetting resin are mechanically mixed. Note that a powdery and/or granular material of fine polymer particles, which is prepared by collecting several fine polymer particles in this manner, is referred to as secondary particles. Note also that fine polymer particles themselves, each of which has a particle size of less than 1 μm before being processed into a powdery and/or granular material, are referred to as primary particles. By the above mixing method, it is possible to disperse secondary particles of the fine polymer particles in the thermosetting resin. However, it is extremely difficult, at an industrial level, to disperse, in the thermosetting resin, primary particles of the fine polymer particles, each of which has a particle size of less than 1 μm.

In a case where the secondary particles (powdery and/or granular material) of the fine polymer particles and the thermosetting resin are mechanically mixed as described above to obtain a resin composition, the primary particles of the fine polymer particles remain agglutinating in the resin composition. Therefore, the surface appearance of a cured product obtained by curing the obtained resin composition is extremely poor. Therefore, various production methods have been proposed in each of which the fine polymer particles are dispersed in the form of the primary particles in the thermosetting resin.

Patent Literature 1 discloses a production method in which rubbery polymer particles (A) (fine polymer particles) are dispersed in a polymerizable organic compound (H) (thermosetting resin) with use of a solvent.

Patent Literature 2 discloses a production method in which a crosslinked rubbery copolymer (fine polymer particles) is dispersed in a compound (thermosetting resin) containing an epoxy group, with use of a dehydrated resin but without use of a solvent.

Patent Literature 3 discloses an epoxy resin composition which is obtained by (i) introducing an epoxy resin and a latex of a core/shell crosslinked copolymer into a flask equipped with a stirrer and (ii) carrying out distillation under reduced pressure while stirring a resultant mixture.

PATENT LITERATURE

[Patent Literature 1]
PCT International Publication No. WO 2005/028546
[Patent Literature 2]
Japanese Patent Application Publication, Tokukaihei, No. 5-339471
[Patent Literature 3]
Japanese Patent Application Publication, Tokukaihei, No. 8-183836

However, conventional techniques as described above are not sufficient from the viewpoint of an environmental load or the dispersibility of fine polymer particles in a resin composition, and therefore have room for further improvement.

SUMMARY

One or more embodiments of the present invention have been made in view of the above, and to provide a novel resin composition which imposes a reduced environmental load and which is excellent in dispersibility of fine polymer particles.

As a result of conducting diligent studies in order to attain the above, the inventors of one or more embodiments of the present invention found it possible to provide a resin composition which imposes a reduced environmental load and which is excellent in dispersibility of fine polymer particles, and ultimately completed one or more embodiments of the present invention.

That is, a method of producing a resin composition in accordance with one or more embodiments of the present invention is a method of producing a resin composition, including: a step 1 of obtaining an aqueous latex containing fine polymer particles (A) and an emulsifying agent (C); a step of obtaining, with use of the aqueous latex, slurry containing a coagulate of the fine polymer particles (A); a step 3 of taking out the coagulate from the slurry and adjusting a water content of the coagulate to not less than 10% with respect to a weight of the coagulate; and a step 4 of mixing the coagulate and a thermosetting resin (B), the fine polymer particles (A) containing a rubber-containing graft copolymer having an elastic body and a graft part grafted to the elastic body, the graft part being a polymer containing at least one type of structural unit derived from at least one type of monomer selected from the group consisting of aromatic vinyl monomers, vinyl cyanide monomers, and (meth)acrylate monomers, the step 2 further including a step of adding a resin (E) to the aqueous latex, the resin (E) being a liquid having a viscosity of 100 mPa·s to 1,000,000 mPa·s at 25° C., a semisolid, or a solid.

A resin composition in accordance with one or more embodiments of the present invention is a resin composition containing water, fine polymer particles (A), and a thermosetting resin (B), the fine polymer particles (A) containing a rubber-containing graft copolymer having an elastic body and a graft part grafted to the elastic body, the elastic body including at least one type of elastic body selected from the group consisting of diene-based rubbers, (meth)acrylate-based rubbers, and polysiloxane rubber-based elastic bodies, the graft part being a polymer containing at least one type of structural unit derived from at least one type of monomer selected from the group consisting of aromatic vinyl monomers, vinyl cyanide monomers, and (meth)acrylate monomers, the thermosetting resin (B) including at least one type of thermosetting resin selected from the group consisting of: resins each containing a polymer obtained by polymerizing an ethylenically unsaturated monomer; epoxy resins; phenolic resins; polyol resins; and amino-formaldehyde resins, the resin composition containing the fine polymer particles (A) in an amount of 1% by weight to 50% by weight and the thermosetting resin (B) in an amount of 50% by weight to 99% by weight, wherein 100% by weight represents a total amount of the fine polymer particles (A) and the thermosetting resin (B), the resin composition having a water content of 2000 ppm to 40000 ppm with respect to a weight of the resin composition, the resin composition not substantially containing an organic solvent, the resin composition containing sulfur (S) in an amount of not more than 2300 ppm and phosphorus (P) in an amount of not more than 1200 ppm, wherein the wording "not substantially containing an organic solvent" means that an amount of the organic solvent contained in the resin composition is not more than 100 ppm with respect to the weight of the resin composition.

A cured product in accordance with one or more embodiments of the present invention is a cured product obtained by curing a resin composition in accordance with one or more embodiments of the present invention.

An adhesive agent in accordance with one or more embodiments of the present invention is an adhesive agent containing a resin composition in accordance with one or more embodiments of the present invention.

According to one or more embodiments of the present invention, it is possible to provide a resin composition which imposes a reduced environmental load and which is excellent in dispersibility of fine polymer particles.

DETAILED DESCRIPTION OF THE EMBODIMENTS

The following description will discuss one or more embodiments of the present invention. The present invention is not, however, limited to these embodiments. The present invention is not limited to the configurations described below, but may be altered in various ways within the scope of the claims. The present invention also encompasses, in its technical scope, any embodiment or example derived by combining technical means disclosed in differing embodiments and Examples. Further, it is possible to form a new technical feature by combining the technical means disclosed in various embodiments. All academic and patent documents cited in the present specification are incorporated herein by reference. Any numerical range expressed as "A to B" in the present specification means "not less than A and not more than B (i.e., a range from A to B which includes both A and B)" unless otherwise stated.

1. Technical Idea of One or More Embodiments of the Present Invention

As a result of conducting diligent studies, the inventors of one or more embodiments of the present invention found that the techniques disclosed in the prior art documents listed above (Patent Literatures 1 and 2) have room for improvement as indicated below.

According to the technique disclosed in Patent Literature 1, it is possible to obtain a resin composition which contains considerably decreased amounts of impurities which are derived from polymer particles, such as an emulsifying agent and an electrolyte. However, the inventors of one or more embodiments of the present invention uniquely found that the technique disclosed in Patent Literature 1 has room for further improvement from the viewpoint of an environmental load and costs.

According to the technique disclosed in Patent Literature 2, no solvent is used. However, as a result of studying the technique disclosed in Patent Literature 2, the inventors of one or more embodiments of the present invention uniquely found that, according to the method disclosed in Patent Literature 2, a crosslinked rubbery copolymer having no core-shell structure as disclosed in Patent Literature 2 is poor in dispersibility in a compound (thermosetting resin) containing an epoxy group.

Further, the technique disclosed in Patent Literature 4 does not have a step of taking out a coagulate of a core/shell crosslinked copolymer from a latex of the core/shell crosslinked copolymer. The inventors of one or more embodiments of the present invention uniquely found that, according to the technique disclosed in Patent Literature 4, a substance derived from an emulsifying agent remains in a large amount in an obtained epoxy resin composition. Furthermore, the inventors of one or more embodiments of the present invention uniquely found that a resin composition in which a substance derived from an emulsifying agent remains in a large amount cannot sufficiently achieve various physical properties and various performances which are brought about by fine polymer particles (A) and a thermosetting resin (B) in the resin composition.

As a result of conducting diligent studies, the inventors of one or more embodiments of the present invention completed one or more embodiments of the present invention. Specifically, the inventors of one or more embodiments of the present invention uniquely found it possible to obtain, without use of a solvent, a resin composition in which fine polymer particles are well dispersed in a thermosetting resin, through a step of adjusting, to a specific content, a water content of a coagulate of the fine polymer particles which is obtained with use of an aqueous latex containing the fine polymer particles.

2. Resin Composition

A resin composition in accordance with one or more embodiments of the present invention is a resin composition containing water, fine polymer particles (A), and a thermosetting resin (B). The fine polymer particles (A) contain a rubber-containing graft copolymer having an elastic body and a graft part grafted to the elastic body. The elastic body includes at least one type of elastic body selected from the group consisting of diene-based rubbers, (meth)acrylate-based rubbers, and polysiloxane rubber-based elastic bodies. The graft part is a polymer containing at least one type of structural unit derived from at least one type of monomer selected from the group consisting of aromatic vinyl monomers, vinyl cyanide monomers, and (meth)acrylate monomers. The thermosetting resin (B) includes at least one type of thermosetting resin selected from the group consisting of: resins each containing a polymer obtained by polymerizing an ethylenically unsaturated monomer; epoxy resins; phenolic resins; polyol resins; and amino-formaldehyde resins. The resin composition in accordance with one or more embodiments of the present invention contains the fine polymer particles (A) in an amount of 1% by weight to 50% by weight and the thermosetting resin (B) in an amount of 50% by weight to 99% by weight, wherein 100% by weight represents the total amount of the fine polymer particles (A) and the thermosetting resin (B). The resin composition in accordance with one or more embodiments of the present invention has a water content of 2000 ppm to 40000 ppm with respect to the weight of the resin composition. The resin composition in accordance with one or more embodiments of the present invention does not substantially contain an organic solvent. The resin composition in accordance with one or more embodiments of the present invention contains sulfur (S) in an amount of not more than 2300 ppm and phosphorus (P) in an amount of not more than 1200 ppm. In the present specification, the wording "not substantially contain an organic solvent" means that the amount of the organic solvent contained in the resin composition is not more than 100 ppm with respect to the weight of the resin composition.

The resin composition in accordance with one or more embodiments of the present invention is also simply referred to as a present resin composition.

The present resin composition has the above feature, and is therefore excellent in dispersibility of the fine polymer particles (A) in the thermosetting resin (B). Consequently, the present resin composition can provide a cured product which has an excellent surface appearance. In addition, the present resin composition does not substantially contain an organic solvent, and therefore imposes a reduced environmental load.

The present resin composition contains small amounts of sulfur (S) and phosphorus (P). Consequently, the present resin composition can well achieve various physical properties and various performances which are brought about by the fine polymer particles (A) and the thermosetting resin (B) in the resin composition.

Since the present resin composition contains the thermosetting resin (B), it is possible to obtain a cured product by curing the resin composition. Thus, the cured product obtained by curing the present resin composition is also encompassed in the scope of one or more embodiments of the present invention.

Each component contained in the present resin composition will be described below, and then the physical properties of the present resin composition will be described.

(2-1. Fine Polymer Particles (A))
(2-1-1. Elastic Body)

The elastic body may include at least one type of elastic body selected from the group consisting of diene-based rubbers, (meth)acrylate-based rubbers, and polysiloxane rubber-based elastic bodies. The elastic body can also be referred to as rubber particles. In the present specification, (meth)acrylate means acrylate and/or methacrylate.

A case where the elastic body includes a diene-based rubber (case A) will be described. In the case A, the resin composition to be obtained can provide a cured product which has excellent toughness and impact resistance.

The diene-based rubber is an elastic body containing a structural unit derived from a diene-based monomer. The diene-based monomer can also be referred to as a conjugated diene-based monomer. In the case A, the diene-based rubber may contain (i) the structural unit derived from the diene-based monomer in an amount of 50% by weight to 100% by weight and (ii) a structural unit derived from a vinyl-based monomer, which is different from the diene-based monomer and which is copolymerizable with the diene-based monomer, in an amount of 0% by weight to 50% by weight, with respect to 100% by weight of structural units. In the case A, the diene-based rubber may contain a structural unit derived from a (meth)acrylate-based monomer in an amount smaller than the amount of the structural unit derived from the diene-based monomer.

Examples of the diene-based monomer encompass 1,3-butadiene, isoprene (2-methyl-1,3-butadiene), and 2-chloro-1,3-butadiene. These diene-based monomers may be used alone or in combination of two or more.

Examples of the vinyl-based monomer which is different from the diene-based monomer and which is copolymerizable with the diene-based monomer (hereinafter also referred to as vinyl-based monomer A) encompass (a) vinyl arenes such as styrene, α-methylstyrene, monochlorostyrene, and dichlorostyrene, (b) vinyl carboxylic acids such as acrylic acid and methacrylic acid, (c) vinyl cyanides such as acrylonitrile and methacrylonitrile, (d) vinyl halides such as vinyl chloride, vinyl bromide, and chloroprene, (e) vinyl acetate, (f) alkenes such as ethylene, propylene, butylene, and isobutylene, and (g) polyfunctional monomers such as diallylphthalate, triallyl cyanurate, triallyl isocyanurate, and divinylbenzene. These vinyl-based monomers A may be used alone or in combination of two or more. Out of these vinyl-based monomers A, styrene is particularly preferable. Note that, in the diene-based rubber in the case A, the structural unit derived from the vinyl-based monomer A is an optional component. Note that, in the case A, the diene-based rubber may be constituted by only the structural unit derived from the diene-based monomer.

In the case A, the diene-based rubber may be (i) butadiene rubber which is constituted by a structural unit derived from 1,3-butadiene (also referred to as polybutadiene rubber) or (ii) butadiene-styrene rubber which is a copolymer of 1,3-butadiene and styrene (also referred to as polystyrene-butadiene). The diene-based rubber is butadiene rubber. According to the above feature, since the fine polymer particles (A) contain the diene-based rubber, a desired effect can be more brought about. The butadiene-styrene rubber is more preferable in that the butadiene-styrene rubber makes it possible to, by adjustment of a refractive index, increase the transparency of a cured product to be obtained.

A case where the elastic body includes a (meth)acrylate-based rubber (case B) will be described. The case B allows wide-ranging polymer design for the elastic body by combinations of many types of monomers.

The (meth)acrylate-based rubber is an elastic body containing a structural unit derived from a (meth)acrylate-based monomer. In the case B, the (meth)acrylate-based rubber may contain (i) the structural unit derived from the (meth)acrylate-based monomer in an amount of 50% by weight to 100% by weight and (ii) a structural unit derived from a vinyl-based monomer, which is different from the (meth)acrylate-based monomer and which is copolymerizable with the (meth)acrylate-based monomer, in an amount of 0% by weight to 50% by weight, with respect to 100% by weight of structural units. In the case B, the (meth)acrylate-based rubber may contain a structural unit derived from a diene-based monomer in an amount smaller than the amount of the structural unit derived from the (meth)acrylate-based monomer.

Examples of the (meth)acrylate-based monomer encompass (a) alkyl (meth)acrylates such as methyl (meth)acrylate, ethyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate, (b) aromatic ring-containing (meth)acrylates such as phenoxyethyl (meth)acrylate and benzyl (meth)acrylate, (c) hydroxyalkyl (meth)acrylates such as 2-hydroxyethyl (meth)acrylate and 4-hydroxybutyl (meth)acrylate, (d) glycidyl (meth)acrylates such as glycidyl (meth)acrylate and glycidyl alkyl (meth)acrylate, (e) alkoxy alkyl (meth)acrylates, (f) allyl alkyl (meth)acrylates such as allyl (meth)acrylate and allyl alkyl (meth)acrylate, and (g) polyfunctional (meth)acrylates such as monoethylene glycol di(meth)acrylate, triethylene glycol di(meth)acrylate, and tetraethylene glycol di(meth) acrylate. These (meth)acrylate-based monomers may be used alone or in combination of two or more. Out of these (meth)acrylate-based monomers, ethyl (meth)acrylate, butyl (meth)acrylate, and 2-ethylhexyl (meth)acrylate are particularly preferable.

Examples of the vinyl-based monomer which is different from the (meth)acrylate-based monomer and which is copolymerizable with the (meth)acrylate-based monomer (hereinafter also referred to as vinyl-based monomer B) encompass the monomers listed as the examples of the vinyl-based monomer A. Such vinyl-based monomers B may be used alone or in combination of two or more. Out of such vinyl-based monomers B, styrene is particularly preferable. Note that, in the (meth)acrylate-based rubber in the case B, the structural unit derived from the vinyl-based monomer B is an optional component. Note that, in the case B, the (meth)acrylate-based rubber may be constituted by only the structural unit derived from the (meth)acrylate-based monomer.

A case where the elastic body includes a polysiloxane rubber-based elastic body (case C) will be described. In the case C, the resin composition to be obtained can provide a cured product which has sufficient heat resistance and which has excellent impact resistance at low temperatures.

Example of the polysiloxane rubber-based elastic body encompass (a) polysiloxane-based polymers composed of alkyl or aryl disubstituted silyloxy units, such as dimethylsilyloxy, diethylsilyloxy, methylphenylsilyloxy, diphenylsilyloxy, and dimethylsilyloxy-diphenylsilyloxy, and (b) polysiloxane-based polymers composed of alkyl or aryl monosubstituted silyloxy units, such as organohydrogensilyloxy in which some of sidechain alkyls have been substituted with a hydrogen atom. These polysiloxane-based polymers may be used alone or in combination of two or more. Out of these polysiloxane-based polymers, (a) a polymer composed of a dimethylsilyloxy unit, a methylphenylsilyloxy unit, and/or a dimethylsilyloxy-diphenylsilyloxy unit is preferable because the resin composition to be obtained can provide a cured product which has excellent heat resistance, and (b) a polymer composed of a dimethylsilyloxy unit is most preferable because it can be easily acquired and is economical.

In the case C, the fine polymer particles (A) may contain the polysiloxane rubber-based elastic body in an amount of not less than 80% by weight, not less than 90% by weight, with respect to 100% by weight of the elastic body contained in the fine polymer particles (A). According to the above feature, the resin composition to be obtained can provide a cured product which has excellent heat resistance.

The elastic body may further include an elastic body other than the diene-based rubber, the (meth)acrylate-based rubber, and the polysiloxane rubber-based elastic body. Examples of the elastic body other than the diene-based rubber, the (meth)acrylate-based rubber, and the polysiloxane rubber-based elastic body encompass natural rubber.

(Crosslinked Structure of Elastic Body)

The elastic body may have a crosslinked structure introduced therein, in order that stable dispersion of the fine polymer particles (A) in the thermosetting resin (B) can be maintained. A generally known method may be used to introduce the crosslinked structure into the elastic body. Examples of the generally known method encompass the following. That is, in production of the elastic body, a crosslinking monomer(s), such as a polyfunctional monomer and/or a mercapto group-containing compound, is/are mixed with a monomer which can constitute the elastic body, and then polymerization is carried out. In the present specification, producing a polymer such as the elastic body is also referred to as forming a polymer by polymerization.

Examples of a method of introducing the crosslinked structure into the polysiloxane rubber-based elastic body encompass: (a) a method that involves also partially using a polyfunctional alkoxysilane compound together with another material during formation of the polysiloxane rubber-based elastic body by polymerization, (b) a method that involves introducing into the polysiloxane rubber-based elastic body a reactive group such as a reactive vinyl group or a mercapto group, thereafter adding e.g. an organic peroxide or a polymerizable vinyl monomer, and carrying out a radical reaction, and (c) a method that involves, during formation of the polysiloxane rubber-based elastic body by polymerization, mixing a crosslinking monomer(s), such as a polyfunctional monomer and/or a mercapto group-containing compound, together with another material and then carrying out polymerization.

It can also be said that the polyfunctional monomer is a monomer having two or more radical-polymerizable reactive groups in an identical molecule. The radical-polymerizable reactive groups may be each a carbon-carbon double bond. Examples of the polyfunctional monomer do not include butadiene. The polyfunctional monomer is, for example, a (meth)acrylate having an ethylenically unsaturated double bond(s), such as allyl (meth)acrylate (for example, allyl alkyl (meth)acrylates and allyloxy alkyl (meth)acrylates). Examples of a monomer having two (meth)acrylic groups encompass ethylene glycol di(meth)acrylate, butylene glycol di(meth)acrylate, butanediol di(meth)acrylate, hexanediol di(meth)acrylate, cyclohexane dimethanol di(meth)acrylate, and polyethylene glycol di(meth)acrylates. Examples of the polyethylene glycol di(meth)acrylates encompass triethylene glycol di(meth)acrylate, tripropylene glycol di(meth)acrylate, tetraethylene glycol di(meth)acrylate, and polyethylene glycol (600) di(meth)acrylate. Examples of a monomer having three (meth)acrylate groups encompass alkoxylated trimethylolpropane tri(meth)acrylates, glycerol propoxy tri(meth)acrylate, pentaerythritol tri(meth)acrylate, and tris(2-hydroxyethyl)isocyanurate tri(meth)acrylate. Examples of the alkoxylated trimethylolpropane tri(meth)acrylates encompass trimethylolpropane tri(meth)acrylate and trimethylolpropane triethoxy tri(meth)acrylate. Examples of a monomer having four (meth)acrylic groups encompass pentaerythritol tetra(meth)acrylate and ditrimethylolpropane tetra(meth)acrylate. Examples of a monomer having five (meth)acrylic groups encompass dipentaerythritol penta(meth)acrylate. Examples of a monomer having six (meth) acrylic groups encompass ditrimethylolpropane hexa(meth)acrylate. Examples of the polyfunctional monomer further encompass diallylphthalate, triallyl cyanurate, triallyl isocyanurate, and divinylbenzene.

Examples of the mercapto group-containing compound encompass alkyl group-substituted mercaptan, allyl group-substituted mercaptan, aryl group-substituted mercaptan, hydroxy group-substituted mercaptan, alkoxy group-substituted mercaptan, cyano group-substituted mercaptan, amino group-substituted mercaptan, silyl group-substituted mercaptan, acid radical-substituted mercaptan, halo group-substituted mercaptan, and acyl group-substituted mercaptan. The alkyl group-substituted mercaptan may be alkyl group-substituted mercaptan having 1 to 20 carbon atoms, and may be alkyl group-substituted mercaptan having 1 to 10 carbon atoms. The aryl group-substituted mercaptan may be phenyl group-substituted mercaptan. The alkoxy group-substituted mercaptan may be alkoxy group-substituted mercaptan having 1 to 20 carbon atoms, and is alkoxy group-substituted mercaptan having 1 to 10 carbon atoms. The acid radical-substituted mercaptan may be alkyl group-substituted mercaptan having a carboxyl group and 1 to 10 carbon atoms or aryl group-substituted mercaptan having a carboxyl group and 1 to 12 carbon atoms.

(Glass Transition Temperature of Elastic Body)

In view of obtainment of a cured product which has excellent toughness, the elastic body may have a glass transition temperature (hereinafter may be simply referred to as "Tg") of not higher than 80° C., not higher than 70° C., not higher than 60° C., not higher than 50° C., not higher than 40° C., not higher than 30° C., not higher than 20° C., not higher than 10° C., not higher than 0° C., not higher than –20° C., not higher than –40° C., not higher than –45° C., not higher than –50° C., not higher than –55° C., not higher than –60° C., not higher than –65° C., not higher than –70° C., not higher than –75° C., not higher than –80° C., not higher than –85° C., not higher than –90° C., not higher than –95° C., not higher than –100° C., not higher than –105° C., not higher than –110° C., not higher than –115° C., not higher than –120° C., or not higher than –125° C.

In view of prevention of a decrease in elastic modulus (i.e., a decrease in rigidity) of a cured product to be obtained, i.e., in view of obtainment of a cured product which has a sufficient elastic modulus (rigidity), the Tg of the elastic body may be higher than 0° C., not lower than 20° C., not lower than 50° C., not lower than 80° C., or not lower than 120° C.

The Tg of the elastic body can be determined by, for example, the composition of the structural unit contained in the elastic body. In other words, it is possible to adjust the Tg of the elastic body to be obtained, by changing the composition of the monomer used to produce (form) the elastic body.

Note, here, that in a case where only one type of monomer is polymerized, a homopolymer is obtained, and, in this case, a group of monomers each of which provides a homopolymer having a Tg higher than 0° C. will be referred to as a monomer group "a". Note also that in a case where only one type of monomer is polymerized, a homopolymer is obtained, and, in this case, a group of monomers each of which provides a homopolymer having a Tg lower than 0° C. will be referred to as a monomer group "b". Note also that an elastic body containing (i) at least one type of structural unit derived from at least one type of monomer selected from the monomer group "a" in an amount of 50% by weight to 100% by weight (65% by weight to 99% by weight) and (ii) at least one type of structural unit derived from at least one type of monomer selected from the monomer group "b" in an amount of 0% by weight to 50% by weight (1% by weight to 35% by weight) will be referred to as an elastic body X. The elastic body X has a Tg higher than 0° C. In a case where the elastic body includes the elastic body X, the resin composition to be obtained can provide a cured product which has sufficient rigidity.

Also in a case where the Tg of the elastic body is higher than 0° C., it is preferable that the crosslinked structure be introduced in the elastic body. Examples of a method of introducing the crosslinked structure into the elastic body encompass the above-described methods.

The Tg of the elastic body can be obtained by carrying out viscoelasticity measurement with use of a planar plate made of the fine polymer particles (A). Specifically, the Tg of the elastic body can be measured as follows: (1) a graph of tan δ is obtained by carrying out dynamic viscoelasticity measurement with respect to a planar plate made of the fine polymer particles (A), with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature of the elastic body. Note, here, that in a case where a plurality of peaks are found in the graph of tan δ, the lowest peak temperature is regarded as the glass transition temperature of the elastic body.

Examples of the monomers which can be included in the monomer group "a" encompass, but not limited to, unsubstituted vinyl aromatic compounds such as styrene and 2-vinyl naphthalene; vinyl-substituted aromatic compounds such as α-methyl styrene; ring-alkylated vinyl aromatic compounds such as 3-methylstyrene, 4-methylstyrene, 2,4-dimethylstyrene, 2,5-dimethylstyrene, 3,5-dimethylstyrene, and 2,4,6-trimethylstyrene; ring-alkoxylated vinyl aromatic compounds such as 4-methoxystyrene and 4-ethoxystyrene; ring-halogenated vinyl aromatic compounds such as 2-chlorostyrene and 3-chlorostyrene; ring-ester-substituted vinyl aromatic compounds such as 4-acetoxy styrene; ring-hydroxylated vinyl aromatic compounds such as 4-hydroxystyrene; vinyl esters such as vinyl benzoate and vinyl cyclohexanoate; vinyl halides such as vinyl chloride; aromatic monomers such as acenaphthalene and indene; alkyl methacrylates such as methyl methacrylate, ethyl methacrylate, and isopropyl methacrylate; aromatic methacrylates such as phenyl methacrylate; methacrylates such as isobornyl methacrylate and trimethylsilyl methacrylate; methacrylic acid derivative-containing methacryl monomers such as methacrylonitrile; certain types of acrylic acid esters such as isobornyl acrylate and tert-butyl acrylate; and acrylic acid derivative-containing acrylic monomers such as acrylonitrile. Examples of the monomers which can be included in the monomer group "a" further encompass monomers each of which, when polymerized, can provide a homopolymer having a Tg of not lower than 120° C., such as acrylamide, isopropyl acrylamide, N-vinylpyrrolidone, isobornyl methacrylate, dicyclopentanyl methacrylate, 2-methyl-2-adamanthyl methacrylate, 1-adamanthyl acrylate, and 1-adamanthyl methacrylate. These monomers "a" may be used alone or in combination of two or more.

Examples of monomers "b" encompass ethyl acrylate, butyl acrylate, 2-ethylhexyl acrylate, octyl (meth)acrylate, dodecyl (meth)acrylate, 2-hydroxyethyl acrylate, and 4-hydroxybutyl acrylate. These monomers "b" may be used alone or in combination of two or more. Out of these monomers "b", ethyl acrylate, butyl acrylate, and 2 ethylhexyl acrylate are particularly preferable.

(Volume-Average Particle Size of Elastic Body)

The elastic body may have a volume-average particle size of 0.03 μm to 50.00 μm, 0.03 μm to 10.00 μm, 0.03 μm to 2.00 μm, 0.05 μm to 1.00 μm, 0.08 μm to 1.00 μm, 0.10 μm to 0.80 μm, or 0.10 μm to 0.50 μm. In a case where the volume-average particle size of the elastic body is not less than 0.03 μm, the elastic body which has a desired volume-average particle size can be stably obtained. In a case where the volume-average particle size of the elastic body is not more than 50.00 μm, a cured product to be obtained has favorable heat resistance and impact resistance. The volume-average particle size of the elastic body can be measured with use of a dynamic light scattering type particle size distribution measurement apparatus using, as a test specimen, an aqueous latex containing the elastic body. The volume-average particle size of the elastic body will be described in detail in Examples below.

(Proportion of Elastic Body)

The proportion of the elastic body contained in the fine polymer particles (A) may be 40% by weight to 97% by weight, 60% by weight to 95% by weight, 70% by weight to 95% by weight, 75% by weight to 95% by weight, 80% by weight to 95% by weight, or 85% by weight to 93% by weight, wherein 100% by weight represents the entirety of the fine polymer particles (A). In a case where the proportion of the elastic body is not less than 40% by weight, the resin composition to be obtained can provide a cured product which has excellent toughness and impact resistance. In a case where the proportion of the elastic body is not more than 97% by weight, the fine polymer particles (A) do not easily agglutinate (less likely to agglutinate) and, therefore, the resin composition does not have a high viscosity, so that the resin composition to be obtained is easy to handle.

Generally, as the proportion of the elastic body contained in the fine polymer particles (A) increases, the fine polymer particles (A) agglutinate more easily and, accordingly, the dispersibility of the fine polymer particles (A) in a matrix resin tends to become poorer. According to a conventional method of producing a resin composition, in a case where fine polymer particles containing an elastic body at a proportion of not less than 70% by weight with respect to 100% by weight of the fine polymer particles is mixed with a matrix resin to obtain a resin composition, the dispersibility of the fine polymer particles in the matrix resin is poor. According to a method of producing a resin composition in accordance with one or more embodiments of the present invention (later described), even in a case where the fine polymer particles (A) containing the elastic body at a proportion of not less than 70% by weight with respect to 100% by weight of the fine polymer particles (A) is mixed with a matrix resin (C) to produce the resin composition, the dispersibility of the fine polymer particles (A) in the matrix resin (C) is favorable.

(Gel Content of Elastic Body)

The elastic body may be one that can swell in an appropriate solvent but is substantially insoluble in the appropriate solvent. The elastic body may be insoluble in the thermosetting resin (B) used.

The elastic body may have a gel content of not less than 60% by weight, not less than 80% by weight, not less than 90% by weight, or not less than 95% by weight. In a case where the gel content of the elastic body falls within the above range, the resin composition to be obtained can provide a cured product which has excellent toughness.

In the present specification, a method of calculating the gel content is as follows. First, 2.0 g of crumbs obtained by coagulation and drying of the fine polymer particles (A) are dissolved in 50 mL of methyl ethyl ketone (MEK). An MEK solution of the crumbs thus obtained is separated into a part soluble in MEK (MEK-soluble part) and a part insoluble in MEK (MEK-insoluble part). Specifically, the obtained MEK solution of the crumbs is subjected to centrifugal separation with use of a centrifugal separator (CP60E, manufactured by Hitachi Koki Co., Ltd.) at 30000 rpm for 1 hour, and thereby separated into the MEK-soluble part and the MEK-insoluble part. Note, here, that three sets of centrifugal separations are carried out in total. The weight of the MEK-soluble part and the weight of the MEK-insoluble part are measured, and then the gel content is calculated with use of the following expression.

Gel content (%)=(weight of methyl ethyl ketone insoluble part)/{(weight of methyl ethyl ketone insoluble part)+(weight of methyl ethyl ketone soluble part)}×100

Note, here, that a method of obtaining the crumbs of the fine polymer particles (A) is not limited to any particular one. For example, an aqueous latex containing the fine polymer particles (A) is obtained. Next, the crumbs (may be also referred to as a powdery and/or granular material) of the fine polymer particles (A) are obtained from the aqueous latex. A method of obtaining the crumbs of the fine polymer particles (A) from the aqueous latex is not limited to any particular one, and examples thereof encompass a method of obtaining the crumbs of the fine polymer particles (A) by (i) causing the fine polymer particles (A) in the aqueous latex to agglutinate, (ii) dehydrating an agglutinate thus obtained, and (iii) further drying the agglutinate.

(Variations of Elastic Body)

In one or more embodiments of the present invention, the "elastic body" contained in the fine polymer particles (A) may be constituted by only one type of elastic body which has a structural unit having identical composition. In this case, the "elastic body" contained in the fine polymer particles (A) may be constituted by one type of elastic body selected from the group consisting of diene-based rubbers, (meth)acrylate-based rubbers, and organosiloxane-based rubbers.

In the present disclosure, the "elastic body" contained in the fine polymer particles (A) may be constituted by plural types of elastic bodies which have structural units different from each other in composition. In this case, the "elastic body" contained in the fine polymer particles (A) may be constituted by (a) two or more types of elastic bodies selected from the group consisting of diene-based rubbers, (meth)acrylate-based rubbers, and organosiloxane-based rubbers or (b) one type of elastic body selected from the group consisting of diene-based rubbers, (meth)acrylate-based rubbers, and organosiloxane-based rubbers.

In one or more embodiments of the present invention, a case will be described where the "elastic body" contained in the fine polymer particles (A) is constituted by plural types of elastic bodies which have structural units different from each other in composition. In this case, the plural types of elastic bodies will be referred to as an elastic $body_1$, an elastic $body_2$, ... and an elastic $body_n$. Note, here, that "n" is an integer of 2 or more. The "elastic body" contained in the fine polymer particles (A) may include a mixture (also referred to as a composite) obtained by mixing the elastic $body_1$, the elastic $body_2$, ..., and the elastic $body_n$ which are separately formed by polymerization. The "elastic body" contained in the fine polymer particles (A) may include a single polymer (elastic body) obtained by polymerizing the elastic $body_1$, the elastic $body_2$, ..., and the elastic $body_n$ in order. Polymerizing a plurality of polymers (elastic bodies) in order in this manner is also referred to as multistage polymerization. A polymer obtained by multistage polymerization of plural types of elastic bodies is also referred to as a multistage-polymerization elastic body. A method of producing a multistage-polymerization elastic body will be later described in detail.

A multistage-polymerization elastic body constituted by the elastic $body_1$, the elastic $body_2$, ... and the elastic $body_n$ will be described. In the multistage-polymerization elastic body, the elastic $body_n$ can cover at least part of an elastic $body_{n-1}$ or the whole of the elastic $body_{n-1}$. In the multistage-polymerization elastic body, part of the elastic $body_n$ may be located inside the elastic $body_{n-1}$.

In the multistage-polymerization elastic body, each of the elastic bodies may form a layer structure. For example, in a case where the multistage-polymerization elastic body is constituted by the elastic body$_1$, the elastic body$_2$, and an elastic body$_3$, aspects of one or more embodiments of the present invention also include an aspect such that the elastic body$_1$ forms the innermost layer, a layer of the elastic body$_2$ is formed on the outer side of the elastic body$_1$, and a layer of the elastic body$_3$ is formed on the outer side of the layer of the elastic body$_2$ as the outermost layer of the elastic body. Thus, it can also be said that the multistage-polymerization elastic body in which each of the elastic bodies forms a layer structure is a multilayered elastic body. In other words, in one or more embodiments of the present invention, the "elastic body" contained in the fine polymer particles (A) may include a mixture (composite) of plural types of elastic bodies, a multistage-polymerization elastic body, and/or a multilayered elastic body.

(2-1-2. Graft Part)

In the present specification, a polymer grafted to the elastic body is referred to as a graft part. The graft part is a polymer containing at least one type of structural unit derived from at least one type of monomer selected from the group consisting of aromatic vinyl monomers, vinyl cyanide monomers, and (meth)acrylate monomers. The graft part has the above feature, and therefore can play various roles. The "various roles" are, for example, (a) improving compatibility between the fine polymer particles (A) and the thermosetting resin (B), (b) improving the dispersibility of the fine polymer particles (A) in the thermosetting resin (B), and (c) allowing the fine polymer particles (A) to be dispersed in the form of primary particles in the resin composition or in a cured product obtained from the resin composition.

Specific examples of the aromatic vinyl monomers encompass styrene, α-methylstyrene, p-methylstyrene, and divinylbenzene.

Specific examples of the vinyl cyanide monomers encompass acrylonitrile and methacrylonitrile.

Specific examples of the (meth)acrylate monomers encompass methyl (meth)acrylate, ethyl (meth)acrylate, butyl (meth)acrylate, hydroxyethyl (meth)acrylate, and hydroxybutyl (meth)acrylate.

The at least one type of monomer selected from the group consisting of aromatic vinyl monomers, vinyl cyanide monomers, and (meth)acrylate monomers may be used alone or in combination of two or more.

The graft part may contain a structural unit derived from an aromatic vinyl monomer, a structural unit derived from a vinyl cyanide monomer, and a structural unit derived from a (meth)acrylate monomer in an amount of 10% by weight to 95% by weight, 30% by weight to 92% by weight, 50% by weight to 90% by weight, 60% by weight to 87% by weight, or 70% by weight to 85% by weight, with respect to 100% by weight of all structural units.

The graft part may contain a structural unit derived from a reactive group-containing monomer. The reactive group-containing monomer may be a monomer containing at least one type of reactive group selected from the group consisting of an epoxy group, an oxetane group, a hydroxyl group, an amino group, an imide group, a carboxylic acid group, a carboxylic anhydride group, cyclic ester, cyclic amide, a benzoxazine group, and a cyanate ester group, and may be a monomer containing at least one type of reactive group selected from the group consisting of an epoxy group, a hydroxy group, and a carboxylic acid group. According to the above feature, it is possible to chemically bond (i) the graft part contained in the fine polymer particles (A) and (ii) the thermosetting resin (B) in the resin composition. Thus, in the resin composition or in a cured product obtained from the resin composition, it is possible to maintain a favorable state of dispersion of the fine polymer particles (A) without causing the fine polymer particles (A) to agglutinate.

Specific examples of a monomer having an epoxy group encompass glycidyl group-containing vinyl monomers such as glycidyl (meth)acrylate, 4-hydroxybutyl (meth)acrylate glycidyl ether, and allyl glycidyl ether.

Specific examples of a monomer having a hydroxyl group encompass: (a) hydroxy straight-chain alkyl (meth)acrylates (in particular, hydroxy straight-chain C1-C6 alkyl(meth) acrylates) such as 2-hydroxyethyl (meth)acrylate, hydroxypropyl (meth)acrylate, and 4-hydroxybutyl (meth)acrylate; (b) caprolactone-modified hydroxy (meth)acrylate; (c) hydroxy branching alkyl (meth)acrylates such as α-(hydroxymethyl) methyl acrylate and α-(hydroxymethyl) ethyl acrylate; and (d) hydroxyl group-containing (meth)acrylates such as a mono (meth)acrylate of a polyester diol (particularly saturated polyester diol) obtained from dicarboxylic acid (e.g. phthalic acid) and dihydric alcohol (e.g. propylene glycol).

Specific examples of a monomer having a carboxylic acid group encompass monocarboxylic acids such as acrylic acid, methacrylic acid, and crotonic acid. Other examples of the monomer encompass dicarboxylic acids such as maleic acid, fumaric acid, and itaconic acid. As the monomer having a carboxylic acid group, the monocarboxylic acid is suitably used.

The above-listed reactive group-containing monomers may be used alone or in combination of two or more.

The graft part may contain the structural unit derived from the reactive group-containing monomer in an amount of 0.5% by weight to 90% by weight, 1% by weight to 50% by weight, 2% by weight to 35% by weight, or 3% by weight to 20% by weight, with respect to 100% by weight of the graft part. In a case where the graft part contains the structural unit derived from the reactive group-containing monomer in an amount of not less than 0.5% by weight with respect to 100% by weight of the graft part, the resin composition to be obtained can provide a cured product which has enough impact resistance. In a case where the graft part contains the structural unit derived from the reactive group-containing monomer in an amount of not more than 90% by weight with respect to 100% by weight of the graft part, the resin composition to be obtained has advantages that (i) the resin composition can provide a cured product which has sufficient impact resistance and (ii) the resin composition has favorable storage stability.

The structural unit derived from the reactive group-containing monomer may be contained in the graft part, and contained only in the graft part.

The graft part may contain a structural unit derived from a polyfunctional monomer. In a case where the graft part contains the structural unit derived from the polyfunctional monomer, there are the following advantages: (a) it is possible to prevent swelling of the fine polymer particles (A) in the resin composition; (b) since the resin composition has a low viscosity, the resin composition tends to have favorable handleability; and (c) the dispersibility of the fine polymer particles (A) in the thermosetting resin (B) is improved.

In a case where the graft part does not contain the structural unit derived from the polyfunctional monomer, the resin composition to be obtained can provide a cured product which has more excellent toughness and impact resistance, as compared to a case where the graft part contains the structural unit derived from the polyfunctional monomer.

Examples of the polyfunctional monomer used to form the graft part by polymerization encompass the above-described polyfunctional monomers. Out of such polyfunctional monomers, examples of a polyfunctional monomer which can be used to form the graft part by polymerization encompass allyl methacrylate, butylene glycol di(meth)acrylate, ethylene glycol di(meth)acrylate, butanediol di(meth)acrylate, hexanediol di(meth)acrylate, cyclohexane dimethanol di(meth)acrylate, and polyethylene glycol di(meth)acrylates. Examples of the polyethylene glycol di(meth)acrylates encompass triethylene glycol di(meth)acrylate, tripropylene glycol di(meth)acrylate, tetraethylene glycol di(meth)acrylate, polyethylene glycol (600) di(meth)acrylate, and triallyl isocyanurate. These polyfunctional monomers may be used alone or in combination of two or more.

The graft part may contain the structural unit derived from the polyfunctional monomer in an amount of 1% by weight to 20% by weight, or 5% by weight to 15% by weight, with respect to 100% by weight of the graft part.

In the formation of the graft part by polymerization, the above-listed monomers may be used alone or in combination of two or more.

The graft part may contain a structural unit derived from another monomer, in addition to the structural units derived from the above-listed monomers.

(Glass Transition Temperature of Graft Part)

The graft part may have a glass transition temperature of not higher than 190° C., not higher than 160° C., not higher than 140° C., not higher than 120° C., not higher than 80° C., not higher than 70° C., not higher than 60° C., not higher than 50° C., not higher than 40° C., not higher than 30° C., not higher than 20° C., not higher than 10° C., not higher than 0° C., not higher than –20° C., not higher than –40° C., not higher than –45° C., not higher than –50° C., not higher than –55° C., not higher than –60° C., not higher than –65° C., not higher than –70° C., not higher than –75° C., not higher than –80° C., not higher than –85° C., not higher than –90° C., not higher than –95° C., not higher than –100° C., not higher than –105° C., not higher than –110° C., not higher than –115° C., not higher than –120° C., or not higher than –125° C.

The glass transition temperature of the graft part may be not lower than 0° C., not lower than 30° C., not lower than 50° C., not lower than 70° C., not lower than 90° C., or not higher than 110° C.

The Tg of the graft part can be determined by, for example, the composition of the structural unit contained in the graft part. In other words, it is possible to adjust the Tg of the graft part to be obtained, by changing the composition of the monomer used to produce (form) the graft part.

The Tg of the graft part can be obtained by carrying out viscoelasticity measurement with use of a planar plate made of the fine polymer particles (A). Specifically, the Tg of the graft part can be measured as follows: (1) a graph of tan δ is obtained by carrying out dynamic viscoelasticity measurement with respect to a planar plate made of the fine polymer particles (A), with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature. Note, here, that in a case where a plurality of peaks are found in the graph of tan δ, the highest peak temperature is regarded as the glass transition temperature of the graft part.

(Graft Rate of Graft Part)

In one or more embodiments of the present invention, the fine polymer particles (A) may have a polymer which is identical in composition to the graft part and which is not grafted to the elastic body. In the present specification, a polymer which is identical in composition to the graft part and which is not grafted to the elastic body may be referred to as a "non-grafted polymer". The non-grafted polymer also constitutes part of the fine polymer particles (A) in accordance with one or more embodiments of the present invention. It can also be said that the non-grafted polymer is one that is not grafted to the elastic body, out of polymers produced during the formation of the graft part by polymerization.

In the present specification, the proportion of (i) a polymer which is grafted to the elastic body to (ii) the polymers produced during the formation of the graft part by polymerization, i.e., the proportion of the graft part, is referred to as a "graft rate". In other words, the graft rate is a value represented by the following expression: (weight of graft part)/(weight of graft part)+(weight of non-grafted polymer)×100.

The graft rate of the graft part may be not less than 70%, not less than 80%, or not less than 90%. In a case where the graft rate is not less than 70%, there is an advantage that the resin composition does not have an excessively high viscosity.

Note that in the present specification, the graft rate is calculated by the following method. First, an aqueous latex containing the fine polymer particles (A) is obtained. Next, a powdery and/or granular material of the fine polymer particles (A) is obtained from the aqueous latex. A specific example of a method of obtaining the powdery and/or granular material of the fine polymer particles (A) from the aqueous latex is a method of obtaining the powdery and/or granular material of the fine polymer particles (A) by (i) causing the fine polymer particles (A) in the aqueous latex to coagulate, (ii) dehydrating a coagulate thus obtained, and (iii) further drying the coagulate. Next, 2 g of the powdery and/or granular material of the fine polymer particles (A) is dissolved in 50 mL of methyl ethyl ketone. An MEK solution of the powdery and/or granular material thus obtained is separated into a part soluble in MEK (MEK-soluble part) and a part insoluble in MEK (MEK-insoluble part). Specifically, the obtained MEK solution of the powdery and/or granular material is subjected to centrifugal separation with use of a centrifugal separator (CP60E, manufactured by Hitachi Koki Co., Ltd.) at 30000 rpm for 1 hour, and thereby separated into the MEK-soluble part and the MEK-insoluble part. Note, here, that three sets of centrifugal separations are carried out in total. Next, 20 mL of a condensed MEK-soluble part is mixed with 200 mL of methanol. Then, an aqueous calcium chloride solution, obtained by dissolving 0.01 g of calcium chloride in water, is added to a resultant mixture, and a mixture thus obtained is stirred for 1 hour. Subsequently, the mixture is separated into a methanol-soluble part and a methanol-insoluble part. The weight of the methanol-insoluble part is used as "the amount of a free polymer" (FP amount).

The graft rate is calculated with use of the following expression:

Graft rate (%)=100−[(FP amount)/{(FP amount)+(weight of MEK-insoluble part)}]/(weight of polymer of graft part)×10000.

Note that the weight of a polymer other than the graft part is the amount of a monomer introduced for formation of the polymer other than the graft part. The polymer other than the graft part is, for example, the elastic body. In a case where the fine polymer particles (A) contain a surface-crosslinked polymer (later described), the polymer other than the graft part includes both the elastic body and the surface-crosslinked polymer. Note that the weight of the polymer of the graft part is the amount of a monomer introduced for formation of the polymer of the graft part. In calculation of the graft rate, a method of causing the fine polymer particles (A) to coagulate is not limited to any particular one, and a method in which a solvent is used, a method in which a coagulant is used, a method in which the aqueous latex is sprayed, or the like can be employed.

(Variations of Graft Part)

In one or more embodiments of the present invention, the graft part may be constituted by only one type of graft part which has a structural unit having identical composition. In one or more embodiments of the present invention, the graft part may be constituted by plural types of graft parts which have structural units different from each other in composition.

In one or more embodiments of the present invention, a case where the graft part is constituted by plural types of graft parts which have structural units different from each other in composition will be described. In this case, the plural types of graft parts will be referred to as a graft part$_1$, a graft part$_2$, . . . a graft part$_n$ ("n" is an integer of 2 or more). The graft part may include a mixture (also referred to as a composite) obtained by mixing the graft part$_1$, graft part$_2$ . . . , and the graft part$_n$ which are separately formed by polymerization. The graft part may include a single polymer obtained by multistage polymerization of the graft parts, graft part$_2$ . . . , and the graft part$_n$. A polymer obtained by multistage polymerization of plural types of graft parts is also referred to as a multistage-polymerization graft part. A method of producing a multistage-polymerization graft part will be later described in detail.

In a case where the graft part is constituted by the plural types of graft parts, all of the plural types of graft parts do not need to be grafted to the elastic body. It is only necessary that at least part of at least one of the plural types of graft parts is grafted to the elastic body. The other of the plural types of graft parts (the other types of graft parts) may be grafted to the at least part of the at least one of the plural types of graft parts which is grafted to the elastic body. In a case where the graft part is constituted by the plural types of graft parts, the graft part may have plural types of polymers which are identical in feature to the plural types of graft parts and which are not grafted to the elastic body (plural types of non-grafted polymers).

The multistage-polymerization graft part constituted by the graft part$_1$, the graft part$_2$, . . . the graft part$_n$ will be described. In the multistage-polymerization graft part, the graft part$_n$ can cover at least part of a graft part$_1$ or the whole of the graft part$_{n-1}$. In the multistage-polymerization graft part, part of the graft part$_n$ may be located inside the graft part$_{n-1}$.

In the multistage-polymerization graft part, each of the graft parts may form a layer structure. For example, in a case where the multistage-polymerization graft part is constituted by the graft part$_1$, the graft part$_2$, and a graft part$_3$, aspects of one or more embodiments of the present invention also include an aspect such that the graft part$_1$ forms the innermost layer of the graft part, a layer of the graft part$_2$ is formed on the outer side of the graft part$_1$, and a layer of the graft part$_3$ is formed on the outer side of the layer of the graft part$_2$ as the outermost layer. Thus, it can also be said that the multistage-polymerization graft part in which each of the graft parts forms a layer structure is a multilayered graft part. In other words, in one or more embodiments of the present invention, the graft part may include a mixture (composite) of plural types of graft parts, a multistage-polymerization graft part, and/or a multilayered graft part.

In a case where the elastic body and the graft part are polymerized in this order in production of the fine polymer particles (A), at least part of the graft part can cover at least part of the elastic body in the fine polymer particles (A) to be obtained. The expression "the elastic body and the graft part are polymerized in this order" can be reworded as follows: the elastic body and the graft part are subjected to multistage polymerization. It can also be said that the fine polymer particles (A) obtained by multistage polymerization of the elastic body and the graft part is a multistage polymer.

In a case where the fine polymer particles (A) are constituted by a multistage polymer, the graft part can cover at least part of the elastic body or the whole of the elastic body. In a case where the fine polymer particles (A) are constituted by a multistage polymer, part of the graft part may be located inside the elastic body.

In a case where the fine polymer particles (A) are constituted by a multistage polymer, each of the elastic body and the graft part may have a layer structure. For example, aspects of one or more embodiments of the present invention also include an aspect such that the elastic body is present as the innermost layer (also referred to as a core layer) and a layer of the graft part is present on the outer side of the elastic body as the outermost layer (also referred to as a shell layer). It can also be said that a structure in which the elastic body is present as a core layer and the graft part is present as a shell layer is a core-shell structure. It can also be said that the fine polymer particles (A) which contain the elastic body and the graft part each of which has a layer structure (core-shell structure) is constituted by a multilayered polymer or a core-shell polymer. In other words, in one or more embodiments of the present invention, the fine polymer particles (A) may be constituted by a multistage polymer and/or a multilayered polymer or a core-shell polymer. Note, however, that the fine polymer particles (A) are not limited to the above feature, provided that the graft part is grafted to the elastic body.

At least part of the graft part may cover at least part of the elastic body. In other words, at least part of the graft part may be present on the outermost side of the fine polymer particles (A).

(2-1-3. Surface-Crosslinked Polymer)

The fine polymer particles (A) may further have a surface-crosslinked polymer in addition to the elastic body and the graft part grafted to the elastic body. The above feature (a) allows an improvement of an anti-blocking property in the production of the fine polymer particles (A) and (b) makes the dispersibility of the fine polymer particles (A) in the thermosetting resin (B) more favorable. Reasons for these are not limited to any particular ones, but can be inferred as follows. By the surface-crosslinked polymer covering at least part of the elastic body, the exposed area of the elastic body of the fine polymer particles (A) is reduced. Consequently, the elastic body is less likely to adhere to another elastic body, and therefore the dispersibility of the fine polymer particles (A) is improved.

In a case where the fine polymer particles (A) further have the surface-crosslinked polymer, the following effects can be further brought about: (a) an effect of reducing the viscosity of the present resin composition; (b) an effect of increasing a crosslinking density of the elastic body; and (c) an effect of increasing the graft efficiency of the graft part. Note that the crosslinking density of the elastic body means a degree of the number of crosslinked structures in the entirety of the elastic body.

The surface-crosslinked polymer is constituted by a polymer containing (i) a structural unit derived from a polyfunctional monomer in an amount of 30% by weight to 100% by weight and (ii) a structural unit derived from the other vinyl-based monomer in an amount of 0% by weight to 70% by weight, which total 100% by weight.

Examples of the polyfunctional monomer which can be used to form the surface-crosslinked polymer by polymerization encompass the foregoing polyfunctional monomers. Out of such polyfunctional monomers, examples of a polyfunctional monomer which can be used to form the surface-crosslinked polymer by polymerization encompass allyl methacrylate, ethylene glycol di(meth)acrylate, butylene glycol di(meth)acrylate (for example, 1,3-butylene glycol dimethacrylate), butanediol di(meth)acrylate, hexanediol di(meth)acrylate, cyclohexane dimethanol di(meth) acrylate, and polyethylene glycol di(meth)acrylates. Examples of the polyethylene glycol di(meth)acrylates encompass triethylene glycol di(meth)acrylate, tripropylene glycol di(meth)acrylate, tetraethylene glycol di(meth)acrylate, polyethylene glycol (600) di(meth)acrylate, and triallyl isocyanurate. These polyfunctional monomers may be used alone or in combination of two or more.

The fine polymer particles (A) may contain the surface-crosslinked polymer which is formed by polymerization, independently of formation of the rubber-containing graft copolymer by polymerization, or may contain the surface-crosslinked polymer which is formed together with the rubber-containing graft copolymer by polymerization. The fine polymer particles (A) may be a multistage polymer obtained by multistage polymerization of the elastic body, the surface-crosslinked polymer, and the graft part in this order. In any of these aspects, the surface-crosslinked polymer can cover at least part of the elastic body.

The surface-crosslinked polymer can also be regarded as part of the elastic body. In a case where the fine polymer particles (A) contain the surface-crosslinked polymer, the graft part may (a) be grafted to the elastic body other than the surface-crosslinked polymer, (b) be grafted to the surface-crosslinked polymer, or (c) be grafted to both the elastic body other than the surface-crosslinked polymer and the surface-crosslinked polymer. In a case where the fine polymer particles (A) contain the surface-crosslinked polymer, the above-described the volume-average particle size of the elastic body means the volume-average particle size of the elastic body including the surface-crosslinked polymer.

A case will be described where the fine polymer particles (A) is a multistage polymer obtained by multistage polymerization of the elastic body, the surface-crosslinked polymer, and the graft part in this order (case D). In the case D, the surface-crosslinked polymer can cover part of the elastic body or the whole of the elastic body. In the case D, part of the surface-crosslinked polymer may be located inside the elastic body. In the case D, the graft part can cover part of the surface-crosslinked polymer or the whole of the surface-crosslinked polymer. In the case D, part of the graft part may be located inside the surface-crosslinked polymer. In the case D, each of the elastic body, the surface-crosslinked polymer, and the graft part may have a layer structure. For example, aspects of one or more embodiments of the present invention also include an aspect such that the elastic body is present as the innermost layer (core layer), a layer of the surface-crosslinked polymer is present on the outer side of the elastic body as an intermediate layer, and a layer of the graft part is present on the outer side of the surface-crosslinked polymer as the outermost layer (shell layer).

(Volume-Average Particle Size (Mv) of Fine Polymer Particles (A))

The fine polymer particles (A) may have a volume-average particle size (Mv) of 0.03 μm to 50.00 μm, 0.05 μm to 10.00 μm, 0.05 μm to 2.00 μm, 0.05 μm to 1.00 μm, 0.10 μm to 1.00 μm, or 0.10 μm to 0.80 μm, because it is possible to obtain the resin composition which has a desired viscosity and which is highly stable. The volume-average particle size (Mv) of the fine polymer particles (A) may be 0.10 μm to 0.50 μm. This allows the fine polymer particles (A) to be well dispersed in the thermosetting resin (B). Note that, in the present specification, the "volume-average particle size (Mv) of the fine polymer particles (A)" means the volume-average particle size of the primary particles of the fine polymer particles (A) unless otherwise mentioned. The volume-average particle size of the fine polymer particles (A) can be measured with use of a dynamic light scattering type particle size distribution measurement apparatus using, as a test specimen, an aqueous latex containing the fine polymer particles (A). The volume-average particle size of the fine polymer particles (A) will be described in detail in Examples below. The volume-average particle size of the fine polymer particles (A) can also be measured by (i) cutting a cured product obtained from the resin composition, (ii) capturing an image of a cut surface with use of an electron microscope or the like, and (iii) using image data thus obtained (captured image).

The particle-number-based distribution of particle size of the fine polymer particles (A) in the thermosetting resin (B) may have a full width at half maximum which is not less than 0.5 times and not more than 1 time the volume-average particle size, because the resin composition which has a low viscosity and is easy to handle is obtained.

(2-2. Method of Producing Fine Polymer Particles (A))

The fine polymer particles (A) can be produced as follows: after the elastic body is formed by polymerization, the polymer which constitutes the graft part is grafted to the elastic body in the presence of the elastic body. The polymer which constitutes the graft part is also referred to as a graft polymer.

The fine polymer particles (A) can be produced by a known method, for example, a method such as emulsion polymerization, suspension polymerization, or microsuspension polymerization. Specifically, formation of the elastic body contained in the fine polymer particles (A), the formation of the graft part (graft polymerization) contained in the fine polymer particles (A), formation of the surface-crosslinked polymer contained in the fine polymer particles (A) can be each achieved by a known method, for example, a method such as emulsion polymerization, suspension polymerization, or microsuspension polymerization. Out of these methods, emulsion polymerization is particularly preferable as a method of producing the fine polymer particles (A), because it facilitates (i) compositional design of the fine polymer particles (A), (ii) industrial production, and (iii) obtainment of an aqueous latex of the fine polymer particles (A) which can be suitably used to produce the present resin composition. A method of producing the elastic body which can be contained in the fine polymer particles (A), a method of producing the graft part which can be contained in the fine polymer particles (A), and a method of producing the surface-crosslinked polymer which can be optionally contained in the fine polymer particles (A) will be described.
(Method of Producing Elastic Body)

A case will be considered where the elastic body includes at least one type of elastic body selected from the group consisting of diene-based rubbers and (meth)acrylate-based rubbers. In this case, the elastic body can be produced by, for example, a method such as emulsion polymerization, suspension polymerization, or microsuspension polymerization. As the method of producing the elastic body, a method disclosed in, for example, WO 2005/028546 can be used.

A case will be considered where the elastic body includes a polysiloxane rubber-based elastic body. In this case, the elastic body can be produced by, for example, a method such as emulsion polymerization, suspension polymerization, or microsuspension polymerization. As the method of producing the elastic body, a method disclosed in, for example, WO 2006/070664 can be used.

The method of producing the elastic body in a case where the "elastic body" contained in the fine polymer particles (A) is constituted by plural types of elastic bodies (for example, an elastic $body_1$, an elastic $body_2$, ..., an elastic $body_n$) will be described. In this case, each of the elastic $body_1$, the elastic $body_2$, ... the elastic $body_n$ is formed individually by any of the above-described methods. Subsequently, these elastic bodies are mixed and complexed. In this manner, the elastic body (composite) which is constituted by the plural types of elastic bodies may be produced. Alternatively, the elastic $body_1$, the elastic $body_2$, ... the elastic $body_n$ may be formed in order by multistage polymerization to produce a single elastic body which is constituted by plural types of elastic bodies.

The multistage polymerization of the elastic bodies will be described in detail. For example, (1) the elastic $body_1$ is formed by polymerization, (2) next, the elastic $body_2$ is formed by polymerization in the presence of the elastic $body_1$ to obtain a two-stage elastic $body_{1+2}$, (3) subsequently, an elastic $body_3$ is formed by polymerization in the presence of the elastic $body_{1+2}$ to obtain a three-stage elastic $body_{1+2+3}$, and (4) after a similar process(es) is/are carried out, the elastic $body_n$ is formed by polymerization in the presence of an elastic $body_{1+2+\ldots+(n-1)}$ to obtain a multistage-polymerization elastic $body_{1+2+\ldots+n}$.

(Method of Producing Graft Part)

The graft part can be formed, for example, by polymerizing, by known radical polymerization, a monomer used to form the graft part. In a case where (a) the elastic body is obtained as an aqueous latex or (b) a fine polymer particle precursor containing the elastic body and the surface-crosslinked polymer is obtained as an aqueous latex, the graft part may be formed by emulsion polymerization. The graft part can be produced by a method disclosed in, for example, WO 2005/028546.

The method of producing the graft part in a case where the graft part is constituted by plural types of graft parts (for example, a graft $part_1$, a graft $part_2$ ..., a graft $part_n$) will be described. In this case, each of the graft $part_1$, the graft $part_2$, ... the graft $part_n$ is formed individually by any of the above-described methods. Subsequently, these graft parts are mixed and complexed. In this manner, the graft part (composite) which is constituted by the plural types of graft parts may be produced. Alternatively, the graft $part_1$, the graft $part_2$, ... the graft $part_n$ may be formed in order by multistage polymerization to produce a single graft part which is constituted by the plural types of graft parts.

The multistage polymerization of the graft parts will be described in detail. For example, (1) the graft $part_1$ is formed by polymerization, (2) next, the graft $part_2$ is formed by polymerization in the presence of the graft $part_1$ to obtain a two-stage graft $part_{1+2}$, (3) subsequently, a graft $part_3$ is formed by polymerization in the presence of the graft $part_{1+2}$ to obtain a three-stage graft $part_{1+2+3}$, and (4) after a similar process(es) is/are carried out, the graft $part_n$ is formed by polymerization in the presence of a graft $part_{1+2+\ldots+(n-1)}$ to obtain a multistage-polymerization graft $part_{1+2+\ldots+n}$.

In a case where the graft part is constituted by the plural types of graft parts, the fine polymer particles (A) may be produced as follows: the graft part which is constituted by the plural types of graft parts is formed by polymerization, and then these graft parts are grafted to the elastic body. Alternatively, the fine polymer particles (A) may be produced as follows: in the presence of the elastic body, plural types of polymers which constitute the plural types of graft parts are formed in order by multistage graft polymerization with respect to the elastic body.

(Method of Producing Surface-Crosslinked Polymer)

The surface-crosslinked polymer can be formed by polymerizing, by known radical polymerization, a monomer used to form the surface-crosslinked polymer. In a case where the elastic body is obtained as an aqueous latex, the surface-crosslinked polymer may be formed by emulsion polymerization.

In a case where emulsion polymerization is employed as the method of producing the fine polymer particles (A), a known emulsifying agent (dispersion agent) can be used in the production of the fine polymer particles (A). The emulsifying agent (dispersion agent) which can be used in emulsion polymerization will be described in detail in the section (Emulsifying agent (C)) below.

In a case where emulsion polymerization is employed as the method of producing the fine polymer particles (A), a pyrolytic initiator can be used in the production of the fine polymer particles (A). It is possible to use, as the pyrolytic initiator, a known initiator such as 2,2'-azobisisobutyronitrile, hydrogen peroxide, potassium persulfate, and/or ammonium persulfate.

In the production of the fine polymer particles (A), a redox initiator can also be used. The redox initiator is an initiator which contains a combination of (a) a peroxide such as an organic peroxide and/or an inorganic peroxide and (b) as necessary a reducing agent such as sodium formaldehyde sulfoxylate and/or glucose, as necessary a transition metal salt such as iron (II) sulfate, as necessary a chelating agent such as disodium ethylenediaminetetraacetate, and/or as necessary a phosphorus-containing compound such as sodium pyrophosphate. Examples of the organic peroxide encompass t-butylperoxy isopropyl carbonate, paramenthane hydroperoxide, cumene hydroperoxide, dicumyl peroxide, t-butyl hydroperoxide, di-t-butyl peroxide, and t-hexyl peroxide. Examples of the inorganic peroxide encompass hydrogen peroxide, potassium persulfate, and ammonium persulfate.

Using the redox initiator makes it possible to (i) carry out polymerization even at a low temperature at which pyrolysis of the peroxide substantially does not occur and (ii) select a polymerization temperature from a wide range of temperatures. Thus, using the redox initiator is preferable. Out of redox initiators, organic peroxides such as cumene hydroperoxide, dicumyl peroxide, paramenthane hydroperoxide, and t-butyl hydroperoxide are more preferable for use as the redox initiator. The amount of the initiator used can be within a known range. In a case where the redox initiator is used, the amounts of, for example, the reducing agent used, the transition metal salt used, and the chelating agent used can be within known ranges.

In a case where, in the formation of the elastic body, the graft part, or the surface-crosslinked polymer by polymerization, a polyfunctional monomer is used to introduce a crosslinked structure into the elastic body, the graft part, or the surface-crosslinked polymer, a known chain transfer agent can be used in an amount within a known range. By using the chain transfer agent, it is possible to easily adjust the molecular weight and/or the degree of crosslinking of the elastic body, the graft part, or the surface-crosslinked polymer to be obtained.

In the production of the fine polymer particles (A), a surfactant can be further used, in addition to the above-described components. The type and the amount of the surfactant are set within known ranges.

In the production of the fine polymer particles (A), conditions of polymerization such as polymerization temperature, pressure, and deoxygenation can be set within known ranges.

(2-3. Thermosetting Resin (B))

The thermosetting resin (B) may include at least one type of thermosetting resin selected from the group consisting of: resins each containing a polymer obtained by polymerizing an ethylenically unsaturated monomer; epoxy resins; phenolic resins; polyol resins; and amino-formaldehyde resins. Conventionally, it has been extremely difficult to disperse, in the thermosetting resin (B) having such a feature, the fine polymer particles (A) having the above-described feature in the form of the primary particles. However, the resin composition in accordance with one or more embodiments of the present invention has an advantage that the fine polymer particles (A) having the above-described feature are well dispersed in the thermosetting resin (B) having such a feature. Examples of the thermosetting resin (B) also encompass resins each containing a polymer obtained by polymerizing an aromatic polyester raw material. Examples of the aromatic polyester raw material encompass radical-polymerizable monomers (such as an aromatic vinyl compound, a (meth)acrylic acid derivative, a vinyl cyanide compound, and a maleimide compound), dimethyl terephthalate, and alkylene glycol. These thermosetting resins may be used alone or in combination of two or more. Note that, in the present specification, "(meth)acrylic acid" means acrylic acid and/or methacrylic acid.

(Ethylenically Unsaturated Monomer)

The ethylenically unsaturated monomer is not limited to any particular one, provided that the ethylenically unsaturated monomer has at least one ethylenically unsaturated bond in its molecule.

Examples of the ethylenically unsaturated monomer encompass acrylic acid, α-alkyl acrylic acids, α-alkyl acrylic acid esters, β-alkyl acrylic acids, β-alkyl acrylic acid esters, methacrylic acid, esters of acrylic acid, esters of methacrylic acid, vinyl acetate, vinyl esters, unsaturated esters, polyunsaturated carboxylic acids, polyunsaturated esters, maleic acid, maleic acid esters, maleic anhydride, and acetoxy styrene. These ethylenically unsaturated monomers may be used alone or in combinations of two or more.

(Epoxy Resins)

The epoxy resins are not limited to any particular ones, provided that the epoxy resins each have at least one epoxy group in its molecule.

Specific examples of the epoxy resins encompass bisphenol A epoxy resin, bisphenol F epoxy resin, bisphenol AD epoxy resin, bisphenol S epoxy resin, glycidyl ester type epoxy resin, glycidyl amine type epoxy resin, novolac type epoxy resin, glycidyl ether epoxy resin of bisphenol A propylene oxide adduct, hydrogenated bisphenol A (or F) epoxy resin, fluorinated epoxy resin, rubber-modified epoxy resin containing polybutadiene or NBR, flame-resistant epoxy resin such as glycidyl ether of tetrabromo bisphenol A, p-oxybenzoic acid glycidyl ether ester type epoxy resin, m-aminophenol type epoxy resin, diaminodiphenylmethane-based epoxy resin, urethane-modified epoxy resin containing urethane bond, various types of alicyclic epoxy resin, glycidyl ether of a polyhydric alcohol, hydantoin-type epoxy resin, epoxidized unsaturated polymer such as petroleum resin, and amino-containing glycidyl ether resin. Examples of the polyhydric alcohol encompass N,N-diglycidyl aniline, N,N-diglycidyl-o-toluidine, triglycidyl isocyanurate, polyalkylene glycol diglycidyl ether, and glycerin. Other examples of the epoxy resins encompass an epoxy compound obtained by causing an addition reaction between one of the above epoxy resins and e.g. a bisphenol A (or F) or a polybasic acid. The epoxy resins are not limited to these examples. Typically used epoxy resins can be used as the epoxy resins. These epoxy resins may be used alone or in combination of two or more.

Out of these epoxy resins, epoxy resins each of which has at least two epoxy groups in one molecule are preferable in that, e.g., such resins have high reactivity during curing of the resin composition and make it easy for an obtained cured product to create a three-dimensional mesh. In addition, out of the epoxy resins each of which has at least two epoxy groups in one molecule, epoxy resins each of which contains a bisphenol type epoxy resin as a main component are preferable, because they are economical and easily available.

(Phenolic Resins)

The phenolic resins are not limited to any particular ones, provided that the phenolic resins are each a compound obtained through a reaction between a phenol and an aldehyde. The phenol is not limited to any particular one, and examples thereof encompass phenols such as phenol, ortho-cresol, meta-cresol, para-cresol, xylenol, para-tertiary butylphenol, para-octylphenol, para-phenylphenol, bisphenol A, bisphenol F, and resorcin. In particular, phenol and cresol are preferred as the phenol.

The aldehyde is not limited to any particular one, and examples thereof encompass formaldehyde, acetaldehyde, butylaldehyde, and acrolein, and mixtures thereof.

Alternatively, substances which are sources of the above aldehydes or solutions of the above aldehydes can be used. The aldehyde may be formaldehyde because an operation for reacting the phenol and the aldehyde is easy.

The molar ratio (F/P) between the phenol (P) and the aldehyde (F) in a reaction between the phenol and the aldehyde (such a molar ratio may be hereinafter referred to as a "reaction molar ratio") is not limited to any particular one. In a case where an acid catalyst is used in the reaction, the reaction molar ratio (F/P) may be 0.4 to 1.0, or 0.5 to 0.8. In a case where an alkali catalyst is used in the reaction, the reaction molar ratio (F/P) may be 0.4 to 4.0, or 0.8 to 2.5. In a case where the reaction molar ratio is equal to or higher than the above lower limit, a yield is less likely to excessively decrease and a phenolic resin to be obtained is less likely to have a low molecular weight. On the contrary, in a case where the reaction molar ratio is equal to or lower than the above upper limit, the phenolic resin is less likely to have an excessively high molecular weight and an excessively high softening point, and it is therefore possible to achieve sufficient flowability during heating. Furthermore, in a case where the reaction molar ratio is equal to or lower than the above upper limit, the molecular weight is easily controlled, and gelation may be less likely to occur or a partially gelatinized product may be less likely to be formed, each of which results from the conditions under which the reaction takes place.
(Polyol Resins)

The polyol resins are each a compound containing two or more active hydrogens as its terminal group(s), and are each bi- or more functional polyol with a molecular weight of about 50 to 20,000. Examples of the polyol resins encompass aliphatic alcohols, aromatic alcohols, polyether type polyols, polyester type polyols, polyolefin polyols, and acrylic polyols.

The aliphatic alcohols may be dihydric alcohols or trihydric or higher polyhydric alcohols (such as trihydric alcohols or tetrahydric alcohols). Examples of the dihydric alcohols encompass (a) alkylene glycols (in particular, alkylene glycols having about 1 to 6 carbon atoms) such as ethylene glycol, propylene glycol, 1,3-propanediol, 1,3-butanediol, 1,4-butanediol, 1,5-pentanediol, 1,6-hexanediol, 3-methyl-1,5-pentanediol, and neopentylglycol and (b) substances obtained through dehydrogenative condensation of two or more molecules (e.g., about two to six molecules) of any of compounds of the above alkylene glycols (such as diethylene glycol, dipropylene glycol, and tripropylene glycol). Examples of the trihydric alcohols encompass glycerin, trimethylolpropane, trimethylolethane, and 1,2,6-hexanetriol (in particular, trihydric alcohols having about 3 to 10 carbon atoms). Examples of the tetrahydric alcohols encompass pentaerythritol and diglycerin. Other examples encompass saccharides such as monosaccharides, oligosaccharides, and polysaccharides.

Examples of the aromatic alcohols encompass: bisphenols such as bisphenol A and bisphenol F; biphenyls such as dihydroxybiphenyl; polyhydric phenols such as hydroquinone and phenol-formaldehyde condensate; and naphthalenediol.

Examples of the polyether type polyols encompass (a) random copolymers and block copolymers obtained by ring-opening polymerization of ethylene oxide, propylene oxide, butylene oxide, styrene oxide, or the like in the presence of one or more active-hydrogen-containing initiators and (b) mixtures of these copolymers. Examples of the active-hydrogen-containing initiators used for the ring-opening polymerization to obtain the polyether type polyols encompass diols such as ethylene glycol, diethylene glycol, propylene glycol, dipropylene glycol, 1,3-butanediol, 1,4-butanediol, 1,6-hexanediol, neopentylglycol, and bisphenol A; triols such as trimethylolethane, trimethylolpropane, and glycerin; saccharides such as monosaccharides, oligosaccharides, and polysaccharides; sorbitol; and amines such as ammonia, ethylenediamine, urea, monomethyl diethanolamine, and monoethyl diethanolamine.

Examples of the polyester type polyols encompass polymers obtained by, in the presence of an esterification catalyst at a temperature falling within the range of 150° C. to 270° C., polycondensation of, for example, (a) a polybasic acid, such as maleic acid, fumaric acid, adipic acid, sebacic acid, phthalic acid, dodecanedioic acid, isophthalic acid, or azelaic acid, and/or an acid anhydride thereof and (b) a polyhydric alcohol such as ethylene glycol, propylene glycol, 1,4-butanediol, 1,6-hexanediol, diethylene glycol, dipropylene glycol, neopentylglycol, or 3-methyl-1,5-pentanediol. Examples of the polyester type polyols further encompass (a) polymers obtained by ring-opening polymerization of ε-caprolactone, valerolactone, or the like; and (b) active hydrogen compounds containing two or more active hydrogens, such as polycarbonate diol and castor oil.

Examples of the polyolefin type polyols encompass polybutadiene polyol, polyisoprene polyol, and hydrogenated versions thereof.

Examples of the acrylic polyols encompass: copolymers of, for example, (a) a hydroxyl-containing monomer such as hydroxyethyl (meth)acrylate, hydroxybutyl (meth)acrylate, or vinylphenol and (b) a general-purpose monomer such as n-butyl (meth)acrylate or 2-ethylhexyl (meth)acrylate; and mixtures thereof.

Out of these polyol resins, the polyether type polyols are preferred, because the resin composition to be obtained has a lower viscosity and has excellent workability, and the resin composition can provide a cured product which is well balanced between its hardness and toughness. Further, out of these polyol resins, the polyester type polyols are preferred, because the resin composition to be obtained can provide a cured product which has excellent adhesiveness.
(Amino-Formaldehyde Resins)

The amino-formaldehyde resins are not limited to any particular ones, provided that the amino-formaldehyde resins are each a compound obtained through a reaction between an amino compound and an aldehyde in the presence of an alkaline catalyst. Examples of the amino compound encompass: melamine; 6-substituted guanamines such as guanamine, acetoguanamine, and benzoguanamine; amine-substituted triazine compounds such as CTU guanamine (3,9-bis[2-(3,5-diamino-2,4,6-triazaphenyl)ethyl]-2,4,8,10-tetraoxaspiro[5,5]undecane) and CMTU guanamine (3,9-bis[(3,5-diamino-2,4,6-triazaphenyl)methyl]-2,4,8,10-tetraoxaspiro[5,5]undecane); and ureas such as urea, thiourea, and ethyleneurea. Examples of the amino compound also encompass: (a) substituted melamine compounds which are different from melamine in that the hydrogen of an amino group is substituted by an alkyl group, an alkenyl group, and/or a phenyl group (described in Specification of U.S. Pat. No. 5,998,573 (a Japanese family member thereof: Japanese Patent Application Publication Tokukaihei No. 9-143238)); and (b) substituted melamine compounds which are different from melamine in that the hydrogen of an amino group is substituted by a hydroxyalkyl group, a hydroxyalkyloxyalkyl group, and/or an aminoalkyl group (described in Specification of U.S. Pat. No. 5,322,915 (a Japanese family member thereof: Japanese Patent Application Publication Tokukaihei No. 5-202157)). Out of the above-listed compounds, melamine, guanamine, acetoguanamine and benzoguanamine, which are polyfunctional amino compounds, are preferable, and melamine is particularly preferable, as the amino compound, because they are industrially produced and inexpensive. The above-listed amino compounds may be used alone or in combination of two or more. In addition to these amino compounds, any of (a) phenols, such as phenol, cresol, alkylphenol, resorcin, hydroquinone, and/or pyrogallol, (b) anilines, and the like may be used.

Examples of the aldehyde encompass formaldehyde, paraformaldehyde, acetaldehyde, benzaldehyde, and furfural. Preferred aldehydes are formaldehyde and paraformaldehyde, because they are inexpensive and well react with the foregoing amino compound. In producing an amino-formaldehyde resin, it is preferable to use the aldehyde in the following amount: the amount of an effective aldehyde group in the aldehyde compound may be 1.1 mol to 6.0 mol, or 1.2 mol to 4.0 mol, per mole of the amino compound.
(Physical Properties of Thermosetting Resin (B))

The thermosetting resin (B) is not particularly limited in terms of the properties thereof. The thermosetting resin (B) may have a viscosity of 100 mPa·s to 1,000,000 mPa·s at 25° C. In other words, the thermosetting resin (B) which is at 25° C. may have a viscosity of 100 mPa·s to 1,000,000 mPa·s.

The viscosity of the thermosetting resin (B) may be not more than 50,000 mPa·s, not more than 30,000 mPa·s, or not more than 15,000 mPa·s, at 25° C. According to the above feature, the thermosetting resin (B) has an advantage that the thermosetting resin (B) has excellent flowability. It can also be said that the thermosetting resin (B) having a viscosity of 100 mPa·s to 1,000,000 mPa·s at 25° C. is a liquid.

As the flowability of the thermosetting resin (B) becomes greater, in other words, as the viscosity of the thermosetting resin (B) becomes lower, it becomes more difficult to disperse, in the thermosetting resin (B), the fine polymer particles (A) in the form of the primary particles. Conventionally, it has been extremely difficult to disperse, in the thermosetting resin (B) having a viscosity of not more than 1,000,000 mPa·s at 25° C., the fine polymer particles (A) in the form of the primary particles. However, the resin composition in accordance with one or more embodiments of the present invention has an advantage that the fine polymer particles (A) having the above feature are well dispersed in the thermosetting resin (B) having a viscosity of not more than 1,000,000 mPa·s at 25° C.

Further, the viscosity of the thermosetting resin (B) may be not less than 100 mPa·s, not less than 500 mPa·s, not less than 1000 mPa·s, or not less than 1500 mPa·s at 25° C., because such a viscosity allows the thermosetting resin (B) to enter the fine polymer particles (A) and thereby allows prevention of fusion between the fine polymer particles (A).

The thermosetting resin (B) may have a viscosity of more than 1,000,000 mPa·s. The thermosetting resin (B) may be a semisolid (semiliquid) or may be alternatively a solid. In a case where the thermosetting resin (B) has a viscosity of more than 1,000,000 mPa·s, the resin composition to be obtained has advantages that the resin composition is less sticky and easy to handle.

The thermosetting resin (B) may have an endothermic peak at 25° C. or lower, or 0° C. or lower, in its differential scanning calorimetry (DSC) thermogram. According to the above feature, the thermosetting resin (B) has an advantage that the thermosetting resin (B) has excellent flowability.

The present resin composition contains the fine polymer particles (A) in an amount of 1% by weight to 50% by weight and the thermosetting resin (B) in an amount of 50% by weight to 99% by weight, wherein 100% by weight represents the total amount of the fine polymer particles (A) and the thermosetting resin (B). The present resin composition may contain (a) the fine polymer particles (A) in an amount of 1% by weight to 45% by weight and the thermosetting resin (B) in an amount of 55% by weight to 99% by weight, (b) the fine polymer particles (A) in an amount of 10% by weight to 45% by weight and the thermosetting resin (B) in an amount of 55% by weight to 90% by weight, (c) the fine polymer particles (A) in an amount of 25% by weight to 45% by weight and the thermosetting resin (B) in an amount of 55% by weight to 75% by weight, (d) the fine polymer particles (A) in an amount of 30% by weight to 45% by weight and the thermosetting resin (B) in an amount of 55% by weight to 70% by weight, wherein 100% by weight represents the total amount of the fine polymer particles (A) and the thermosetting resin (B). The present resin composition may contain the fine polymer particles (A) in an amount of 40% by weight to 50% by weight and the thermosetting resin (B) in an amount of 50% by weight to 60% by weight, wherein 100% by weight represents the total amount of the fine polymer particles (A) and the thermosetting resin (B). There is an advantage that as the amount of the fine polymer particles (A) becomes larger with respect to the total amount of the fine polymer particles (A) and the thermosetting resin (B), the smaller amount of the resin composition needs to be added to an actual product. There is an advantage that as the amount of the fine polymer particles (A) becomes smaller with respect to the total amount of the fine polymer particles (A) and the thermosetting resin (B), the viscosity of the resin composition becomes lower.

In the present specification, the resin composition which contains the fine polymer particles (A) in an amount of not less than 10% by weight and not more than 50% by weight, wherein 100% by weight represents the total amount of the fine polymer particles (A) and the thermosetting resin (B), is also referred to as a "masterbatch". The present resin composition may be a masterbatch.

The present resin composition may contain a component other than the fine polymer particles (A) and the thermosetting resin (B), as necessary. The present resin composition may contain, for example, a component derived from an emulsifying agent (C) and a component derived from a coagulant (D).

(2-4. Emulsifying Agent (C))

The present resin composition may further contain phosphorus. In a case where the present resin composition contains phosphorus, the phosphorus is not particularly limited in terms of the origin thereof. In a case where the present resin composition contains phosphorus, the phosphorus can be, for example, a component derived from the emulsifying agent (C).

The present resin composition can contain the emulsifying agent (C) and/or the component derived from the emulsifying agent (C). In a case where the present resin composition contains the emulsifying agent (C), the emulsifying agent (C) can be derived from, for example, an emulsifying agent used in the production of the resin composition. In a case where the present resin composition can contain the component derived from the emulsifying agent (C), the component derived from the emulsifying agent (C) is, for example, a reaction product obtained from the emulsifying agent (C) and an electrolyte (for example, coagulant (D)) which has been used in the production of the resin composition. The coagulant (D) will be later described in detail in the section [3. Method of producing resin composition] below. Hereinafter, "the emulsifying agent (C) and the component derived from the emulsifying agent (C)" will be collectively referred to as "emulsifying agent (C) etc." for convenience.

In a case where the present resin composition contains the emulsifying agent (C) etc., the emulsifying agent (C) etc. are not particularly limited in terms of the origins thereof. That is, even in a case where the present resin composition contains the emulsifying agent (C) etc., the resin composition is not limited to a resin composition which is produced by emulsion polymerization. The present resin composition may be produced by a method other than emulsion polymerization. In the present specification, the emulsifying agent can be said to be a dispersion agent, and the terms "emulsifying agent" and "dispersion agent" are synonymous and interchangeable.

Examples of the emulsifying agent (C) encompass (a) anionic emulsifying agents, e.g., acids such as those listed below, alkali metal salts of such acids, and ammonium salts of such acids, (b) nonionic emulsifying agents, e.g., alkyl- or aryl-substituted polyethylene glycols, (c) polyvinyl alcohols, alkyl-substituted celluloses, polyvinylpyrrolidone, and polyacrylic acid derivatives. Examples of the acids encompass (a1) alkyl or aryl sulfonic acids (such as dioctyl sulfosuccinic acid and dodecylbenzenesulfonic acid) and alkyl or aryl ether sulfonic acids (a2) alkyl sulfates (such as dodecyl sulfate), aryl sulfates, and alkyl or aryl ether sulfates, (a3) alkyl- or aryl-substituted phosphoric acids and alkyl or aryl ether-substituted phosphoric acids, (a4) N-alkyl sarcosine acids (such as dodecyl sarcosine acid) and N-aryl sarcosine acids, and (a5) alkyl carboxylic acids (such as oleic acid and stearic acid), aryl carboxylic acids, and alkyl or aryl ether carboxylic acids. Note, here, that an anionic emulsifying agent formed from any of the acids listed in the (a1) and (a2) is referred to as a "sulfur-based emulsifying agent", an anionic emulsifying agent formed from any of the acids listed in the (a3) is referred to as a "phosphorus-based emulsifying agent", an anionic emulsifying agent formed from any of the acids listed in the (a4) is referred to as a "sarcosine acid-based emulsifying agent", and an anionic emulsifying agent formed from any of the acids listed in the (a5) is referred to as a "carboxylic acid-based emulsifying agent". These emulsifying agents may be used alone or in combination of two or more.

In a case where the resin composition contains the emulsifying agent (C) etc., the emulsifying agent (C) etc. can affect various physical properties (effects) which are brought about by the fine polymer particles (A) and the thermosetting resin (B) in the resin composition. Therefore, in order to well achieve various physical properties and various performances which are brought about by the fine polymer particles (A) and the thermosetting resin (B) in the resin composition, it is more preferable that the resin composition contain the emulsifying agent (C) etc. in smaller amounts.

In a case where the emulsifying agent (C) is used in a process of producing the resin composition, it is more preferable that the emulsifying agent (C) etc. have higher water solubility. This facilitates removal of the emulsifying agent (C) etc. from an intermediate product (for example, aqueous latex) by washing with water.

As the emulsifying agent (C), at least one type of emulsifying agent selected from the group consisting of phosphorus-based emulsifying agents, sarcosine acid-based emulsifying agents, carboxylic acid-based emulsifying agents, and nonionic emulsifying agents is preferable, and a phosphorus-based emulsifying agent is more preferable, because these emulsifying agents and/or components derived from these emulsifying agents have high water solubility.

The amounts of the emulsifying agent (C) etc. contained in the present resin composition are also referred to as a remaining emulsifying agent content. The remaining emulsifying agent content can be measured with use of an X-ray fluorescence analyzer or by liquid chromatography. For example, in a case where the X-ray fluorescence analyzer is used, the remaining emulsifying agent content can be measured by measuring an element derived from the emulsifying agent (C) etc. The element derived from the emulsifying agent (C) etc. indicates sulfur (S) in the case of a sulfur-based emulsifying agent, and indicates phosphorus (P) in the case of a phosphorus-based emulsifying agent.

According to the present resin composition, the amount of the element derived from the emulsifying agent (C), which is measured with use of the X-ray fluorescence analyzer, may be not more than 1200 ppm, not more than 1000 ppm, not more than 800 ppm, not more than 500 ppm, not more than 300 ppm, not more than 200 ppm, not more than 110 ppm, or not more than 100 ppm, in the resin composition.

According to the present resin composition, the amount of sulfur (S), which is measured with use of the X-ray fluorescence analyzer, may be not more than 2300 ppm, not more than 2000 ppm, not more than 1800 ppm, not more than 1500 ppm, not more than 1300 ppm, not more than 1000 ppm, not more than 800 ppm, not more than 500 ppm, not more than 300 ppm, not more than 200 ppm, not more than 150 ppm, or not more than 100 ppm, in the resin composition. According to the above feature, the resin composition to be obtained can well achieve various physical properties and various performances which are brought about by the fine polymer particles (A) and the thermosetting resin (B) in the resin composition.

According to the present resin composition, the amount of phosphorus (P), which is measured with use of the X-ray fluorescence analyzer, may be not more than 1200 ppm, not more than 1000 ppm, not more than 800 ppm, not more than 500 ppm, not more than 200 ppm, not more than 110 ppm, not more than 100 ppm, or not more than 80 ppm, in the resin composition. According to the above feature, the resin composition to be obtained can well achieve various physical properties and various performances which are brought about by the fine polymer particles (A) and the thermosetting resin (B) in the resin composition.

(2-5. Resin (E))

The present resin composition may further contain a resin (E). The resin (E) is one that can be used in a method of producing the resin composition (for example, a production method described in the section [3. Method of producing resin composition] below). That is, in a case where the resin (E) is used in the method of producing the resin composition, the present resin composition can contain the resin (E).

The resin (E) may be a resin identical to the thermosetting resin (B) or may be a resin different from the thermosetting resin (B). A case will be considered where the resin (E) is used in the method of producing the resin composition and the resin (E) is a resin identical to the thermosetting resin (B). In this case, the obtained resin composition appears to have merely the thermosetting resin (B) because it is not possible to distinguish between the thermosetting resin (B) and the resin (E) in the obtained resin composition. A case will be considered where the resin (E) is used in the method of producing the resin composition and the resin (E) is a resin different from the thermosetting resin (B). In this case, it is possible to distinguish between the thermosetting resin (B) and the resin (E) in the obtained resin composition. In this case, the ultimately obtained resin composition can contain the resin (E) as a resin other than the thermosetting resin (B).

The resin (E) is, for example, a thermosetting resin, a thermoplastic resin, or any combination of a thermosetting resin and a thermoplastic resin. In a case where the present resin composition contains the resin (E), the resin (E) can have an effect of enhancing the dispersibility of the fine polymer particles (A) in the thermosetting resin (B).

Examples of the thermosetting resin which is the resin (E) encompass various thermosetting resins described in the section (2-2. Thermosetting resin (B)). As the resin (E), the thermosetting resins may be used alone or in combination of two or more.

Example of the thermoplastic resin which is the resin (E) encompass polymers each containing at least one type of structural unit derived from at least one type of monomer selected from the group consisting of aromatic vinyl monomers, vinyl cyanide monomers, and (meth)acrylate monomers.

The other examples of the thermoplastic resin which is the resin (E) encompass acrylic-based polymers, vinyl-based copolymers, polycarbonates, polyamides, polyesters, polyphenylene ethers, polyurethanes, and polyvinyl acetates.

As the resin (E), these thermoplastic resins may be used alone or in combination of two or more.

In the present specification, fats and oils as well as fatty acid esters are also included in the resin (B). Examples of the fats and oils which can be suitably used as the resin (B) encompass epoxidized fats and oils such as epoxidized soybean oil and epoxidized linseed oil. Commercially available epoxidized soybean oil can be used, and examples thereof encompass ADK CIZER O-130P manufactured by ADEKA Co., Ltd. Examples of the fatty acid esters which can be suitably used as the resin (B) encompass epoxidized fatty acid esters such as epoxidized fatty acid butyl, epoxidized fatty acid 2-ethylhexyl, epoxidized fatty acid octyl ester, and epoxidized fatty acid alkyl ester.

The epoxidized fats and oils and the epoxidized fatty acid esters are sometimes referred to as epoxy-based plasticizers. That is, in the present specification, epoxy-based plasticizers are also encompassed in the resin (B). Examples of the epoxy-based plasticizers other than the epoxidized fats and oils and the epoxidized fatty acid esters encompass diepoxystearyl epoxyhexahydrophthalate and epoxyhexahydro Di(2-ethylhexyl)phthalate.

The resin (E) may be of the same type as that of the thermosetting resin (B), because such a resin (E) is less likely to affect various physical properties of the thermoplastic resin (B). That is, in a case where the thermosetting resin (B) is an epoxy resin, it is preferable that the resin (E) be also an epoxy resin. In a case where the resin (E) differs from the thermosetting resin (B), the resin (E) may be compatible with the thermosetting resin (B).

(Physical Properties of Resin (E))

The resin (E) is not particularly limited in terms of the properties thereof. The resin (E) may be a liquid having a viscosity of 100 mPa·s to 1,000,000 mPa·s at 25° C., a semisolid, or a solid. In other words, the resin (E) which is at 25° C. may be a liquid having a viscosity of 100 mPa·s to 1,000,000 mPa·s, a semisolid, or a solid.

The viscosity of the resin (E) is not more than 50,000 mPa·s, not more than 30,000 mPa·s, or not more than 15,000 mPa·s, at 25° C. According to the above feature, the resin (E) has an advantage that the resin (E) has excellent flowability. It can also be said that the resin (E) having a viscosity of 100 mPa·s to 1,000,000 mPa·s at 25° C. is a liquid.

Further, the resin (E) may be a liquid, and the viscosity of the resin (E) may be not less than 100 mPa·s, not less than 500 mPa·s, not less than 1000 mPa·s, or not less than 1500 mPa·s at 25° C. According to the above feature, it is possible to prevent the fusion between the fine polymer particles (A) by the resin (E) entering the fine polymer particles (A).

The resin (E) may have a viscosity of more than 1,000,000 mPa·s. The resin (E) may be a semisolid (semiliquid) or may be alternatively a solid. In a case where the resin (E) has a viscosity of more than 1,000,000 mPa·s, the resin composition to be obtained has advantages that the resin composition is less sticky and easy to handle.

In a case where the present resin composition contains the resin (E), the present resin composition may contain the resin (E) in an amount of 1 part by weight to 50 parts by weight, 1 part by weight to 30 parts by weight, 1 part by weight to 20 parts by weight, 1 part by weight to 15 parts by weight, 1 part by weight to 12 parts by weight, or 1 part by weight to 10 parts by weight, with respect to 100 parts by weight of the fine polymer particles (A). In a case where the amount of the resin (E) contained in the resin composition is not less than 1 part by weight with respect to 100 parts by weight of the fine polymer particles (A), the resin (E) can have an effect of enhancing the dispersibility of the fine polymer particles (A) more in the thermosetting resin (B), as the amount of the resin (E) is increased. In a caser where the amount of the resin (E) contained in the resin composition is not more than 50 parts by weight, the resin (E) less affects the effects and the performances brought about to the resin composition by the thermosetting resin (B), as the amount of the resin (E) is decreased.

The amount of the resin (E) contained in the present resin composition will be described in terms of an excellent anti-blocking property. In a case where 100% by weight represents the total amount of the fine polymer particles (A) and the resin (E), the resin composition contains: the fine polymer particles (A) in an amount of 55% by weight to 99% by weight and the resin (E) in an amount of 1% by weight to 45% by weight; the fine polymer particles (A) in an amount of 60% by weight to 99% by weight and the resin (E) in an amount of 1% by weight to 40% by weight; the fine polymer particles (A) in an amount of 65% by weight to 99% by weight and the resin (E) in an amount of 1% by weight to 35% by weight; the fine polymer particles (A) in an amount of 70% by weight to 99% by weight and the resin (E) in an amount of 1% by weight to 30% by weight; the fine polymer particles (A) in an amount of 75% by weight to 99% by weight and the resin (E) in an amount of 1% by weight to 25% by weight; the fine polymer particles (A) in an amount of 80% by weight to 99% by weight and the resin (E) in an amount of 1% by weight to 20% by weight; the fine polymer particles (A) in an amount of 85% by weight to 99% by weight and the resin (E) in an amount of 1% by weight to 15% by weight; the fine polymer particles (A) in an amount of 90% by weight to 99% by weight and the resin (E) in an amount of 1% by weight to 10% by weight; or the fine polymer particles (A) in an amount of 95% by weight to 99% by weight and the resin (E) in an amount of 1% by weight to 5% by weight.

The amount of the resin (E) contained in the present resin composition will be described in terms of the excellent dispersibility of the fine polymer particles (A) in the thermosetting resin (B). In a case where 100% by weight represents the total amount of the fine polymer particles (A) and the resin (E), the resin composition may contain: the fine polymer particles (A) in an amount of 50% by weight to 97% by weight and the resin (E) in an amount of 3% by weight to 50% by weight; the fine polymer particles (A) in an amount of 50% by weight to 95% by weight and the resin (E) in an amount of 5% by weight to 50% by weight; the fine polymer particles (A) in an amount of 50% by weight to 92% by weight and the resin (E) in an amount of 8% by weight to 50% by weight; the fine polymer particles (A) in an amount of 50% by weight to 90% by weight and the resin (E) in an amount of 10% by weight to 50% by weight; the fine polymer particles (A) in an amount of 50% by weight to 87% by weight and the resin (E) in an amount of 13% by weight to 50% by weight; the fine polymer particles (A) in an amount of 50% by weight to 85% by weight and the resin (E) in an amount of 15% by weight to 50% by weight; the fine polymer particles (A) in an amount of 50% by weight to 82% by weight and the resin (E) in an amount of 18% by weight to 50% by weight; the fine polymer particles (A) in an amount of 50% by weight to 80% by weight and the resin (E) in an amount of 20% by weight to 50% by weight; or the fine polymer particles (A) in an amount of 60% by weight to 80% by weight and the resin (E) in an amount of 20% by weight to 40% by weight.

It can also be said that the amount of the resin (E) contained in the present resin composition is the amount of the resin (E) added (used) in the present production method (later described). Accordingly, as a preferable aspect of the amount of the resin (E) added in the present production method (later described), the above aspect of the amount of the resin (E) contained in the present resin composition can be employed by replacing the "contained" with the "added". For example, that the amount of the resin (E) contained in the present resin composition is 1 part by weight to 50 parts by weight with respect to 100 parts by weight of the fine polymer particles (A) intends that the amount of the resin (E) added to an aqueous latex is 1 part by weight to 50 parts by weight with respect to 100 parts by weight of the fine polymer particles (A). It can also be said that the amount of the resin (E) contained in the present resin composition is the amount of the resin (E) contained in the coagulate in the present production method (later described). Accordingly, as a preferable aspect of the amount of the resin (E) contained in the coagulate in the present production method (later described), the above aspect of the amount of the resin (E) contained in the present resin composition can be employed. For example, that the amount of the resin (E) contained in the present resin composition is 1 part by weight to 50 parts by weight with respect to 100 parts by weight of the fine polymer particles (A) intends that the amount of the resin (E) contained in the coagulate is 1 part by weight to 50 parts by weight with respect to 100 parts by weight of the fine polymer particles (A).

(2-6. Water Content)

In the present specification, the "water content of the resin composition" means the amount of water contained in resin composition with respect to the weight of the resin composition. The water content of the present resin composition is 2000 ppm to 40000 ppm with respect to the weight of the resin composition. According to the above feature, the present resin composition is excellent in dispersibility of the fine polymer particles (A) in the thermosetting resin (B). Further, according to the above feature, the present resin composition can provide a cured product which has an excellent surface appearance.

As later described, the present resin composition may be produced through a step of adjusting the water content of the coagulate of the fine polymer particles (A) to a specific water content. In a case where the resin composition is produced through the step of adjusting the water content of the coagulate of the fine polymer particles (A) to the specific water content, the obtained resin composition can ultimately contain water in an amount of 2000 ppm to 40000 ppm with respect to the weight of the resin composition. In the production of the resin composition, by appropriately changing a method of mixing the coagulate of the fine polymer particles (A) and the thermosetting resin (B) and appropriately changing a method of devolatilizing the obtained resin composition and a condition under which the obtained resin composition is devolatilized, the water content of the resin composition to be obtained can be adjusted to fall within the above range.

The water content of the present resin composition may be 2000 ppm to 20000 ppm, 2000 ppm to 15000 ppm, 2000 ppm to 10000 ppm, 2000 ppm to 9000 ppm, 2000 ppm to 8000 ppm, 2000 ppm to 7000 ppm, 2000 ppm to 6000 ppm, or 2000 ppm to 5000 ppm, with respect to the weight of the resin composition. Further, the water content of the present resin composition may be 4000 ppm to 400000 ppm, 4000 ppm to 200000 ppm, 4000 ppm to 150000 ppm, 4000 ppm to 100000 ppm, 4000 ppm to 90000 ppm, 4000 ppm to 80000 ppm, 4000 ppm to 70000 ppm, 4000 ppm to 60000 ppm, or 4000 ppm to 50000 ppm, with respect to the weight of the fine polymer particles (A). The water contained in the resin composition can affect various physical properties (effects) which are brought about by the fine polymer particles (A) and the thermosetting resin (B) in the resin composition. For example, in a case where (a) the water content of the resin composition is more than 40000 ppm with respect to the weight of the resin composition or (b) the water content of the resin composition is more than 400000 ppm with respect to the weight of the fine polymer particles (A), a cured product to be obtained has a poor surface appearance. In order that (a) the fine polymer particles (A) achieve excellent dispersibility in the thermosetting resin (B) as well as (b) the resin composition well achieves various physical properties which are brought about by the fine polymer particles (A) and the thermosetting resin (B) in the resin composition, the water content of the resin composition (the amount of water contained in the resin composition) may fall within the above range.

In the present specification, a value measured with use of a moisture measuring device is regarded as the water content of the resin composition. A method of measuring the water content will be described in detail in Examples below.

(2-7. Organic Solvent)

The present resin composition does not substantially contain an organic solvent. The present resin composition can be produced without use of an organic solvent as later described, so that the resin composition which does not substantially contain the organic solvent can be obtained.

The amount of the organic solvent contained in the present resin composition (also referred to as a solvent content) may be not more than 100 ppm, not more than 50 ppm, not more than 25 ppm, or not more than 10 ppm. It can also be said that the amount of the organic solvent contained in the present resin composition is the amount of a volatile component (other than water) contained in the present resin composition. The amount of the organic solvent (volatile component) contained in the present resin composition can be determined, for example, as follows. That is, a predetermined amount of the resin composition is heated with use of a hot air dryer or the like, the weight of the resin composition is measured before and after heating, and a value by which the weight is reduced is regarded as the amount of the organic solvent. Alternatively, the amount of the organic solvent (volatile component) contained in the present resin composition can also be determined by gas chromatography. In a case where the organic solvent is not used in the production of the present resin composition, the amount of the organic solvent contained in the obtained resin composition can be regarded as 0 ppm. A method of measuring the organic solvent contained in the present resin composition will be described in detail in Examples below.

Examples of the organic solvent which is not substantially contained in the present resin composition encompass (a) esters such as methyl acetate, ethyl acetate, propyl acetate, and butyl acetate, (b) ketones such as acetone, methyl ethyl ketone, diethyl ketone, and methyl isobutyl ketone, (c) alcohols such as ethanol, (iso)propanol, and butanol, (d) ethers such as tetrahydrofuran, tetrahydropyran, dioxane, and diethyl ether, (e) aromatic hydrocarbons such as benzene, toluene, and xylene, and (f) halogenated hydrocarbons such as methylene chloride and chloroform.

(2-8. Other Components)

The present resin composition may contain, as necessary, any other component which is different from the above-described components. Examples of the any other component encompass: curing agents; coloring agents such as pigments and colorants; extenders; ultraviolet ray absorbing agents; antioxidants; heat stabilizers (antigelling agents); plasticizing agents; leveling agents; defoaming agents; silane coupling agents; antistatic agents; flame retarders; lubricants; viscosity reducers; shrinkage reducing agents; inorganic filler; organic filler; thermoplastic resins; desiccants; and dispersion agents.

The antioxidants are not limited to any particular ones. Examples of the antioxidants encompass (a) primary antioxidants such as phenol-based antioxidants, amine-based antioxidants, lactone-based antioxidants, and hydroxylamine-based antioxidants and (b) secondary antioxidants such as sulfur-based antioxidants and phosphorus-based antioxidants.

Examples of the phenol-based antioxidants encompass hindered phenol-based antioxidants. Examples of the hindered phenol-based antioxidants encompass a compound having a hindered phenol structure or a semi-hindered phenol structure in its molecule. The phenol-based antioxidants can be commercially available products. Examples of such products encompass Irganox 245 and Irganox 1135, each manufactured by BASF Japan Ltd.

The present resin composition may further contain a known thermosetting resin other than the thermosetting resin (B). The present resin composition may further contain a known thermoplastic resin.

(2-9. Dispersibility)

The present resin composition is excellent in dispersibility of the fine polymer particles (A) in the thermosetting resin (B). The dispersibility of the fine polymer particles (A) in the present resin composition can be evaluated in accordance with JIS K5101 with use of a grind gauge. The present resin composition may be arranged such that the dispersibility of the fine polymer particles (A) in the thermosetting resin (B) is not more than 0 µm, when evaluated in accordance with JIS K5101 with use of a grind gauge. A method of evaluating the dispersibility of the fine polymer particles (A) in the thermosetting resin (B) in the present resin composition will be described in detail in Examples below.

When the dispersibility of the fine polymer particles (A) in the present resin composition (in the thermosetting resin (B)) is evaluated in accordance with JIS K5101 with use of a grind gauge, the dispersibility may be less than 100 µm, less than 90 µm, less than 80 µm, less than 70 µm, less than 60 µm, less than 50 µm, less than 40 µm, less than 30 µm, less than 20 µm, less than 10 µm, or 0 µm.

(2-10. Viscosity of Resin Composition)

The present resin composition is not particularly limited in terms of the properties thereof. The present resin composition may have a viscosity of 100 mPa·s to 1,000,000 mPa·s at 25° C. The viscosity of the resin composition may be not more than 50,000 mPa·s, not more than 30,000 mPa·s, or not more than 15,000 mPa·s, at 25° C. According to the above feature, the resin composition has an advantage that the resin composition has excellent flowability. It can also be said that the resin composition having a viscosity of 100 mPa·s to 1,000,000 mPa·s at 25° C. is a liquid.

The present resin composition may have a viscosity of more than 1,000,000 mPa·s. The present resin composition may be a semisolid (semiliquid) or may be alternatively a solid. In a case where the present resin composition has a viscosity of more than 1,000,000 mPa·s, the resin composition to be obtained has advantages that the resin composition is less sticky and easy to handle.

Aspects of the resin composition in accordance with one or more embodiments of the present invention may be as follows:
the resin composition which contains the fine polymer particles (A) and the thermosetting resin (B) and which contains the fine polymer particles (A) in an amount of less than 10% by weight, wherein 100% by weight represents the total amount of the fine polymer particles (A) and the thermosetting resin (B);
the resin composition which contains the fine polymer particles (A), the thermosetting resin (B), and the resin (E) and which contains the fine polymer particles (A) in an amount of less than 10% by weight, wherein 100% by weight represents the total amount of the fine polymer particles (A) and the thermosetting resin (B);
the resin composition which contains the fine polymer particles (A) and the thermosetting resin (B) and which contains the fine polymer particles (A) in an amount of not less than 10% by weight and not more than 50% by weight, wherein 100% by weight represents the total amount of the fine polymer particles (A) and the thermosetting resin (B) (referred to as a masterbatch A);
the resin composition which contains the fine polymer particles (A), the thermosetting resin (B), and the resin (E) and which contains the fine polymer particles (A) in an amount of not less than 10% by weight and not more than 50% by weight, wherein 100% by weight represents the total amount of the fine polymer particles (A) and the thermosetting resin (B) (referred to as a masterbatch B);
the resin composition which contains the masterbatch A, a thermosetting resin, other than thermosetting resin (B), and/or a thermoplastic resin, and any other component; and
the resin composition which contains the masterbatch B, a thermosetting resin, other than thermosetting resin (B), and/or a thermoplastic resin, and any other component.

The resin composition in accordance with one or more embodiments of the present invention can include the following feature.

The resin composition which contains water, the fine polymer particles (A), and the thermosetting resin (B), the fine polymer particles (A) being a multistage-polymerization graft copolymer obtained by multistage polymerization including polymerization stages (1) and (2) below, wherein the polymerization stage (1) precedes the polymerization stage (2),
the thermosetting resin (B) including at least one type of thermosetting resin selected from the group consisting of: resins each containing a polymer obtained by polymerizing an ethylenically unsaturated monomer; epoxy resins; phenolic resins; polyol resins; and amino-formaldehyde resins,
the resin composition containing the fine polymer particles (A) in an amount of 1% by weight to 50% by weight and the thermosetting resin (B) in an amount of 50% by weight to 99% by weight, wherein 100% by weight represents the total amount of the fine polymer particles (A) and the thermosetting resin (B),
the resin composition having a water content of 2000 ppm to 40000 ppm with respect to the weight of the resin composition,
the resin composition not substantially containing an organic solvent, wherein the wording "not substantially containing an organic solvent" means that the amount of the organic solvent contained in the resin composition is not more than 100 ppm with respect to the weight of the resin composition, the step (1) being a step of obtaining the elastic body by polymerizing at least one type of elastic body selected from the group consisting of diene-based rubbers, (meth)acrylate-based rubbers, and polysiloxane rubber-based elastic bodies, the step (2) being a step of obtaining the graft part by polymerizing a monomer mixture including at least one type of monomer selected from the group consisting of aromatic vinyl monomers, vinyl cyanide monomers, and (meth)acrylate monomers.

3. Method of Producing Resin Composition

The method of producing a resin composition in accordance with one or more embodiments of the present invention includes the following steps 1 through 4:
(step 1) obtaining an aqueous latex containing fine polymer particles (A) and an emulsifying agent (C);
(step 2) obtaining, with use of the aqueous latex, slurry containing a coagulate of the fine polymer particles (A);
(step 3) taking out the coagulate from the slurry and adjusting the water content of the coagulate to not less than 10% with respect to the weight of the coagulate; and
(step 4) mixing the coagulate and a thermosetting resin (B).

In the method of producing a resin composition in accordance with one or more embodiments of the present invention, the fine polymer particles (A) contain a rubber-containing graft copolymer having an elastic body and a graft part grafted to the elastic body. In the method of producing a resin composition in accordance with one or more embodiments of the present invention, the graft part is a polymer containing at least one type of structural unit derived from at least one type of monomer selected from the group consisting of aromatic vinyl monomers, vinyl cyanide monomers, and (meth)acrylate monomers.

The step 2 in the method of producing a resin composition in accordance with one or more embodiments of the present invention further includes a step of adding a resin (E) to the aqueous latex. In the method of producing a resin composition in accordance with one or more embodiments of the present invention, the resin (E) is a liquid having a viscosity of 100 mPa·s to 1,000,000 mPa·s at 25° C., a semisolid, or a solid.

The method of producing a resin composition in accordance with one or more embodiments of the present invention is also simply referred to as a present production method.

Since the present production method has the above feature, it is possible to provide a resin composition which imposes a reduced environmental load. Specifically, according to the present production method, it is possible to provide a resin composition which does not substantially contain an organic solvent. As has been described, the wording "not substantially contain an organic solvent" means that the amount of the organic solvent contained in the resin composition is not more than 100 ppm. According to the present production method, it is possible to provide a resin composition which is excellent in dispersibility of the fine polymer particles (A) in the thermosetting resin (B). Furthermore, the resin composition obtained by the present production method can provide a cured product which has an excellent surface appearance.

Since the present production method has the above feature, it is possible to provide a resin composition which contains the fine polymer particles (A) at a high concentration and which is excellent in dispersibility of the fine polymer particles (A) in the thermosetting resin (B). Note, here, that the resin composition which contains the fine polymer particles (A) at a high concentration is, for example, a resin composition which contains the fine polymer particles (A) in an amount of 40% by weight to 50% by weight, wherein 100% by weight represents the total amount of the fine polymer particles (A) and the thermosetting resin (B).

The present production method can be suitably employed to obtain the resin composition described in the section [2. Resin composition]. In other words, according to the present production method, it is possible to obtain the resin composition described in the section [2. Resin composition]. The fine polymer particles (A), the thermosetting resin (B), and the emulsifying agent (C) in the present production method may be the fine polymer particles (A), the thermosetting resin (B), and the emulsifying agent (C), respectively, described in the section [2. Resin composition]. In regard to aspects (including preferable aspects) of the fine polymer particles (A), the thermosetting resin (B), and the emulsifying agent (C) in the present production method, the description of the fine polymer particles (A), the thermosetting resin (B), and the emulsifying agent (C) in the section [2. Resin composition] can be employed as appropriate.

(3-1. Step 1)

The step 1 is a step of obtaining an aqueous latex containing the fine polymer particles (A) and the emulsifying agent (C). The aqueous latex may be obtained by mixing water, the fine polymer particles (A) prepared in advance, and the emulsifying agent (C). The aqueous latex can be obtained by producing the fine polymer particles (A) by emulsion polymerization in which the emulsifying agent (C) is used, as described in the section (2-2. Method of producing fine polymer particles (A)) in the section [2. Resin composition]. Therefore, in regard to aspects (including preferable aspects) of the step 1, the description in the sections (2-2. Method of producing fine polymer particles (A)) and (2-4. Emulsifying agent (C)) can be employed as appropriate.

In the step 1, the aqueous latex may further contain, as necessary, any other additive such as an antioxidant, a thermal stabilizer, an ultraviolet absorber, a coloring agent (for example, a pigment or a colorant), an antistatic agent, and a lubricant. Alternatively, in the step 2, the any other additive may be further added to the aqueous latex.

(3-2. Step 2)

The step 2 is a step of obtaining, with use of the aqueous latex, slurry containing a coagulate of the fine polymer particles (A). It can also be said that the slurry is a mixture containing an aqueous solvent, the coagulate of the fine polymer particles (A), and the emulsifying agent (C). The coagulate of the fine polymer particles (A) can be obtained by a method in which the aqueous latex is chemically treated, a method in which the aqueous latex is physically treated, a method in which the aqueous latex is chemically and physically treated, or the like. Examples of the method in which the aqueous latex is chemically treated encompass a method in which a coagulant is added to the aqueous latex. Examples of the method in which the aqueous latex is physically treated encompass a method in which the aqueous latex is sprayed. The step 2 may be a step of obtaining the coagulate of the fine polymer particles (A) by the method in which the aqueous latex is chemically treated, by the method in which the coagulant is added to the aqueous latex, In the present production method, the step 2 may further include a step of adding a coagulant (D) to the aqueous latex. By adding the coagulant (D) to the aqueous latex, it is possible to obtain the slurry containing the coagulate of the fine polymer particles (A). The coagulant (D) can be, for example, a salt, as later described. Thus, in a case where the step 2 further includes the step of adding the coagulant (D) to the aqueous latex, the step 2 can be said to be a step of subjecting the fine polymer particles (A) to salting out.

The aqueous latex may be heated after the coagulant (D) is added to the aqueous latex. By heating the aqueous latex to which the coagulant (D) has been added, it is possible to easily obtain the coagulate of the fine polymer particles (A). The heating temperature at the time of heating the aqueous latex to which the coagulant (D) has been added is not limited to any particular one, but may be 0° C. to 100° C., or 25° C. to 70° C.

(Coagulant (D))

Addition of the coagulant (D) to the aqueous latex can accelerate coagulation of the fine polymer particles (A) in the aqueous latex, (b) can cause a reaction between an electrolyte (ion) derived from the emulsifying agent (C) and an electrolyte derived from the coagulant (D), and can thereby cause a salt.

Examples of the coagulant (D) encompass sodium acetate, sodium chloride, sodium sulfate, calcium acetate, calcium chloride, calcium sulfate, magnesium acetate, magnesium chloride, magnesium sulfate, aluminum acetate, aluminum chloride, aluminum sulfate, iron (II) chloride, and iron (III) chloride.

A method of adding the coagulant (D) to the aqueous latex is not limited to any particular one. For example, a method in which the coagulant (D) in the form of a solid is directly added to the aqueous latex, a method in which the coagulant (D) is brought into a solution state with use of an appropriate solvent (for example, water) and then added to the aqueous latex, or the like can be employed.

In a case where the step 2 further includes the step of adding the coagulant (D) to the aqueous latex, the emulsifying agent (C) and the coagulant (D) to be used may satisfy any one of the following conditions (1) and (2): (1) an aqueous solution containing 0.1% of the emulsifying agent (C) and 0.5% of the coagulant (D) has foamability (foaming property, cm) of not more than 17 cm according to the Ross-Miles method; and (2) no solid precipitate is present in an aqueous solution containing 1% of the emulsifying agent (C) and 5% of the coagulant (D).

The condition (1) will be described in detail. The aqueous solution containing 0.1% of the emulsifying agent (C) and 0.5% of the coagulant (D) may have foamability (foaming property, cm) of not more than 17 cm, not more than 15 cm, not more than 10 cm, or not more than 5 cm, according to the Ross-Miles method. In a case where the present production method includes a devolatilizing step (later described), an efficiency of devolatilizing a resin composition is increased as the foamability of an intermediate product containing the emulsifying agent (C) and the coagulant (D) becomes lower, in the process of producing the resin composition. Therefore, the production method is excellent in production cost. The Ross-Miles method used for the aqueous solution containing 0.1% of the emulsifying agent (C) and 0.5% of the coagulant (D) will be described in detail in Examples below.

The condition (2) will be described in detail. It is preferable that no solid precipitate is present in the aqueous solution containing 1% of the emulsifying agent (C) and 5% of the coagulant (D), and it is more preferable that the aqueous solution does not become white and turbid. In the process of producing a resin composition, the emulsifying agent (C) and the coagulant (D) can react with each other to produce a reaction product. In a case where the reaction product obtained from the emulsifying agent (C) and the coagulant (D) has extremely low solubility and forms a large mass (solid), the reaction product (solid) precipitates. In a case where the reaction product obtained from the emulsifying agent (C) and the coagulant (D) has low solubility and forms a fine mass (solid), the reaction product (solid) does not precipitate, but the aqueous solution containing the reaction product (solid) becomes white and turbid. That no solid precipitate is present in the aqueous solution containing 1% of the emulsifying agent (C) and 5% of the coagulant (D) means that the reaction product obtained from the emulsifying agent (C) and the coagulant (D) has high solubility. That the aqueous solution does not become white and turbid means that the reaction product has higher solubility. As the solubility of the reaction product in water becomes higher, removal of the reaction product derived from the emulsifying agent (C) by washing becomes easier. That is, the remaining emulsifying agent content of a resin composition becomes lower.

In a case where the step 2 further includes the step of adding the coagulant (D) to the aqueous latex, the emulsifying agent (C) and the coagulant (D) to be used satisfy both of the conditions (1) and (2). As a result of diligent studies, the inventors of one or more embodiments of the present invention uniquely found that use of a phosphorus-based emulsifying agent as the emulsifying agent (C) allows both of the conditions (1) and (2) to be satisfied even in a case where any coagulant (D) is used. In the present production method, the emulsifying agent (C) may be a phosphorus-based emulsifying agent.

The step 2 may further include a step of adding the resin (E) to the aqueous latex. The step 2 may further include a step of adding the resin (E) to the aqueous latex before the slurry containing the coagulate of the fine polymer particles (A) is obtained with use of the aqueous latex. In other words, the step 2 may be a step of obtaining the slurry containing the coagulate of the fine polymer particles (A), with use of the aqueous latex containing the fine polymer particles (A), the emulsifying agent (C), and the resin (E). The slurry obtained in the step 2 may be a mixture containing the aqueous solvent, the fine polymer particles (A), the emulsifying agent (C), and the resin (E). According to the above feature, the resin (E) can be included in the obtained coagulate of the fine polymer particles (A). This results in obtainment of the coagulate of the fine polymer particles (A) in which coagulate the fine polymer particles (A) gather loosely, and ultimately allows obtainment of a resin composition which is excellent in dispersibility of the fine polymer particles (A) in the thermosetting resin (B). In other words, the coagulate of the fine polymer particles (A) obtained in the step 2 may contain the resin (E).

The resin (E) in the step 2 intends a substance identical to the resin (E) described in the section (2-5. Resin (E)). In regard to aspects (including preferable aspects) of the resin (E) in the step 2, the aspects described in the section (2-5. Resin (E)) can be employed as appropriate.

The resin (E) is not particularly limited in terms of the properties thereof. However, the resin (E) may be a liquid having a viscosity of 100 mPa·s to 1,000,000 mPa·s at 25° C., a semisolid, or a solid. For example, in a case where the resin (E) is a liquid and the viscosity of the resin (E) is not less than 100 mPa·s at 25° C., it is possible to prevent, in the step 2, fusion between the fine polymer particles (A) particularly in the coagulate, by the resin (E) entering the fine polymer particles (A).

The resin (E) may be added, in the step 2. in an amount of 1 part by weight to 50 parts by weight, 1 part by weight to 40 parts by weight, 1 part by weight to 30 parts by weight, 1 part by weight to 20 parts by weight, 1 part by weight to 15 parts by weight, 1 part by weight to 12 parts by weight, or 1 part by weight to 10 parts by weight, with respect to 100 parts by weight of the fine polymer particles (A) in the aqueous latex. In a case where the amount of the resin (E) added in the step 2 falls within the above range, there are advantages that (a) a resin composition which has excellent dispersibility can be obtained and (b) an anti-blocking property is excellent.

A case will be considered where the coagulate obtained in the step 2 contains the resin (E) (preferable aspect of the present production method). In this case, from the viewpoint of preventing the fusion between the fine polymer particles (A) in the coagulate, the coagulate may contain a small amount of the resin (E) which has a longitudinal dimension that is not less than 1.5 times the average particle size of primary particles of the fine polymer particles (A). Specifically, it is assumed that the coagulate is taken out from the aqueous latex, the coagulate is subjected to transmission electron microscopy (TEM), and a TEM image is acquired. In this case, in the TEM image, the number of domains in each of which the longitudinal dimension of the resin (E) is not less than 1.5 times the average particle size of the fine polymer particles (A) may be not more than five, not more than three, not more than one, or not more than zero.

A method of taking out, from the aqueous latex, the coagulate to be subjected to the transmission electron microscopy is not limited to any particular one. Examples of the method encompass a method in which the aqueous latex containing the coagulate is filtered to obtain the coagulate and the coagulate thus obtained is dehydrated and dried. As the transmission electron microscopy, a known method can be employed. For example, the coagulate is frozen, and then the coagulate is sliced with use of an ultramicrotome to prepare a slice sample having a thickness of approximately 100 nm. The slice sample is stained with osmium oxide ($OsO_4$), and then subjected to a transmission electron microscope (TEM) analysis. Note that the "longitudinal dimension" of the resin (E) refers to the longest dimension (the longest straight line connecting two points on a circumference) in the TEM image. The average particle size of the primary particles of the fine polymer particles (A) can be calculated, for example, from the average of diameters of circles equal, in area, to the projections (such diameters are area-equivalent circle diameters) of randomly selected 30 fine polymer particles (A) in the TEM image.

A method of adding the resin (E) to the aqueous latex in the step 2 is not limited to any particular one. For example, a method in which the resin (E) is directly added to the aqueous latex, a method in which the resin (E) is formed into an aqueous latex and then added to the aqueous latex, a method in which the resin (E) is brought into a solution state and then added to the aqueous latex, or the like can be employed. The method in which the resin (E) is formed into an aqueous latex and then added to the aqueous latex is preferable.

In order to achieve a favorable anti-blocking property and to cause the fine polymer particles (A) to be well dispersed in the thermosetting resin (B) in the step 4, it is preferable to further add an anti-blocking agent to the aqueous latex in the step 2. The step 2 may further include a step of adding the anti-blocking agent to the aqueous latex before the slurry containing the coagulate of the fine polymer particles (A) is obtained with use of the aqueous latex. In other words, the step 2 may be (a) a step of obtaining the slurry containing the coagulate of the fine polymer particles (A) with use of the aqueous latex containing the fine polymer particles (A), the emulsifying agent (C), and the anti-blocking agent, (b) a step of obtaining the slurry containing the coagulate of the fine polymer particles (A) with use of the aqueous latex containing the fine polymer particles (A), the emulsifying agent (C), the resin (E), and the anti-blocking agent. The slurry obtained in the step 2 may be (a) a mixture containing the aqueous solvent, the fine polymer particles (A), the emulsifying agent (C), and the anti-blocking agent, (b) a mixture containing the aqueous solvent, the fine polymer particles (A), the emulsifying agent (C), the resin (E), and the anti-blocking agent.

The anti-blocking agent is not limited to any particular one, provided that the anti-blocking agent allows the above-described purpose of using the anti-blocking agent to be achieved. Examples of the anti-blocking agent encompass: anti-blocking agents composed of inorganic fine particles, such as fine particles of silicon dioxide, titanium oxide, aluminum oxide, zirconium oxide, aluminum silicate, diatomaceous earth, zeolite, kaolin, talc, calcium carbonate, calcium phosphate, barium sulfate, or magnesium hydrosilicate; anti-blocking agents composed of organic fine particles; and fat-based and/or oil-based anti-blocking agents such as polyethylene wax, higher fatty acid amides, metal soap, and silicone oil. Out of these anti-blocking agents, anti-blocking agents composed of fine particles (inorganic fine particles or organic fine particles) are preferable, and anti-blocking agents composed of organic fine particles are more preferable. The anti-blocking agents composed of organic fine particles may be anti-blocking agents composed of organic fine particles of a polymer obtained by polymerization of a composition containing at least one type of monomer selected from the group consisting of aromatic vinyl monomers, vinyl cyanide monomers, and (meth)acrylate monomers.

An anti-blocking agent composed of fine particles, in general, is in the form of a dispersion composed of the fine particles and a medium in which the fine particles are dispersed or is in the form of a colloid. The fine particles in the anti-blocking agent may have a volume-average particle size (Mv) of not more than 10 μm, or 0.05 μm to 10 μm. The amount of the anti-blocking agent added to the aqueous latex may be 0.01 parts by weight to 5.0 parts by weight, or 0.5 parts by weight to 3.0 parts by weight, wherein 100 parts by weight represents the total amount of the fine polymer particles (A) in the aqueous latex and the resin (E) added to the aqueous latex.

In the step 2, the order of adding components, that is, the coagulant (D) and the resin (E) and optionally the anti-blocking agent and any other additive described above to the aqueous latex is not limited to any particular one. All of the components may be added simultaneously to the aqueous latex. Alternatively, the components may be added individually in any order to the aqueous latex. Alternatively, the anti-blocking agent and any other additive described above may be added to the aqueous latex containing the coagulate, after the coagulate of the fine polymer particles (A) is obtained, that is, after the step 2.

(3-3. Step 3)

The step 3 is a step of taking out the coagulate from the slurry and adjusting the water content of the coagulate to not less than 10% with respect to the weight of the coagulate.

A method of taking out the coagulate from the slurry is not limited to any particular one, and a known method can be employed, provided that the aqueous solvent of the slurry and the coagulate can be separated. Examples of the method encompass a method in which the slurry is filtered and a method in which the slurry is subjected to centrifugal dehydration. The coagulate obtained in the step 3 may be further washed.

A method of adjusting the water content of the coagulate to not less than 10% with respect to the weight of the coagulate is not limited to any particular one. For example, it is possible to adjust the water content of the coagulate by altering various conditions in a method such as filtration or centrifugal dehydration employed to take out the coagulate from the slurry. Examples of the various conditions encompass a centrifugal force during the centrifugal dehydration, a rotation speed during the centrifugal dehydration, the radius of a centrifuge, and a time period during which the centrifugal dehydration is carried out.

In the step 3, the water content of the coagulate may be adjusted to not less than 10%, not less than 15%, not less than 20%, not less than 25%, or not less than 30%, with respect to the weight of the coagulate. According to the above feature, it is possible to obtain, through the subsequent step 4, a resin composition which is excellent in dispersibility of the fine polymer particles (A) in the thermosetting resin (B).

The water content of the coagulate obtained in the step 3 may be 10% to 80%, 20% to 70%, or 30% to 60%, with respect to the weight of the coagulate. According to the above feature, it is possible to obtain, through the subsequent step 4, a resin composition which is excellent in dispersibility of the fine polymer particles (A) in the thermosetting resin (B).

The coagulate obtained in the step 3 may be one in which the fine polymer particles (A) are agglutinated so that the fine polymer particles (A) are well dispersed in a mixture when the coagulate is mixed with the thermosetting resin (B) to obtain the mixture (that is, resin composition). When the mixture (that is, resin composition) obtained by mixing the coagulate obtained in the step 3 and the thermosetting resin (B) is stirred until the fine polymer particles (A) are well dispersed in the mixture, a lower stirring rotation speed and/or a shorter stirring time period are preferable, and less energy may be required for stirring. For example, the coagulate obtained in the step 3 may be arranged such that in a case where the mixture of the coagulate and the thermosetting resin (B) is stirred at 1000 rpm for 30 minutes, the dispersibility of the fine polymer particles (A) in the mixture is less than 100 μm when evaluated in accordance with JIS K5101 with use of a grind gauge. According to the above feature, it is possible to obtain a resin composition which is excellent in dispersibility of the fine polymer particles (A) in the thermosetting resin (B).

(3-4. Step 4)

The step 4 is a step of mixing the coagulate obtained in the step 3 and the thermosetting resin (B) to obtain a resin composition.

The state of the thermosetting resin (B) is not limited to any particular one, provided that the thermosetting resin (B) is flowable when mixed with the coagulate. The thermosetting resin (B) may be a solid at room temperature. In terms of achieving workability, the thermosetting resin (B) may be a liquid at room temperature.

A method of mixing the coagulate and the thermosetting resin (B) is not limited to any particular one, and a known method can be employed. Examples of the method of mixing the coagulate and the thermosetting resin (B) encompass mechanical mixing methods which involve use of a planetary centrifugal mixer, a planetary mixer, a dispersion mixer, and the like.

In the step 4, in addition to the coagulate and the thermosetting resin (B), any other component may be further mixed. Examples of the any other component encompass the components listed in the section (2-8. Any other component). The any other component may be mixed with the coagulate and the thermosetting resin (B) simultaneously. Alternatively, the any other component may be further mixed with a resin composition after the resin composition is obtained by mixing the coagulate and the thermosetting resin (B).

A mixing ratio between the coagulate and the thermosetting resin (B) is not limited to any particular one. The mixing ratio may be set as follows: 0.5% by weight to 50% by weight of the coagulate and 50% by weight to 99.5% by weight of the thermosetting resin (B); 1% by weight to 35% by weight of the coagulate and 65% by weight to 99% by weight of the thermosetting resin (B); 1.5% by weight to 25% by weight of the coagulate and 75% by weight to 98.5% by weight of the thermosetting resin (B); or 2.5% by weight to 20% by weight of the coagulate and 80% by weight to 97.5% by weight of the thermosetting resin (B), wherein 100% by weight represents the total amount of the coagulate and the thermosetting resin (B).

Surprisingly, the inventors of one or more embodiments of the present invention uniquely found that in a case where the amount of the coagulate (that is, the fine polymer particles (A)) mixed with the thermosetting resin (B) is large, it is possible to remove (exclude) water from the obtained mixture, by stirring the mixture. In other words, in a case where the amount of the coagulate mixed with the thermosetting resin (B) is large, the present production method makes it possible to provide a resin composition in accordance with one or more embodiments of the present invention, without carrying out the devolatilizing step (later described) with respect to the obtained mixture or by carrying out the devolatilizing step (later described) with respect to the obtained mixture merely for a short time period. Because the water can be efficiently removed from the mixture, the mixing ratio between the coagulate and the thermosetting resin (B) may be set as follows: 10% by weight to 80% by weight of the coagulate and 20% by weight to 90% by weight of the thermosetting resin (B); 20% by weight to 80% by weight of the coagulate and 20% by weight to 80% by weight of the thermosetting resin (B); 30% by weight to 80% by weight of the coagulate and 20% by weight to 70% by weight of the thermosetting resin (B); 40% by weight to 80% by weight of the coagulate and 20% by weight to 60% by weight of the thermosetting resin (B); 45% by weight to 80% by weight of the coagulate and 20% by weight to 55% by weight of the thermosetting resin (B); 50% by weight to 80% by weight of the coagulate and 20% by weight to 50% by weight of the thermosetting resin (B); 55% by weight to 80% by weight of the coagulate and 20% by weight to 45% by weight of the thermosetting resin (B); 57% by weight to 80% by weight of the coagulate and 20% by weight to 43% by weight of the thermosetting resin (B); 60% by weight to 80% by weight of the coagulate and 20% by weight to 40% by weight of the thermosetting resin (B); or 63% by weight to 80% by weight of the coagulate and 20% by weight to 37% by weight of the thermosetting resin (B), wherein 100% by weight represents the total amount of the coagulate and the thermosetting resin (B).

The step 4 may be a step of mixing the coagulate and the thermosetting resin (B) so that the mixture is obtained which may contain the fine polymer particles (A) in an amount of not less than 10% by weight, not less than 20% by weight, not less than 25% by weight, not less than 30% by weight, not less than 35% by weight, or not less than 40% by weight, with respect to 100% by weight of the mixture. It can also be said that the "mixture" referred to here is a "resin composition". According to the above feature, it is possible to efficiently remove water from the obtained resin composition (mixture).

The step 4 may further include the following steps 4a through 4c:
(step 4a) mixing the coagulate and the thermosetting resin (B) to obtain a mixture;
(step 4b) stirring the mixture obtained in the step 4a to remove water from the coagulate; and
(step 4c) further mixing the mixture obtained in the step 4b with the thermosetting resin (B).

According to the above feature, the present production method makes it possible to provide a resin composition having a water content of 4000 ppm to 400000 ppm with respect to the weight of the fine polymer particles (A), without carrying out the devolatilizing step (later described) with respect to the obtained mixture or by carrying out the devolatilizing step (later described) with respect to the obtained mixture merely for a short time period. Moreover, according to the above feature, the present production method also makes it possible to provide a resin composition having a water content of 2000 ppm to 40000 ppm with respect to the weight of the resin composition, without carrying out the devolatilizing step (later described) with respect to the obtained mixture or by carrying out the devolatilizing step (later described) with respect to the obtained mixture merely for a short time period. Therefore, it is possible to suppress costs (for example, time and thermal energy) spent in the devolatilizing step (later described).

It can also be said that the step 4a is a step of obtaining the mixture which contains the fine polymer particles (A) at a high concentration. It can also be said that the step 4c is a step of obtaining the mixture (resin composition) which contains the fine polymer particles (A) at a concentration lower than that of the fine polymer particles (A) contained in the mixture obtained in the step 4a.

In the step 4b, a method of stirring the mixture obtained in the step 4a is not limited to any particular one, and a known method can be employed.

It can also be said that the step 4c is a step of further adding the thermosetting resin (B) to the mixture obtained in the step 4b, and it can also be said that the step 4c is a step of mixing the mixture obtained in the step 4b with the thermosetting resin (B).

In a case where the coagulate and the thermosetting resin (B) are mixed to produce a resin composition which contains the fine polymer particles (A) at a given concentration, a case where specific amounts of the coagulate and the thermosetting resin (B) each of which has been adjusted so that an intended concentration of the fine polymer particles (A) is achieved are mixed at a time will be referred to as a case D. It can also be said that the case D is a case where the present production method does not include the steps 4a through 4c. In a case where the coagulate and the thermosetting resin (B) are mixed to produce a resin composition which contains the fine polymer particles (A) at a given concentration, a case where the resin composition in which an intended concentration of the fine polymer particles (A) is achieved is obtained by (i) producing the mixture of the thermosetting resin (B) and the coagulate in which the concentration of the fine polymer particles (A) is higher than the given concentration, (ii) stirring the mixture, and (iii) further adding the thermosetting resin (B) to the mixture will be referred to as a case E. It can also be said that the case E is a case where the present production method includes the steps 4a through 4c. Surprisingly, the inventors of one or more embodiments of the present invention uniquely found that the case E makes it possible to reduce the water content of the resin composition to be obtained, as compared with the case D.

Specific aspects of the steps 4a through 4c include the following aspects:
(step 4a) mixing 35 parts by weight to 50 parts by weight of the coagulate and 50 parts by weight to 65 parts by weight of the thermosetting resin (B) to obtain the mixture;
(step 4b) stirring the mixture obtained in the step 4a to remove water from the coagulate; and (step 4c) further mixing the mixture obtained in the step 4b with 5 parts by weight to 20 parts by weight of the thermosetting resin (B).

The step 4a may be a step of mixing the coagulate and the thermosetting resin (B) so that the mixture is obtained which may contain the fine polymer particles (A) in an amount of not less than 10% by weight, not less than 20% by weight, not less than 25% by weight, not less than 30% by weight, not less than 35% by weight, or not less than 40% by weight, with respect to 100% by weight of the mixture. According to the above feature, it is possible to, in the step 4b, efficiently remove water from the coagulate.

The present production method may include the devolatilizing step for further devolatilizing the resin composition obtained in the step 4. By including the devolatilizing step, it is possible to further reduce the water content of the resin composition. Note that, in the present disclosure, the term "devolatilization" can be considered synonymous with the term "deaeration", and they are interchangeable. A method of devolatilizing the resin composition is not limited to any particular one, and a known method can be employed. Examples of the method encompass: a method in which the resin composition is introduced into a container, the temperature inside the container is raised, and the pressure inside the container is reduced; a method in which the resin composition is introduced into a container and a dry gas and the resin composition are subjected to countercurrent contact within the container; a continuous method in which a thin-film evaporator is used; and a method in which an extruder or a continuous stirred tank each of which is equipped with a devolatilizing mechanism is used. Conditions, such as a temperature or a required time period, in the devolatilizing step can be set as appropriate, provided that the conditions do not impair the quality and the physical properties of the resin composition.

4. Cured Product

A cured product in accordance with one or more embodiments of the present invention is obtained by curing the present resin composition described in the section [2. Resin composition] or a resin composition produced by the present production method described in the section [3. Method of producing resin composition]. Since the cured product in accordance with one or more embodiments of the present invention has the above feature, the cured product has (a) an excellent surface appearance, (b) high rigidity and a high elastic modulus, and (c) excellent toughness and excellent adhesiveness.

The cured product in accordance with one or more embodiments of the present invention is also simply referred to as a present cured product.

The present cured product can be produced from the present resin composition with use of the present resin composition. A method of producing the present cured product, that is, a method of curing the present resin composition or a resin composition produced by the present production method is not limited to any particular one, and a known method can be employed.

5. Uses

The present resin composition, a resin composition produced by the present production method, and the present cured product can have various uses, and the uses are not limited to any particular ones. The present resin composition, a resin composition produced by the present production method, and the present cured product may be used for, for example, adhesive agents, coating materials, binders for reinforcement fibers, composite materials, molding materials for 3D printers, sealants, electronic substrates, ink binders, wood chip binders, binder for rubber chips, foam chip binders, binders for castings, rock mass consolidation materials for floor materials and ceramics, urethane foams, and the like. Examples of the urethane foams encompass automotive seats, automotive interior parts, sound absorbing materials, damping materials, shock absorbers (shock absorbing materials), heat insulating materials, and floor material cushions for construction.

The present resin composition, a resin composition produced by the present production method, and the present cured product may be used for, out of the above uses, adhesive agents, coating materials, binders for reinforcement fibers, composite materials, molding materials for 3D printers, sealants, and electronic substrates.

(5-1. Adhesive Agent)

An adhesive agent in accordance with one or more embodiments of the present invention contains the present resin composition described in the section [2. Resin composition] or a resin composition produced by the present production method described in the section [3. Method of producing resin composition]. The adhesive agent in accordance with one or more embodiments of the present invention has the above feature, and therefore has excellent adhesiveness.

The adhesive agent in accordance with one or more embodiments of the present invention is also simply referred to as a present adhesive agent.

The present adhesive agent can be suitably used for various purposes, for example, for automotive interior materials, general woodworking, furniture, interior decoration, wall materials, and food packaging.

The present adhesive agent exhibits favorable adhesiveness to various adherends such as cold-rolled steel, aluminum, fiberglass-reinforced polyester (FRP), panels made of cured products obtained by curing thermosetting resins (for example, epoxy resin) reinforced with carbon fibers, panels made of thermoplastic resin sheets reinforced with carbon fibers, sheet molding compounds (SMC), an acrylonitrile-butadiene-styrene copolymer (ABS), polyvinyl chloride (PVC), polycarbonate, polypropylene, TPO, wood, and glass.

The present adhesive agent has excellent adhesiveness and excellent plasticity not only at low temperatures (approximately −20° C.) to ordinary temperatures but also at high temperatures (approximately 80° C.). Therefore, the present adhesive agent can be more suitably used as an adhesive agent for structures.

An adhesive agent for structures which employs the present adhesive agent can be used as an adhesive agent for, for example, structural members in the fields of automobiles and vehicles (for example, shinkansen (bullet trains) and trains), civil engineering, construction, building materials, woodworking, electricity, electronics, aircrafts, space industry, and the like. Specific examples of automobile-related uses encompass: bonding of interior materials such as ceilings, doors, and seats; and bonding of automotive luminaires, such as lamps, and exterior materials, such as body side molding.

The present adhesive agent can be produced from the present resin composition with use of the present resin composition. A method of producing the present adhesive agent is not limited to any particular one, and a known method can be employed.

(5-2. Coating Material)

A coating material in accordance with one or more embodiments of the present invention contains the present resin composition described in the section [2. Resin composition] or a resin composition produced by the present production method described in the section [3. Method of producing resin composition]. The coating material in accordance with one or more embodiments of the present invention has the above feature, and therefore can provide a coating film having excellent load bearing and excellent wear resistance.

The coating material in accordance with one or more embodiments of the present invention is also simply referred to as a present coating material.

In a case where the present coating material is applied to, for example, a floor or a corridor, a generally used application method can be employed. For example, after a primer is applied to a base material which has been subjected to surface preparation, the primer on the base material is uniformly coated with the present coating material with use of a trowel, a roller, a rake, a spray gun, and/or the like depending on conditions under which the primer is coated with the present coating material. After the primer is coated with the present coating material, curing of the present coating material proceeds, so that a good-performance coating is obtained. The coating film obtained by curing the present coating material can be a coating film having excellent load bearing and excellent wear resistance.

Depending on a method of applying the present coating material, the viscosity of the resin composition used for the coating material may be adjusted. For example, in a case where a trowel or a rake is used to apply the present coating material, the viscosity of the resin composition used for the present coating material can be adjusted to, generally, approximately 500 cps/25° C. to 9,000 cps/25° C. In a case where a roller or a spray is used to apply the present coating material, the viscosity of the resin composition used for the present coating material can be adjusted to, generally, approximately 100 cps/25° C. to 3,000 cps/25° C.

The base material (in other words, the material of the floor or the corridor) to which the present coating material is applied is not limited to any particular one. Specific examples of the base material encompass: (a) inorganic base materials such as concrete walls, concrete plates, concrete blocks, concrete masonry unit (CMU), mortar plates, autoclaved light-weight concrete (ALC) plates, gypsum boards (such as Dens Glass Gold manufactured by Georgia Pacific), and slate boards; (b) organic base materials such as wood-based base materials (such as wood, plywood, and oriented strand board (OSB)), asphalt, waterproof sheets made of modified bitumen, waterproof sheets made of ethylene-propylene-diene rubber (EPDM), waterproof sheets made of TPO, plastics, FRP, and urethane foam heat insulating materials; and (c) metal-based base materials such as metal panels.

A case will be described where the present coating material is applied to a metal base material or a porous base material. A laminate, obtained by applying and then curing the present coating material, is excellent in resistance of such a base material to corrosion. Furthermore, a coating film, obtained by applying and then curing the present coating material, can impart excellent crack resistance and excellent load bearing to the base material. Therefore, an aspect in which the present coating material is applied to a metal base or a porous base material is a particularly preferable aspect.

A method of applying the present coating material is not limited to any particular one, and the present coating material can be applied by a known method such as a trowel, a rake, a brush, a roller, an air spray, and/or an airless spray.

The present coating materials is not particularly limited in terms of uses. The present coating material can be used for automobiles, electric apparatus, office equipment, construction materials, wood, coated floors, paving, heavy-duty anticorrosion, anticorrosion of concrete, waterproofing of rooftops and roofs, anticorrosion of rooftops and roofs, waterproof coating films for underground waterproofing, automotive refinishing, can coating, topcoat, intercoat, undercoat, primer, electro-deposition paint, highly weather resistant paint, non-yellowing paint, and the like. In a case where the present coating material is used as a coating material for coated floors, a coating material for paving, and the like, the present coating material can be used in factories, laboratories, warehouses, clean rooms, and the like.

The present coating material can be produced from the present resin composition with use of the present resin composition. A method of producing the present coating material is not limited to any particular one, and a known method can be employed.

(5-3. Composite Material)

A composite material in accordance with one or more embodiments of the present invention contains, as a binder for reinforcement fibers, the present resin composition described in the section [2. Resin composition] or a resin composition produced by the present production method described in the section [3. Method of producing resin composition]. The composite material in accordance with one or more embodiments of the present invention has the above feature, and is therefore advantageous in that it has excellent toughness and excellent impact resistance.

The composite material in accordance with one or more embodiments of the present invention is also simply referred to as a present composite material.

The present composite material can contain reinforcement fibers. The reinforcement fibers are not limited to any particular ones. Example of the reinforcement fibers encompass glass fibers, continuous glass fibers, carbon fibers, natural fibers, metal fibers, thermoplastic resin fibers, boron fibers, aramid fibers, polyethylene fibers, and xyron-reinforced fibers. Out of these reinforcement fibers, glass fibers and carbon fibers are particularly preferable.

A method of producing the present composite material (molding method) is not limited to any particular one. Examples of the method encompass: an autoclave molding method in which a prepreg is used; a filament winding molding method; a hand lay-up molding method; a vacuum bag molding method; a resin transfer molding (RTM) method; a vacuum-assisted resin transfer molding (VARTM) method; a pultrusion molding method; an injection molding method, a sheet winding molding method; a spray up molding method; a bulk molding compound (BMC) method; and a sheet molding compound (SMC) method.

In particular, in a case where carbon fibers are used as the reinforcement fibers, an autoclave molding method in which a prepreg is used; a filament winding molding method; a hand lay-up molding method; a vacuum bag molding method; a resin transfer molding (RTM) method; a vacuum-assisted resin transfer molding (VARTM) method; or the like may be employed as the method of producing the present composite material.

The present composite material is not particularly limited in terms of uses. The present composite material can be used for aircrafts, spacecrafts, automobiles, bicycles, watercrafts, weapons, wind turbines, sports goods, containers, building materials, waterproof materials, printed circuit boards, electrically insulating materials, and the like.

The present composite material can be produced from the present resin composition with use of the present resin composition. In regard to further details of the reinforcement fibers, the production method (molding method), producing conditions (molding conditions), agents blended, uses, and the like concerning the present composite material, any of those disclosed in the following documents can be employed: United States Patent Application Publication No. 2006/0173128, United States Patent Application Publication No. 2012/0245286, Published Japanese Translation of PCT International Application, Tokuhyo, No. 2002-530445 (PCT International Application WO2000/029459), Japanese Patent Application Publication, Tokukaisho, No. 55-157620 (U.S. Pat. No. 4,251,428), Published Japanese Translation of PCT International Application, Tokuhyo, No. 2013-504007 (PCT International Application WO2011/028271), Japanese Patent Application Publication, Tokukai, No. 2007-125889 (United States Patent Application Publication No. 2007/0098997), and Japanese Patent Application Publication, Tokukai, No. 2003-220661 (United States Patent Application Publication No. 2003/0134085).

(5-4. Molding Material for 3D Printer)

A molding material for 3D printers in accordance with one or more embodiments of the present invention contains the present resin composition described in the section [2. Resin composition] or a resin composition produced by the present production method described in the section [3. Method of producing resin composition]. The molding material for 3D printers in accordance with one or more embodiments of the present invention has the above feature, and is therefore advantageous in that it has excellent toughness and excellent impact resistance.

The molding material for 3D printers in accordance with one or more embodiments of the present invention is also simply referred to as a present molding material.

The present molding material is not particularly limited in terms of uses. The present molding material can be used for goods made as samples for testing design, functions, and the like before actual products are made; aircraft parts; construction members; and parts of medical equipment.

The present molding material can be produced from the present resin composition with use of the present resin composition. A method of producing the present molding material is not limited to any particular one, and a known method can be employed.

(5-5. Sealant)

A sealant in accordance with one or more embodiments of the present invention is obtained with use of the present resin composition described in the section [2. Resin composition] or a resin composition produced by the present production method described in the section [3. Method of producing resin composition]. The sealant in accordance with one or more embodiments of the present invention has the above feature, and is therefore advantageous in that it has excellent toughness and excellent impact resistance.

The sealant in accordance with one or more embodiments of the present invention is also simply referred to as a present sealant.

The present sealant is not particularly limited in terms of uses. The present sealant can be used for sealing of various electric apparatus (such as semiconductors), power devices, and the like.

The present sealant can be produced from the present resin composition with use of the present resin composition. A method of producing the present sealant is not limited to any particular one, and a known method can be employed.

(5-6. Electronic Substrate)

An electronic substrate in accordance with one or more embodiments of the present invention is obtained with use of the present resin composition described in the section [2. Resin composition] or a resin composition produced by the present production method described in the section [3. Method of producing resin composition]. The electronic substrate in accordance with one or more embodiments of the present invention has the above feature, and is therefore advantageous in that it has excellent toughness and excellent impact resistance.

The electronic substrate in accordance with one or more embodiments of the present invention is also simply referred to as a present electronic substrate.

The present electronic substrate is not particularly limited in terms of uses. The present electronic substrate can be used for printed circuits, printed wiring, printed circuit boards, products provided with printed circuits therein, printed wiring boards, and printed boards.

The present electronic substrate can be produced from the present resin composition with use of the present resin composition. A method of producing the present electronic substrate is not limited to any particular one, and a known method can be employed.

One or more embodiments of the present invention can be arranged as follows.

[X1] A method of producing a resin composition, including: a step 1 of obtaining an aqueous latex containing fine polymer particles (A) and an emulsifying agent (C); a step 2 of obtaining, with use of the aqueous latex, slurry containing a coagulate of the fine polymer particles (A); a step 3 of taking out the coagulate from the slurry and adjusting a water content of the coagulate to not less than 10% with respect to a weight of the coagulate; and a step 4 of mixing the coagulate and a thermosetting resin (B), the fine polymer particles (A) containing a rubber-containing graft copolymer having an elastic body and a graft part grafted to the elastic body, the graft part being a polymer containing at least one type of structural unit derived from at least one type of monomer selected from the group consisting of aromatic vinyl monomers, vinyl cyanide monomers, and (meth)acrylate monomers, the step 2 further including a step of adding a resin (E) to the aqueous latex, the resin (E) being a liquid having a viscosity of 100 mPa·s to 1,000,000 mPa·s at 25° C., a semisolid, or a solid.

[X2] The method as described in [X1], wherein the coagulate obtained in the step 3 is arranged such that in a case where a mixture of the coagulate and the thermosetting resin (B) is stirred at 1000 rpm for 30 minutes, dispersibility of the fine polymer particles (A) in the mixture is less than 100 μm when evaluated in accordance with JIS K5101 with use of a grind gauge.

[X3] The method as described in [X1] or [X2], wherein the step 4 is a step of mixing the coagulate and the thermosetting resin (B) so that a mixture is obtained which contains the fine polymer particles (A) in an amount of not less than 40% by weight with respect to 100% by weight of the mixture.

[X4] The method as described in [X1] or [X2], wherein the step 4 further includes: a step 4a of mixing the coagulate and the thermosetting resin (B) to obtain a mixture; a step 4b of stirring the mixture obtained in the step 4a to remove water from the coagulate; and a step 4c of further mixing the mixture obtained in the step 4b with the thermosetting resin (B).

[X5] The method as described in [X4], wherein the step 4a is a step of mixing the coagulate and the thermosetting resin (B) so that the mixture is obtained which contains the fine polymer particles (A) in an amount of not less than 40% by weight with respect to 100% by weight of the mixture.

[X6] The method as described in any one of [X1] through [X5], wherein any one of the following conditions (1) and (2) is satisfied: (1) the step 2 further includes a step of adding a coagulant (D) to the aqueous latex, wherein an aqueous solution containing 0.1% of the emulsifying agent (C) and 0.5% of the coagulant (D) has foamability (foaming property, cm) of not more than 17 cm according to the Ross-Miles method; and (2) the step 2 further includes a step of adding the coagulant (D) to the aqueous latex, wherein no solid precipitate is present in an aqueous solution containing 1% of the emulsifying agent (C) and 5% of the coagulant (D).

[X7] The method as described in any one of [X1] through [X6], wherein the emulsifying agent (C) is a phosphorus-based emulsifying agent.

[X8] The method as described in any one of [X1] through [X7], wherein the thermosetting resin (B) includes at least one type of thermosetting resin selected from the group consisting of: resins each containing a polymer obtained by polymerizing an ethylenically unsaturated monomer; epoxy resins; phenolic resins; polyol resins; and amino-formaldehyde resins.

[X9] The method as described in any one of [X1] through [X8], wherein the elastic body includes at least one type of elastic body selected from the group consisting of diene-based rubbers, (meth)acrylate-based rubbers, and polysiloxane rubber-based elastic bodies.

[X10] A resin composition containing water, fine polymer particles (A), and a thermosetting resin (B), the fine polymer particles (A) containing a rubber-containing graft copolymer having an elastic body and a graft part grafted to the elastic body, the elastic body including at least one type of elastic body selected from the group consisting of diene-based rubbers, (meth)acrylate-based rubbers, and polysiloxane rubber-based elastic bodies, the graft part being a polymer containing at least one type of structural unit derived from at least one type of monomer selected from the group consisting of aromatic vinyl monomers, vinyl cyanide monomers, and (meth)acrylate monomers, the thermosetting resin (B) including at least one type of thermosetting resin selected from the group consisting of: resins each containing a polymer obtained by polymerizing an ethylenically unsaturated monomer; epoxy resins; phenolic resins; polyol resins; and amino-formaldehyde resins, the resin composition containing the fine polymer particles (A) in an amount of 1% by weight to 50% by weight and the thermosetting resin (B) in an amount of 50% by weight to 99% by weight, wherein 100% by weight represents a total amount of the fine polymer particles (A) and the thermosetting resin (B), the resin composition having a water content of 2000 ppm to 40000 ppm with respect to a weight of the resin composition, the resin composition not substantially containing an organic solvent, the resin composition containing sulfur (S) in an amount of not more than 2300 ppm and phosphorus (P) in an amount of not more than 1200 ppm, wherein the wording "not substantially containing an organic solvent" means that an amount of the organic solvent contained in the resin composition is not more than 100 ppm with respect to the weight of the resin composition.

[X11] The resin composition as described in [X10], wherein dispersibility of the fine polymer particles (A) in the resin composition is less than 100 μm, when evaluated in accordance with JIS K5101 with use of a grind gauge.

[X12] The resin composition as described in [X10] or [X11], further containing phosphorus.

[X13] The resin composition as described in any one of [X10] through [X12], further containing a resin (E), the resin (E) being a liquid having a viscosity of 100 mPa·s to 1,000,000 mPa·s at 25° C., a semisolid, or a solid.

[X14] A cured product obtained by curing a resin composition as described in any one of [X10] through [X13].

[X15] An adhesive agent containing a resin composition as described in any one of [X10] through [X13].

One or more embodiments of the present invention can be arranged as follows.

[Y1] A resin composition containing water, fine polymer particles (A), and a thermosetting resin (B), the fine polymer particles (A) containing a rubber-containing graft copolymer having an elastic body and a graft part grafted to the elastic body, the elastic body including at least one type of elastic body selected from the group consisting of diene-based rubbers, (meth)acrylate-based rubbers, and polysiloxane rubber-based elastic bodies, the graft part being a polymer containing at least one type of structural unit derived from at least one type of monomer selected from the group consisting of aromatic vinyl monomers, vinyl cyanide monomers, and (meth)acrylate monomers, the thermosetting resin (B) including at least one type of thermosetting resin selected from the group consisting of: resins each containing a polymer obtained by polymerizing an ethylenically unsaturated monomer; epoxy resins; phenolic resins; polyol resins; and amino-formaldehyde resins, the resin composition containing the fine polymer particles (A) in an amount of 1% by weight to 50% by weight and the thermosetting resin (B) in an amount of 50% by weight to 99% by weight, wherein 100% by weight represents a total amount of the fine polymer particles (A) and the thermosetting resin (B), the resin composition having a water content of 2000 ppm to 40000 ppm with respect to a weight of the resin composition, the resin composition not substantially containing an organic solvent, wherein the wording "not substantially containing an organic solvent" means that an amount of the organic solvent contained in the resin composition is not more than 100 ppm with respect to the weight of the resin composition.

[Y2] The resin composition as described in [Y1], further containing phosphorus.

[Y3] The resin composition as described in [Y1] or [Y2], further containing a resin (E), the resin (E) having a viscosity of 100 mPa·s to 1,000,000 mPa·s at 25° C.

[Y4] A method of producing a resin composition, including: a step 1 of obtaining an aqueous latex containing fine polymer particles (A) and an emulsifying agent (C); a step of obtaining, with use of the aqueous latex, slurry containing a coagulate of the fine polymer particles (A); a step 3 of taking out the coagulate from the slurry and adjusting a water content of the coagulate to not less than 10% with respect to a weight of the coagulate; and a step 4 of mixing the coagulate and a thermosetting resin (B), the fine polymer particles (A) containing a rubber-containing graft copolymer having an elastic body and a graft part grafted to the elastic body, the graft part being a polymer containing at least one type of structural unit derived from at least one type of monomer selected from the group consisting of aromatic vinyl monomers, vinyl cyanide monomers, and (meth)acrylate monomers.

[Y5] The method as described in [Y4], wherein the step 4 further includes: a step 4a of mixing the coagulate and the thermosetting resin (B) to obtain a mixture; a step 4b of stirring the mixture obtained in the step 4a to remove water from the coagulate; and a step 4c of further mixing the mixture obtained in the step 4b with the thermosetting resin (B).

[Y6] The method as described in [Y4] or [Y5], wherein any one of the following conditions (1) and (2) is satisfied: (1) the step 2 further includes a step of adding a coagulant (D) to the aqueous latex, wherein an aqueous solution containing 0.1% of the emulsifying agent (C) and 0.5% of the coagulant (D) has foamability (foaming property, cm) of not more than 17 cm according to the Ross-Miles method; and (2) the step 2 further includes a step of adding the coagulant (D) to the aqueous latex, wherein no solid precipitate is present in an aqueous solution containing 1% of the emulsifying agent (C) and 5% of the coagulant (D).

[Y7] The method as described in [Y6], wherein the emulsifying agent (C) is a phosphorus-based emulsifying agent.

[Y8] The method as described in any one of [Y4] through [Y7], wherein the step 2 further includes a step of adding a resin (E) to the aqueous latex, the resin (E) having a viscosity of 100 mPa·s to 1,000,000 mPa·s at 25° C.

[Y9] The method as described in any one of [Y4] through [Y8], wherein the thermosetting resin (B) includes at least one type of thermosetting resin selected from the group consisting of: resins each containing a polymer obtained by polymerizing an ethylenically unsaturated monomer; epoxy resins; phenolic resins; polyol resins; and amino-formaldehyde resins.

[Y10] The method as described in any one of [Y4] through [Y9], wherein the elastic body includes at least one type of elastic body selected from the group consisting of diene-based rubbers, (meth)acrylate-based rubbers, and polysiloxane rubber-based elastic bodies.

[Y11] A cured product obtained by curing a resin composition as described in any one of [Y1] through [Y3] or a resin composition produced by a method as described in any one of [Y4] through [Y10].

[Y12] An adhesive agent containing a resin composition as described in any one of [Y1] through [Y3] or a resin composition produced by a method as described in any one of [Y4] through [Y10].

[Y13] A coating material containing a resin composition as described in any one of [Y1] through [Y3] or a resin composition produced by a method as described in any one of [Y4] through [Y10].

[Y14] A composite material containing, as a binder for reinforcement fibers, a resin composition as described in any one of [Y1] through [Y3] or a resin composition produced by a method as described in any one of [Y4] through [Y10].

[Y15] A molding material for a 3D printer, the molding material containing a resin composition as described in any one of [Y1] through [Y3] or a resin composition produced by a method as described in any one of [Y4] through [Y10].

[Y16] A sealant containing a resin composition as described in any one of [Y1] through [Y3] or a resin composition produced by a method as described in any one of [Y4] through [Y10].

[Y17] An electronic substrate containing a resin composition as described in any one of [Y1] through [Y3] or a resin composition produced by a method as described in any one of [Y4] through [Y10].

EXAMPLES

The following description will discuss one or more embodiments of the present invention in detail with reference to Examples and Comparative Examples. Note that one or more embodiments of the present invention are not limited to these examples. One or more embodiments of the present invention can be altered as appropriate within the scope of the gist disclosed herein. One or more embodiments of the present invention also include, their technical scope, one or more embodiments achieved by altering one or more embodiments. Note that in the following Examples and Comparative Examples, "parts" means "parts by weight", and "%" means "% by weight".

[Evaluation Method]

First, the following description will discuss methods of evaluating resin compositions produced in Examples and Comparative Examples.

<Measurement of Volume-Average Particle Size>

The volume-average particle size (Mv) of an elastic body or fine polymer particles (A) dispersed in an aqueous latex was measured with use of Nanotrac WaveII-EX150 (manufactured by MicrotracBEL Corp.). A test specimen used for measurement was prepared by diluting the aqueous latex in deionized water. When the measurement was made, the refractive index of water and the refractive index of the elastic body or the fine polymer particles (A) obtained in each of Production Examples were inputted, measurement time was set to 120 seconds, and the concentration of the test specimen was adjusted such that a load index fell within the range of 1 to 20.

<Differential Scanning Calorimetry (DSC) of Thermosetting Resin (B)>

The differential scanning calorie of a liquid epoxy resin (JER828, manufactured by Mitsubishi Chemical Corporation), which was a thermosetting resin (B) used in Examples and Comparative Examples below, was measured with use of DSC7020 (manufactured by Hitachi High-Tech Science Corporation). A rate of temperature rise was set to 10° C./min. As a result, the liquid epoxy resin was found to have an endothermic peak at −15° C.

<Measurement of Viscosity>

(a) The viscosity of the liquid epoxy resin (JER828, manufactured by Mitsubishi Chemical Corporation), which was the thermosetting resin (B) and a resin (E) used in Examples and Comparative Examples below, or (b) the viscosity of an obtained resin composition was measured. A device used was a digital viscometer DV-II+Pro manufactured by BROOKFIELD FIELD. Further, a spindle CPE-52 was used for some viscosity ranges. The viscosity was measured at a temperature of 25° C., while a shear rate was changed as necessary. As a result, the viscosity of the liquid epoxy resin was 12,000 mPa·s.

<Measurement of Water Content of Coagulate>

A water-containing resin was dried in an oven at 120° C. for 1 hour, and the water content of the water-containing resin was measured from values of the weight of the water-containing resin which values were obtained before and after drying.

<Evaluation of Dispersibility of Coagulate>

Part of a coagulate obtained in Examples and Comparative Examples was used to evaluate the dispersibility of the coagulate. Specifically, evaluation was made as follows. Part of the coagulate and the liquid epoxy resin (JER828, manufactured by Mitsubishi Chemical Corporation), which was the thermosetting resin (B), were introduced into a container (disposable cup) to obtain a mixture. Note, here, that (i) the concentration of the fine polymer particles (A) in the mixture was 30%, (ii) the weight of a solid content (total weight of the fine polymer particles (A) and the thermosetting resin (B)) in the mixture was 40 g, and (iii) the capacity of the container was 100 mL. The capacity of the container was approximately 1 to 3 times the volume of the prepared mixture of the coagulate and the liquid epoxy resin. The obtained mixture was mixed with use of a planetary centrifugal mixer (ARE310, manufactured by Thinky Corporation) under any one of the following conditions: (i) mixing was carried out at a rotation speed of 1000 rpm for 30 minutes, (i) mixing was carried out at a rotation speed of 1000 rpm for 120 minutes, and (iii) mixing was carried out at a rotation speed of 2000 rpm for 30 minutes. Thereafter, the obtained mixture was transferred to a flask, and vacuum degassing was carried out with use of an evaporator having a water bath at 80° C. The dispersibility of the fine polymer particles (A) in the obtained mixture was evaluated in accordance with JIS K5101 with use of a grind gauge. Specifically, the obtained mixture was placed on a grind gauge, the mixture on a gauge was scraped with use of a metal scraper, and the state of dispersion was visually checked. The point on the scale of the grind gauge, at which there are 5 to 10 particles (which became apparent by scraping) within a range 3 mm in width, was read. Table 1 shows results. Note that when the dispersibility is evaluated as 0 μm, a lower rotation speed and a shorter stirring time period mean more excellent dispersibility.

<Evaluation of Dispersibility of Resin Composition>

The dispersibility of the fine polymer particles (A) or rubber particles in the thermosetting resin (B) in the resin composition was evaluated in accordance with JIS K5101 with use of a grind gauge. Specifically, evaluation was made as follows. The resin composition was placed on a grind gauge, the resin composition on a gauge was scraped with use of a metal scraper, and the state of dispersion was visually checked. The point on the scale of the grind gauge, at which there are 5 to 10 particles (which became apparent by scraping) within a range 3 mm in width, was read. Table 1 shows results.

<Measurement of Water Content of Resin Composition>

The water content of the obtained resin composition was measured with use of Karl Fischer moisture titrator CA-100 (manufactured by Mitsubishi Chemical Corporation Co., Ltd.). A test specimen was obtained by mixing, in equal amounts, the resin composition and methyl ethyl ketone dehydrated with zeolite. The test specimen was used for measurement.

<Measurement of Solvent Content of Resin Composition>

The solvent content of the obtained resin composition was measured with use of gas chromatography (GC-2014, manufactured by Shimadzu Corporation).

difference between the values of the weight of the glass filter which values were obtained before and after the filtration was greater than 0 (zero), it is meant that a solid precipitated in the aqueous solution. In that case, an obtained result (weight of a precipitate) was also put. Further, white turbidity of the aqueous solution in which no solid precipitate was present was visually evaluated. Table 1 shows results.

TABLE 1

| Emulsifying agent (C) | DBS | DBS | Sodium polyoxyethylene lauryl ether phosphate | Sodium polyoxyethylene lauryl ether phosphate | Sodium polyoxyethylene lauryl ether phosphate |
|---|---|---|---|---|---|
| Coagulant (D) | Calcium acetate | Sodium acetate | Calcium acetate | Magnesium acetate | Sodium acetate |
| Precipitate | 2.49 g | No precipitate | No precipitate | No precipitate | No precipitate |
| Foamability | 6.3 cm | 21 cm | 4.3 cm | 4.8 cm | 16.5 cm |

<Remaining Emulsifying Agent Content>

The amount of an emulsifying agent (C) contained in the resin composition (remaining emulsifying agent content) was measured with use of an X-ray fluorescence analyzer SPECTRO XEPOS (manufactured by SPECTRO). In a case where sodium dodecylbenzenesulfonate (DBS) was used as an emulsifying agent, a result of the amount of sulfur, out of obtained results, was regarded as the remaining emulsifying agent content. In a case where sodium polyoxyethylene lauryl ether phosphate was used as the emulsifying agent (C), a result of the amount of phosphorus, out of obtained results, was regarded as the remaining emulsifying agent content.

<Surface Appearance>

A surface of an obtained cured product was visually observed, and surface appearance was evaluated in accordance with the following criteria.

Accepted: No air bubble was present on the surface of the cured product.

Rejected: Air bubbles were present on the surface of the cured product.

<Relationship Between Emulsifying Agent (C) and Coagulant (D): Foamability According to Ross-Miles Method>

An aqueous solution (test aqueous solution) was prepared which contained 0.1% of one of emulsifying agents (C) used and 0.5% of one of coagulants (D) used. Into a cylindrical container having a diameter of 50 mm, 50 g of the test aqueous solution was poured, and 200 g of an aqueous emulsifying agent solution was caused to flow down from a height of 900 mm from a liquid level, and the height of generated bubbles was measured. Table 1 shows results.

<Relationship Between Emulsifying Agent (C) and Coagulant (D): Evaluation of Precipitated Reaction Product>

An aqueous solution (test aqueous solution) was prepared which contained 1% of one of the emulsifying agents (C) used and 5% of one of the coagulants (D) used. The test aqueous solution was filtered with use of a glass filter having pores of 5 μm to 10 μm, and the glass filter was dried at 50° C. for 5 hours. Thereafter, the difference between values of the weight of the glass filters which values were obtained before and after filtration was measured. In a case where the difference between the values of the weight of the glass filter which values were obtained before and after the filtration was 0 (zero), it was determined that no solid precipitate was present in the aqueous solution, and then "No precipitate" was put in the row of "Solid precipitate". In a case where the 1. Formation of Elastic Body by Polymerization Production Example 1-1: Preparation of Polybutadiene Rubber Latex (R-1)

Into a pressure-resistant polymerization apparatus were introduced 200 parts of deionized water, 0.03 parts of tripotassium phosphate, 0.002 parts of disodium ethylenediaminetetraacetate (EDTA), 0.001 parts of ferrous sulfate heptahydrate, and 1.55 parts of sodium dodecylbenzenesulfonate (DBS), which was the emulsifying agent (C). Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 100 parts of butadiene (Bd) was introduced into the pressure-resistant polymerization apparatus, and the temperature inside the pressure-resistant polymerization apparatus was raised to 45° C. Subsequently, 0.03 parts of paramenthane hydroperoxide (PHP) was introduced into the pressure-resistant polymerization apparatus, and then 0.10 parts of sodium formaldehyde sulfoxylate (SFS) was introduced into the pressure-resistant polymerization apparatus.

Polymerization was then started. At the time 15 hours had elapsed from the start of the polymerization, a resultant reaction solution was subjected to devolatilization under reduced pressure to remove, from the reaction solution, a remaining monomer that had not been used in the polymerization, so as to end the polymerization. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-1), which contained an elastic body containing polybutadiene rubber as a main component, was obtained. The volume-average particle size of the elastic body contained in the obtained aqueous latex was 90 nm.

Production Example 1-2: Preparation of Polybutadiene Rubber Latex (R-2)

Into a pressure-resistant polymerization apparatus were introduced 7 parts of a solid content of the polybutadiene rubber latex (R-1) obtained in Production Example 1-1, 200 parts of deionized water, 0.03 parts of tripotassium phosphate, 0.002 parts of EDTA, and 0.001 parts of ferrous sulfate heptahydrate. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 93 parts of Bd was introduced into the pressure-resistant polymerization apparatus, and the temperature inside the pressure-resistant polymerization apparatus was raised to 45° C. Thereafter, 0.02 parts of PHP was introduced into the pressure-resistant polymerization apparatus, and then 0.10 parts of SFS was introduced into the pressure-resistant polymerization apparatus. Polymerization was then started. At the time 30 hours had elapsed from the start of the polymerization, a resultant reaction solution was subjected to devolatilization under reduced pressure to remove, from the reaction solution, a remaining monomer that had not been used in the polymerization, so as to end the polymerization. During the polymerization, PHP, EDTA, ferrous sulfate heptahydrate, and SDBS were each added to the pressure-resistant polymerization apparatus in discretionarily selected amounts and discretionarily selected points in time. By the polymerization, an aqueous latex (R-2), which contained an elastic body containing polybutadiene rubber as a main component, was obtained. The volume-average particle size of the elastic body contained in the obtained aqueous latex was 195 nm.

Production Example 1-3: Preparation of Polystyrene-Butadiene Rubber Latex (R-3)

Into a pressure-resistant polymerization apparatus were introduced 160 parts of deionized water, 0.002 parts of EDTA, 0.001 parts of ferrous sulfate heptahydrate, 0.029 parts of polyoxyethylene lauryl ether phosphate, and 0.003 parts of sodium hydroxide. In so doing, the polyoxyethylene lauryl ether phosphate turned into sodium polyoxyethylene lauryl ether phosphate in the presence of the sodium hydroxide, and functioned as the emulsifying agent (C). Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 76.5 parts of Bd and 23.5 parts of styrene (St) were introduced into the pressure-resistant polymerization apparatus, and the temperature inside the pressure-resistant polymerization apparatus was raised to 45° C. Thereafter, 0.03 parts of PHP was introduced into the pressure-resistant polymerization apparatus, and then 0.05 parts of SFS was introduced into the pressure-resistant polymerization apparatus. Polymerization was then started. At the time 20 hours had elapsed from the start of the polymerization, a resultant reaction solution was subjected to devolatilization under reduced pressure to remove, from the reaction solution, a remaining monomer that had not been used in the polymerization, so as to end the polymerization. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-3), which contained an elastic body containing polystyrene-butadiene rubber as a main component, was obtained. The volume-average particle size of the elastic body contained in the obtained aqueous latex was 192 nm.

2. Preparation of Fine Polymer Particles (A) (Formation of Graft Part by Polymerization)

Production Example 2-1; Preparation of Fine Polymer Particle Latex (L-1)

Into a glass reaction vessel were introduced 250 parts of the polybutadiene rubber latex (R-2) (including 87 parts of the elastic body containing polybutadiene rubber as a main component) and 50 parts of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.004 parts of EDTA, 0.001 parts of ferrous sulfate heptahydrate, and 0.2 parts of SFS were added to the glass reaction vessel, and a resultant mixture was stirred for 10 minutes. Thereafter, a mixture of 12.5 parts of methyl methacrylate (MMA), 0.5 parts of St, and 0.035 parts of t-butyl hydroperoxide (BHP) was added continuously into the glass reaction vessel over 80 minutes. Subsequently, 0.013 parts of BHP was added into the glass reaction vessel, and a resultant mixture in the glass reaction vessel was stirred for 1 hour so as to finish polymerization. Through the above operations was obtained an aqueous latex (L-1) containing the fine polymer particles (A) and the emulsifying agent (C). 99% or more of the monomer component had been polymerized. The volume-average particle size of the fine polymer particles (A) contained in the aqueous latex was 200 nm. The solid content concentration (concentration of the fine polymer particles (A)) of the obtained aqueous latex (L-1) was 30%.

Production Example 2-2; Preparation of Fine Polymer Particle Latex (L-2)

Into a glass reaction vessel were introduced 250 parts of the polystyrene-butadiene rubber latex (R-3) (including 87 parts of the elastic body containing polystyrene-butadiene rubber as a main component) and 50 parts of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.004 parts of EDTA, 0.001 parts of ferrous sulfate heptahydrate, and 0.2 parts of SFS were added to the glass reaction vessel, and a resultant mixture was stirred for 10 minutes. Thereafter, a mixture of 12.5 parts of MMA, 0.5 parts of St, and 0.035 parts of BHP was added continuously into the glass reaction vessel over 80 minutes. Subsequently, 0.013 parts of BHP was added into the glass reaction vessel, and a resultant mixture in the glass reaction vessel was stirred for 1 hour so as to finish polymerization. Through the above operations was obtained an aqueous latex (L-2) containing the fine polymer particles (A) and the emulsifying agent (C). 99% or more of the monomer component had been polymerized. The volume-average particle size of the fine polymer particles (A) contained in the aqueous latex was 200 nm. The solid content concentration (concentration of the fine polymer particles (A)) of the aqueous latex (L-2) was 30%.

3. Preparation of Resin Composition and Cured Product

Example 1

An aqueous latex was obtained by mixing 333 parts of the aqueous latex (L-1) (equivalent to 100 parts of the fine polymer particles (A)) and 1 part of Irganox 1135 (octyl 3-(4-hydroxy-3,5-diisopropylphenyl) propionate, manufactured by BASF Japan Ltd.). Next, as a coagulant (D), 5 parts of calcium acetate was added to the obtained aqueous latex so as to coagulate the fine polymer particles (A) contained in the aqueous latex. In this manner, slurry containing a coagulate of the fine polymer particles (A) was obtained.

Next, in the following manner, the coagulate was taken out from the obtained slurry, and the water content of the coagulate was adjusted to not less than 10% with respect to the weight of the coagulate. That is, the slurry containing the coagulate was introduced into 600 parts of ion exchanged water, and then a resultant mixture was subjected to centrifugal dehydration to obtain the coagulate. Two cycles of the operation of introducing the obtained coagulate into 500 parts of ion exchanged water and the operation of subjecting a resultant mixture to centrifugal dehydration were carried out in total. Then, the coagulate was washed to obtain the coagulate. The water content of the finally obtained coagulate was 50.4% with respect to the weight of the coagulate. Note that, in Examples and Comparative Examples below, "the water content of the coagulate" was based on the weight of the coagulate, as in Example 1. Part of the obtained coagulate was used to evaluate the dispersibility of the obtained coagulate. Table 2 shows a result.

To the rest of the coagulate, a liquid epoxy resin (JER828, manufactured by Mitsubishi Chemical Corporation), which was the thermosetting resin (B), was added so that the final concentration of the fine polymer particles (A) became 30%. A resultant mixture was mixed with use of a planetary centrifugal mixer to obtain a resin composition. Thereafter, the resin composition thus obtained was transferred to a flask, and vacuum devolatilization was carried out with use of an evaporator having a water bath at 80° C. until the water content of the resin composition became 2374 ppm. Note that, in the vacuum devolatilization, since the resin composition did not foam in the flask, the pressure inside the flask during the vacuum devolatilization could be lowered to 3 torr. By the above operations, a resin composition (P-1) was obtained. The dispersibility of the obtained resin composition (P-1) was evaluated, and the water content, the solvent content, and the remaining emulsifying agent content (amount of sulfur (S) contained in the resin composition (P-1)) of the resin composition (P-1) were measured. Table 2 shows results.

Example 2

Water, a liquid epoxy resin (JER828, manufactured by Mitsubishi Chemical Corporation), which was the resin (E), and DBS, which was the emulsifying agent (C), were mixed with use of a homogenizer. With this, the resin (E) was emulsified to give aqueous emulsion (E-1) (epoxy resin content: 40%). Next, 300 parts of the aqueous latex (L-1) (equivalent to 90 parts of the fine polymer particles (A)), 25 parts of the aqueous emulsion (E-1) (including 10 parts of the epoxy resin), and 0.9 parts of Irganox 1135 were mixed to obtain an aqueous latex. Next, as the coagulant (D), 5 parts of calcium acetate was added to the obtained aqueous latex so as to coagulate the fine polymer particles (A) contained in the aqueous latex. In this manner, slurry containing a coagulate of the fine polymer particles (A) was obtained.

Next, in the following manner, the coagulate was taken out from the obtained slurry, and the water content of the coagulate was adjusted to not less than 10% with respect to the weight of the coagulate. That is, the slurry containing the coagulate was introduced into 600 parts of ion exchanged water, and then a resultant mixture was subjected to centrifugal dehydration to obtain the coagulate. Two cycles of the operation of introducing the obtained coagulate into 500 parts of ion exchanged water and the operation of subjecting a resultant mixture to centrifugal dehydration were carried out in total. Then, the coagulate was washed to obtain the coagulate. The water content of the finally obtained coagulate was 55.2%. Part of the obtained coagulate was used to evaluate the dispersibility of the obtained coagulate. Table 2 shows a result.

To the rest of the coagulate, a liquid epoxy resin (JER828, manufactured by Mitsubishi Chemical Corporation), which was the thermosetting resin (B), was added so that the final concentration of the fine polymer particles (A) became 30%. A resultant mixture was mixed with use of a planetary centrifugal mixer to obtain a resin composition. Thereafter, the resin composition thus obtained was transferred to a flask, and vacuum devolatilization was carried out with use of an evaporator having a water bath at 80° C. until the water content of the resin composition became 3068 ppm. Note that, in the vacuum devolatilization, since the resin composition did not foam in the flask, the pressure inside the flask during the vacuum devolatilization could be lowered to 3 torr. By the above operations, a resin composition (P-2) was obtained. The dispersibility of the obtained resin composition (P-2) was evaluated, and the water content, the solvent content, and the remaining emulsifying agent content (amount of sulfur (S) contained in the resin composition (P-2)) of the resin composition (P-2) were measured. Table 2 shows results.

Next, 13.5 parts by weight of the resin composition (P-2), 86.5 parts by weight of a liquid epoxy resin (JER828, manufactured by Mitsubishi Chemical Corporation), and 25 parts by weight of aromatic polyamine (JERcureW, manufactured by Mitsubishi Chemical Corporation) were mixed with use of a planetary centrifugal mixer. A resultant mixture (resin composition) was treated at 100° C. for 2 hours, and then further treated at 175° C. for 4 hours to obtain a cured product The surface property of the obtained cured product was evaluated. Table 4 shows a result.

Example 3

Slurry containing a coagulate of the fine polymer particles (A) was obtained in the same manner as in Example 2, except that, as the coagulant (D), sodium acetate was used instead of calcium acetate used in Example 2.

Next, in the same manner as in Example 2, the coagulate was taken out from the obtained slurry, and the water content of the coagulate was adjusted to not less than 10% with respect to the weight of the coagulate. In Example 3, the water content of the finally obtained coagulate was 54.2%. Part of the obtained coagulate was used to evaluate the dispersibility of the obtained coagulate. Table 2 shows a result.

To the rest of the coagulate, a liquid epoxy resin (JER828, manufactured by Mitsubishi Chemical Corporation), which was the thermosetting resin (B), was added so that the final concentration of the fine polymer particles (A) became 30%. A resultant mixture was mixed with use of a planetary centrifugal mixer to obtain a resin composition. Thereafter, the resin composition thus obtained was transferred to a flask, and vacuum devolatilization was carried out with use of an evaporator having a water bath at 80° C. until the water content of the resin composition became 4102 ppm. Note that, in the vacuum devolatilization, since the resin composition foamed in the flask, the pressure inside the flask could be lowered to only 20 torr. Therefore, the vacuum devolatilization was continued for 1 hour after the pressure reached 20 torr. By the above operations, a resin composition (P-3) was obtained. The dispersibility of the obtained resin composition (P-3) was evaluated, and the water content, the solvent content, and the remaining emulsifying agent content (amount of sulfur (S) contained in the resin composition (P-3)) of the resin composition (P-3) were measured. Table 2 shows results.

Example 4

Water, a liquid epoxy resin (JER828, manufactured by Mitsubishi Chemical Corporation), which was the resin (E), polyoxyethylene lauryl ether phosphate, and sodium hydroxide were mixed with use of a homogenizer. With this, the resin (E) was emulsified to give aqueous emulsion (E-2) (epoxy resin content: 40%). In so doing, the polyoxyethylene lauryl ether phosphate turned into sodium polyoxyethylene lauryl ether phosphate in the presence of the sodium hydroxide, and functioned as the emulsifying agent (C). Next, 300 parts of the aqueous latex (L-2) (equivalent to 90 parts of the fine polymer particles (A)), 25 parts of the aqueous emulsion (E-2) (including 10 parts of the epoxy resin), and 0.9 parts of Irganox 1135 were mixed to obtain an aqueous latex. Next, as the coagulant (D), 5 parts of calcium acetate was added to the obtained aqueous latex so as to coagulate the fine polymer particles (A) contained in the aqueous latex. In this manner, slurry containing a coagulate of the fine polymer particles (A) was obtained.

Next, in the same manner as in Example 2, the coagulate was taken out from the obtained slurry, and the water content of the coagulate was adjusted to not less than 10% with respect to the weight of the coagulate. In Example 4, the water content of the finally obtained coagulate was 51.1%. Part of the obtained coagulate was used to evaluate the dispersibility of the obtained coagulate. Table 2 shows a result.

Next, with use of the rest of the coagulate, a resin composition (P-4) was obtained in the same manner as in Example 2, except that vacuum devolatilization was carried out until the water content of the resin composition became 3031 ppm. The dispersibility of the obtained resin composition (P-4) was evaluated, and the water content, the solvent content, and the remaining emulsifying agent content (amount of phosphorus (P) contained in the resin composition (P-4)) of the resin composition (P-4) were measured. Table 2 shows results.

Example 5

Slurry containing a coagulate of the fine polymer particles (A) was obtained in the same manner as in Example 4, except that, as the coagulant (D), magnesium acetate was used instead of calcium acetate used in Example 4.

Next, in the same manner as in Example 2, the coagulate was taken out from the obtained slurry, and the water content of the coagulate was adjusted to not less than 10% with respect to the weight of the coagulate. In Example 5, the water content of the finally obtained coagulate was 48.3%. Part of the obtained coagulate was used to evaluate the dispersibility of the obtained coagulate. Table 2 shows a result.

Next, with use of the rest of the coagulate, a resin composition (P-5) was obtained in the same manner as in Example 2, except that vacuum devolatilization was carried out until the water content of the resin composition became 2898 ppm. The dispersibility of the obtained resin composition (P-5) was evaluated, and the water content, the solvent content, and the remaining emulsifying agent content (amount of phosphorus (P) contained in the resin composition (P-5)) of the resin composition (P-5) were measured. Table 2 shows results.

Example 6

Slurry containing a coagulate of the fine polymer particles (A) was obtained in the same manner as in Example 4, except that, as the coagulant (D), sodium acetate was used instead of calcium acetate used in Example 4.

Next, in the same manner as in Example 2, the coagulate was taken out from the obtained slurry, and the water content of the coagulate was adjusted to not less than 10% with respect to the weight of the coagulate. In Example 6, the water content of the finally obtained coagulate was 52.3%. Part of the obtained coagulate was used to evaluate the dispersibility of the obtained coagulate. Table 2 shows a result.

Next, a resin composition (P-6) was obtained in the same manner as in Example 2 with use of the rest of the coagulate, except that vacuum devolatilization was carried out until the water content of the resin composition became 2742 ppm. The dispersibility of the obtained resin composition (P-6) was evaluated, and the water content, the solvent content, and the remaining emulsifying agent content (amount of phosphorus (P) contained in the resin composition (P-6)) of the resin composition (P-6) were measured. Table 2 shows results.

Comparative Example 1

An aqueous latex was obtained by mixing 300 parts of the aqueous latex (R-2) (equivalent to 90 parts of the elastic body) and 0.9 parts of Irganox 1135. Next, as the coagulant (D), 5 parts of calcium acetate was introduced into the obtained aqueous latex so as to coagulate the elastic body contained in the aqueous latex. In this manner, slurry containing a coagulate of the elastic body was obtained.

Next, in the following manner, the coagulate of the elastic body was taken out from the obtained slurry, and the water content of the coagulate was adjusted to not less than 10% with respect to the weight of the coagulate. That is, the slurry containing the coagulate of the elastic body was introduced into 600 parts of ion exchanged water, and then a resultant mixture was subjected to centrifugal dehydration to obtain the coagulate of the elastic body. Two cycles of the operation of introducing the obtained coagulate of the elastic body into 500 parts of ion exchanged water and the operation of subjecting a resultant mixture to centrifugal dehydration were carried out in total. The coagulate of the elastic body was thus obtained. The water content of the finally obtained coagulate of the elastic body was 53.2%. Part of the obtained coagulate was used to evaluate the dispersibility of the obtained coagulate. Table 3 shows a result.

To the rest of the coagulate of the elastic body, a liquid epoxy resin (JER828, manufactured by Mitsubishi Chemical Corporation), which was the thermosetting resin (B), was added so that the final concentration of the elastic body became 30%. A resultant mixture was mixed with use of a planetary centrifugal mixer to obtain an elastic body composition. Thereafter, the elastic body composition thus obtained was transferred to a flask, and vacuum devolatilization was carried out with use of an evaporator having a water bath at 80° C. Note that, in the vacuum devolatilization, since the elastic body composition did not foam in the flask, the pressure inside the flask during the vacuum devolatilization could be lowered to 3 torr. By the above operations, an elastic body composition (P-7) was obtained. The dispersibility of the obtained elastic body composition (P-7) was evaluated. Table 3 shows a result.

Comparative Example 2

Slurry containing a coagulate of the elastic body was obtained in the same manner as in Comparative Example 1, except that, as the aqueous latex containing the elastic body, the aqueous latex (R-3) was used instead of the aqueous latex (R-2) used in Comparative Example 1.

Next, in the same manner as in Comparative Example 1, the coagulate of the elastic body was taken out from the obtained slurry, and the water content of the coagulate was adjusted to not less than 10% with respect to the weight of the coagulate. In Comparative Example 2, the water content of the finally obtained coagulate of the elastic body was 50.4%. Part of the obtained coagulate was used to evaluate the dispersibility of the obtained coagulate. Table 3 shows a result.

Next, an elastic body composition (P-8) was obtained in the same manner as in Comparative Example 1 with use of the rest of the coagulate of the elastic body. The dispersibility of the obtained elastic body composition (P-8) was evaluated. Table 3 shows a result.

Comparative Example 3

An aqueous latex was obtained by mixing 333 parts of the aqueous latex (L-1) (equivalent to 100 parts of the fine polymer particles (A)) and 1 part of Irganox 1135 (octyl 3-(4-hydroxy-3,5-diisopropylphenyl) propionate, manufactured by BASF Japan Ltd.). Next, as the coagulant (D), 5 parts of calcium acetate was added to the obtained aqueous latex so as to coagulate the fine polymer particles (A) contained in the aqueous latex. In this manner, slurry containing a coagulate of the fine polymer particles (A) was obtained.

Next, in the following manner, the coagulate was taken out from the obtained slurry. That is, the slurry containing the coagulate was introduced into 600 parts of ion exchanged water, and then a resultant mixture was subjected to centrifugal dehydration to obtain the coagulate. Two cycles of the operation of introducing the obtained coagulate into 500 parts of ion exchanged water and the operation of subjecting a resultant mixture to centrifugal dehydration were carried out in total. The coagulate was thus obtained. Next, the obtained coagulate was dried to obtain a dried coagulate (also referred to as a dry coagulate). The water content of the finally obtained coagulate (dry coagulate) was 0.5%. Part of the obtained dry coagulate was used to evaluate the dispersibility of the obtained coagulate. Table 3 shows a result.

To the rest of the dry coagulate, a liquid epoxy resin (JER828, manufactured by Mitsubishi Chemical Corporation), which was the thermosetting resin (B), was added so that the final concentration of the fine polymer particles (A) became 30%. A resultant mixture was mixed with use of a planetary centrifugal mixer to obtain a resin composition. By the above operations, a resin composition (P-9) was obtained. The dispersibility of the obtained resin composition (P-9) was evaluated, and the water content and the solvent content of the obtained resin composition (P-9) were measured. Table 3 shows results.

Comparative Example 4

Slurry containing a coagulate of the fine polymer particles (A) was obtained in the same manner as in Comparative Example 3, except that, as the aqueous latex containing the fine polymer particles (A), the aqueous latex (L-2) was used instead of the aqueous latex (L-1) used in Comparative Example 3.

Next, in the same manner as in Comparative Example 3, the coagulate was taken out from the obtained slurry, and a dried coagulate (dry coagulate) was obtained. The water content of the finally obtained coagulate (dry coagulate) was 0.5%. Part of the obtained dry coagulate was used to evaluate the dispersibility of the obtained coagulate. Table 3 shows a result.

Next, a resin composition (P-10) was obtained in the same manner as in Comparative Example 3 with use of the rest of the dry coagulate. The dispersibility of the obtained resin composition (P-10) was evaluated, and the water content and the solvent content of the obtained resin composition (P-10) were measured. Table 3 shows results.

Comparative Example 5

The temperature inside a 1 L mixing vessel was set to 30° C., and then 126 parts of methyl ethyl ketone (MEK) was introduced into the mixing vessel. Subsequently, while the MEK in the mixing vessel was stirred, 126 parts of the aqueous latex (L-1) containing the fine polymer particles (A) was introduced into the mixing vessel. The materials thus introduced were mixed uniformly. Thereafter, while the materials were stirred, 200 parts of water (452 parts in total) was introduced into the mixing vessel at a feed rate of 80 parts/min. After the water was fed, the stirring was promptly stopped, and slurry containing a buoyant agglutinate was obtained.

Next, 350 parts by mass of the liquid phase was let out from an outlet in a lower part of the mixing vessel so that the agglutinate remained in the mixing vessel. To the obtained agglutinate (fine polymer particles (A) dope), 150 parts of MEK was added. The agglutinate and the MEK were mixed to obtain an organic solvent solution in which the fine polymer particles (A) were dispersed. Into the organic solvent solution, a liquid epoxy resin (JER828, manufactured by Mitsubishi Chemical Corporation), which was the thermosetting resin (B), was introduced so that the final concentration of the fine polymer particles (A) became 30%. In this manner, a mixture was obtained. The obtained mixture was stirred, and then the MEK was distilled off under reduced pressure to obtain a resin composition (P-11). The dispersibility of the obtained resin composition (P-11) was evaluated, and the water content and the solvent content of the obtained resin composition (P-11) were measured. Table 3 shows results.

Example 7

Slurry containing a coagulate of the fine polymer particles (A) was obtained in the same manner as in Example 2.

Next, in the same manner as in Example 2, the coagulate was taken out from the obtained slurry, and the water content of the coagulate was adjusted to not less than 10% with respect to the weight of the coagulate.

Next, to the obtained coagulate, a liquid epoxy resin (JER828, manufactured by Mitsubishi Chemical Corporation), which was the thermosetting resin (B), was added so that the final concentration of the fine polymer particles (A) became 37%. In this manner, a mixture was obtained. The obtained mixture was mixed with use of a planetary centrifugal mixer to obtain a resin composition. The water content of the obtained resin composition was 13.8%, that is, 138000 ppm with respect to the weight of the resin composition.

Thereafter, the resin composition thus obtained was transferred to a flask, and vacuum devolatilization was carried out with use of an evaporator having a water bath at 80° C. until the water content of the resin composition became not more than 40000 ppm. Vacuum degassing was carried out for 2 hours. By the above operations, the resin composition having a water content of not more than 40000 ppm was obtained.

Example 8

Slurry containing a coagulate of the fine polymer particles (A) was obtained in the same manner as in Example 2.

Next, in the same manner as in Example 2, the coagulate was taken out from the obtained slurry, and the water content of the coagulate was adjusted to not less than 10% with respect to the weight of the coagulate.

Next, to the obtained coagulate, a liquid epoxy resin (JER828, manufactured by Mitsubishi Chemical Corporation), which was the thermosetting resin (B), was added so that the final concentration of the fine polymer particles (A) became 45%. In this manner, a mixture was obtained. The obtained mixture was stirred to remove water from the coagulate, so that a resin composition was obtained. Specifically, the obtained mixture was stirred with use of a planetary centrifugal mixer. Subsequently, the water excluded by stirring of the mixture was removed. The water content of the obtained resin composition was 0.94%, that is, 9400 ppm with respect to the weight of the resin composition.

Example 9

Slurry containing a coagulate of the fine polymer particles (A) was obtained in the same manner as in Example 2.

Next, in the same manner as in Example 2, the coagulate was taken out from the obtained slurry, and the water content of the coagulate was adjusted to not less than 10% with respect to the weight of the coagulate.

Next, to the obtained coagulate, a liquid epoxy resin (JER828, manufactured by Mitsubishi Chemical Corporation), which was the thermosetting resin (B), was added so that the final concentration of the fine polymer particles (A) became 45%. In this manner, a mixture was obtained. The obtained mixture was stirred to remove water from the coagulate. Specifically, the obtained mixture was stirred with use of a planetary centrifugal mixer. Subsequently, the water excluded by stirring of the mixture was removed. To the obtained mixture from which the water had been removed, a liquid epoxy resin (JER828, manufactured by Mitsubishi Chemical Corporation), which was the thermosetting resin (B), was added so that the final concentration of the fine polymer particles (A) became 37%. The obtained mixture was mixed with use of a planetary centrifugal mixer to obtain a resin composition. The water content of the obtained resin composition was 0.81%, that is, 8100 ppm with respect to the weight of the resin composition.

Example 10

A resin composition (P-12) was obtained in the same manner as in Example 2, except that vacuum devolatilization was carried out until the water content of the resin composition became 7496 ppm.

Next, a cured product was obtained in the same manner as in Example 2 with use of the resin composition (P-12). The surface property of the obtained cured product was evaluated. Table 4 shows a result.

Example 11

A resin composition (P-13) was obtained in the same manner as in Example 2, except that vacuum devolatilization was carried out until the water content of the resin composition became 10009 ppm.

Next, a cured product was obtained in the same manner as in Example 2 with use of the resin composition (P-13). The surface property of the obtained cured product was evaluated. Table 4 shows a result.

Example 12

A resin composition (P-14) was obtained in the same manner as in Example 2, except that vacuum devolatilization was carried out until the water content of the resin composition became 19984 ppm.

Next, a cured product was obtained in the same manner as in Example 2 with use of the resin composition (P-14). The surface property of the obtained cured product was evaluated. Table 4 shows a result.

Example 13

A resin composition (P-15) was obtained in the same manner as in Example 2, except that vacuum devolatilization was carried out until the water content of the resin composition became 30145 ppm.

Next, a cured product was obtained in the same manner as in Example 2 with use of the resin composition (P-15). The surface property of the obtained cured product was evaluated. Table 4 shows a result.

Comparative Example 6

A resin composition (P-16) was obtained in the same manner as in Example 2, except that vacuum devolatilization was carried out until the water content of the resin composition became 50136 ppm.

Next, a cured product was obtained in the same manner as in Example 2 with use of the resin composition (P-16). The surface property of the obtained cured product was evaluated. Table 4 shows a result.

Comparative Example 7

A resin composition (P-17) was obtained in the same manner as in Example 2, except that vacuum devolatilization was carried out until the water content of the resin composition became 74939 ppm.

Next, a cured product was obtained in the same manner as in Example 2 with use of the resin composition (P-17). The surface property of the obtained cured product was evaluated. Table 4 shows a result.

Comparative Example 8

A resin composition (P-18) was obtained in the same manner as in Example 2, except that vacuum devolatilization was carried out until the water content of the resin composition became 100113 ppm.

Next, a cured product was obtained in the same manner as in Example 2 with use of the resin composition (P-18). The surface property of the obtained cured product was evaluated. Table 4 shows a result.

Comparative Example 9

To a flask, 100 parts of the aqueous latex (L-1) (equivalent to 30 parts of the fine polymer particles (A) and 70 parts of a liquid epoxy resin (JER828, manufactured by Mitsubishi Chemical Corporation) were transferred, and vacuum devolatilization was carried out with use of an evaporator having a water bath at 80° C. until the water content of a resin composition became 4502 ppm. Note that, in the vacuum devolatilization, since the resin composition foamed in the flask, the pressure inside the flask could be lowered to only 20 torr. Therefore, the vacuum devolatilization was continued for 1 hour after the pressure reached 20 torr. By the above operations, a resin composition (P-19) was obtained. The dispersibility of the obtained resin composition (P-19) was evaluated, and the water content, the solvent content, and the remaining emulsifying agent content (amount of sulfur (S) contained in the resin composition (P-19)) of the resin composition (P-19) were measured. Table 3 shows results.

Comparative Example 10

To a flask, 100 parts of the aqueous latex (L-2) (equivalent to 30 parts of the fine polymer particles (A) and 70 parts of a liquid epoxy resin (JER828, manufactured by Mitsubishi Chemical Corporation) were transferred, and vacuum devolatilization was carried out with use of an evaporator having a water bath at 80° C. until the water content of a resin composition became 3002 ppm. Note that, in the vacuum devolatilization, since the resin composition foamed in the flask, the pressure inside the flask could be lowered to only 20 torr. Therefore, the vacuum devolatilization was continued for 1 hour after the pressure reached 20 torr. By the above operations, a resin composition (P-20) was obtained. The dispersibility of the obtained resin composition (P-20) was evaluated, and the water content, the solvent content, and the remaining emulsifying agent content (amount of phosphorus (P) contained in the resin composition (P-20)) of the resin composition (P-20) were measured. Table 3 shows results.

TABLE 2

| | | | Example 1 | Example 2 | Example 3 | Example 4 | Example 5 | Example 6 |
|---|---|---|---|---|---|---|---|---|
| Materials | Fine polymer particles (A) | | L1 | L1 | L1 | L2 | L2 | L2 |
| | Emulsifying agent (C) | | DBS | DBS | DBS | Sodium polyoxyethylene lauryl ether phosphate | Sodium polyoxyethylene lauryl ether phosphate | Sodium polyoxyethylene lauryl ether phosphate |
| | Coagulant (D) | | Calcium acetate | Calcium acetate | Sodium acetate | Calcium acetate | Magnesium acetate | Sodium acetate |
| | Resin (E) | | — | Liquid epoxy resin | Liquid epoxy resin | Liquid epoxy resin | Liquid epoxy resin | Liquid epoxy resin |
| Coagulate | Water content (%) | | 50.4 | 55.15 | 54.22 | 51.12 | 48.29 | 52.33 |
| | Dispersibility (μm) | 1000 rpm × 30 min. | 100 | 0 | — | — | — | — |
| | | 1000 rpm × 120 min. | 0 | 0 | — | — | — | — |
| | | 2000 rpm × 30 min. | 0 | 0 | 0 | 0 | 0 | 0 |
| Resin Composition | Dispersibility (μm) | | 0 | 0 | 0 | 0 | 0 | 0 |
| | Water content (ppm) | | 2374 | 3068 | 4102 | 3031 | 2898 | 2742 |
| | Solvent content | | Not detected | Not detected | Not detected | Not detected | Not detected | Not detected |
| | Remaining emulsifying agent content (ppm) | (S) | 185 | 214 | 125 | — | — | — |
| | | (P) | — | — | — | 108 | 66 | 10 |

TABLE 3

| | | Comparative Example 1 | Comparative Example 2 | Comparative Example 3 | Comparative Example 4 | Comparative Example 5 | Comparative Example 9 | Comparative Example 10 |
|---|---|---|---|---|---|---|---|---|
| Materials | Fine polymer particles (A) | R2 | R3 | L1 | L2 | L1 | L1 | L2 |
| | Emulsifying agent (C) | DBS | Sodium polyoxyethylene lauryl ether phosphate | DBS | Sodium polyoxyethylene lauryl ether phosphate | DBS | DBS | Sodium polyoxyethylene lauryl ether phosphate |
| | Coagulant (D) | Calcium acetate | Calcium acetate | Calcium acetate | Calcium acetate | — | — | — |

TABLE 3-continued

|  |  | Comparative Example 1 | Comparative Example 2 | Comparative Example 3 | Comparative Example 4 | Comparative Example 5 | Comparative Example 9 | Comparative Example 10 |
|---|---|---|---|---|---|---|---|---|
| Coagulate | Resin (E) | — | — | — | — | — | — | — |
|  | Water content (%) | 53.2 | 50.4 | — | — | — | — | — |
|  | Dispersibility (μm) 1000 rpm × 30 min. | — | — | — | — | — | — | — |
|  | 1000 rpm × 120 min. | — | — | — | — | — | — | — |
|  | 2000 rpm × 30 min. | 100 | 100 | 100 | 100 | 0 | — | — |
| Resin Composition | Dispersibility (μm) | 100 | 100 | 100 | 100 | 0 | 0 | 0 |
|  | Water content (ppm) | — | — | 1791 | 1584 | 1050 | 4502 | 3002 |
|  | Solvent content | Not detected | Not detected | Not detected | Not detected | 3411 (MEK) | Not detected | Not detected |
|  | Remaining emulsifying agent content (ppm) (S) | — | — | — | — | — | 2393 | — |
|  | (P) | — | — | — | — | — | — | 1297 |

TABLE 4

|  | Example 2 | Example 10 | Example 11 | Example 12 | Example 13 | Comparative Example 6 | Comparative Example 7 | Comparative Example 8 |
|---|---|---|---|---|---|---|---|---|
| Water content (ppm) | 3068 | 7496 | 10009 | 19984 | 30145 | 50136 | 74939 | 100113 |
| Surface Property | Accepted | Accepted | Accepted | Accepted | Accepted | Rejected | Rejected | Rejected |

As is clear from Table 2, the resin compositions obtained in Examples 1 to 6 are each excellent in dispersibility of the fine polymer particles (A) in the thermosetting resin (B). In contrast, as is clear from Table 3, the resin compositions obtained in Comparative Examples 1 to 5 are each poor in dispersibility of the fine polymer particles (A) in the thermosetting resin (B).

Furthermore, as is clear from Table 3, the resin compositions obtained in Comparative Examples 9 and 10 are each such that a large amount of the emulsifying agent remains in the thermosetting resin (B), specifically, the thermosetting resin (B) contains a large amount of sulfur (S) or phosphorus (S).

As is clear from Table 4, the resin compositions of Examples 2 and 10 to 13 each have a water content falling within the range of 2000 ppm to 40000 ppm, and the cured products obtained from these resin compositions are each excellent in surface property. In contrast, the resin compositions of Comparative Examples 6 to 8 each have a water content of more than 40000 ppm, and the cured products obtained from these resin compositions are each poor in surface property.

According to one or more embodiments of the present invention, it is possible to provide a resin composition which imposes a reduced environmental load and which is excellent in dispersibility of fine polymer particles. Furthermore, a cured product obtained by curing the resin composition in accordance with one or more embodiments of the present invention has an excellent surface appearance. Therefore, a resin composition in accordance with one or more embodiments of the present invention or a cured product obtained by curing a resin composition in accordance with one or more embodiments of the present invention can be suitably used for, for example, adhesive agents, coating materials, binders for reinforcement fibers, composite materials, molding materials for 3D printers, sealants, and electronic substrates.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

The invention claimed is:

1. A method of producing a resin composition, comprising:
    a step 1 of obtaining an aqueous latex containing fine polymer particles (A) and an emulsifying agent (C);
    a step 2 of obtaining, with use of the aqueous latex, slurry containing a coagulate of the fine polymer particles (A);
    a step 3 of taking out the coagulate from the slurry and adjusting a water content of the coagulate to not less than 20% with respect to a weight of the coagulate; and
    a step 4 of mixing the coagulate and a thermosetting resin (B),
    the fine polymer particles (A) containing a rubber-containing graft copolymer having an elastic body and a graft part grafted to the elastic body,
    the graft part being a polymer containing at least one type of structural unit derived from at least one type of monomer selected from the group consisting of aromatic vinyl monomers, vinyl cyanide monomers, and (meth)acrylate monomers in a total amount of not less than 70% by weight with respect to 100% by weight of all structural units,
    the step 2 further including a step of adding a resin (E) to the aqueous latex,
    the resin (E) being a liquid having a viscosity of 100 mPa·s to 1,000,000 mPa·s at 25° C., a semisolid, or a solid.

2. The method as set forth in claim 1, wherein the coagulate obtained in the step 3 is arranged such that in a case where a mixture of the coagulate and the thermosetting resin (B) is stirred at 1000 rpm for 30 minutes, dispersibility of the fine polymer particles (A) in the mixture is less than 100 μm when evaluated in accordance with JIS K5101 with use of a grind gauge.

3. The method as set forth in claim 1, wherein the step 4 is a step of mixing the coagulate and the thermosetting resin (B) so that a mixture is obtained which contains the fine polymer particles (A) in an amount of not less than 40% by weight with respect to 100% by weight of the mixture.

4. The method as set forth in claim 1, wherein the step 4 further includes:
   a step 4a of mixing the coagulate and the thermosetting resin (B) to obtain a mixture;
   a step 4b of stirring the mixture obtained in the step 4a to remove water from the coagulate; and
   a step 4c of further mixing the mixture obtained in the step 4b with the thermosetting resin (B).

5. The method as set forth in claim 1, wherein the step 4a is a step of mixing the coagulate and the thermosetting resin (B) so that the mixture is obtained which contains the fine polymer particles (A) in an amount of not less than 40% by weight with respect to 100% by weight of the mixture.

6. The method as set forth in claim 1, wherein any one of the following conditions (1) and (2) is satisfied:
   (1) the step 2 further includes a step of adding a coagulant (D) to the aqueous latex, wherein an aqueous solution containing 0.1% of the emulsifying agent (C) and 0.5% of the coagulant (D) has foamability (foaming property, cm) of not more than 17 cm according to the Ross-Miles method; and
   (2) the step 2 further includes a step of adding the coagulant (D) to the aqueous latex, wherein no solid precipitate is present in an aqueous solution containing 1% of the emulsifying agent (C) and 5% of the coagulant (D).

7. The method as set forth in claim 1, wherein the emulsifying agent (C) is a phosphorus-based emulsifying agent.

8. The method as set forth in claim 1, wherein the thermosetting resin (B) includes at least one type of thermosetting resin selected from the group consisting of: resins each containing a polymer obtained by polymerizing an ethylenically unsaturated monomer; epoxy resins; phenolic resins; polyol resins; and amino-formaldehyde resins.

9. The method as set forth in claim 1, wherein the elastic body includes at least one type of elastic body selected from the group consisting of diene-based rubbers, (meth)acrylate-based rubbers, and polysiloxane rubber-based elastic bodies.

10. The method as set forth in claim 1, wherein the resin (E) is the liquid having a viscosity of 100 mPa·s to 1,000,000 mPa·s at 25° C.

11. A method of producing a resin composition, comprising:
   a step 1 of obtaining an aqueous latex containing fine polymer particles (A) and an emulsifying agent (C);
   a step 2 of obtaining, with use of the aqueous latex, slurry containing a coagulate of the fine polymer particles (A);
   a step 3 of taking out the coagulate from the slurry and adjusting a water content of the coagulate to not less than 10% with respect to a weight of the coagulate; and
   a step 4 of mixing the coagulate and a thermosetting resin (B),
   the fine polymer particles (A) containing a rubber-containing graft copolymer having an elastic body and a graft part grafted to the elastic body,
   the graft part being a polymer containing at least one type of structural unit derived from at least one type of monomer selected from the group consisting of aromatic vinyl monomers, vinyl cyanide monomers, and (meth)acrylate monomers,
   the step 2 further including a step of adding a resin (E) to the aqueous latex,
   the resin (E) being a liquid having a viscosity of 100 mPa·s to 1,000,000 mPa·s at 25° C., a semisolid, or a solid, and
   the step 4 further including:
   a step 4a of mixing the coagulate and the thermosetting resin (B) to obtain a mixture;
   a step 4b of stirring the mixture obtained in the step 4a to remove water from the coagulate; and
   a step 4c of further adding the thermosetting resin (B) to the mixture obtained in the step 4b and mixing the mixture obtained in the step 4b with the thermosetting resin (B).

12. The method as set forth in claim 11, wherein an amount of the added thermosetting resin (B) in the step 4c is in a range of from 5 parts by weight to 20 parts by weight.

* * * * *